(12) United States Patent
Sasaki

(10) Patent No.: US 6,622,371 B2
(45) Date of Patent: Sep. 23, 2003

(54) METHOD OF MANUFACTURING THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 51 days.

(21) Appl. No.: 09/780,386

(22) Filed: Feb. 12, 2001

(65) Prior Publication Data

US 2001/0013505 A1 Aug. 16, 2001

(30) Foreign Application Priority Data

Feb. 16, 2000 (JP) ........................................ 2000-043551

(51) Int. Cl.[7] ........................... G11B 5/127; H04R 31/00
(52) U.S. Cl. ............................... 29/603.14; 29/603.11; 29/603.13; 29/603.15; 29/603.16; 29/605; 29/606; 300/126; 300/317; 451/5; 451/41
(58) Field of Search ...................... 29/603.11, 603.13, 29/603.14, 603.15, 603.16, 603.17, 605, 606; 451/5, 41; 360/126, 317

(56) References Cited

U.S. PATENT DOCUMENTS

| | | | | |
|---|---|---|---|---|
| 5,057,798 A | * | 10/1991 | Moye et al. | 333/33 |
| 5,600,519 A | | 2/1997 | Heim et al. | 360/126 |
| 5,622,525 A | * | 4/1997 | Haisma et al. | 451/41 |
| 5,749,769 A | * | 5/1998 | Church et al. | 451/5 |
| 5,885,131 A | * | 3/1999 | Azarian et al. | 451/5 |
| 6,043,959 A | * | 3/2000 | Crue et al. | 360/317 |
| 6,113,464 A | * | 9/2000 | Ohmori et al. | 451/41 |
| 6,118,629 A | * | 9/2000 | Huai et al. | 360/126 |
| 6,126,989 A | * | 10/2000 | Robinson et al. | 427/97 |
| 6,183,891 B1 | * | 2/2001 | Draaisma et al. | 428/693 |
| 6,226,149 B1 | * | 5/2001 | Dill et al. | 360/126 |
| 6,260,256 B1 | * | 7/2001 | Sasaki | 29/603.01 |
| 6,317,288 B1 | * | 11/2001 | Sasaki | 360/126 |
| 6,330,127 B1 | * | 12/2001 | Sasaki | 360/126 |
| 6,330,743 B1 | * | 12/2001 | Iijima et al. | 29/603.14 |
| 6,333,841 B1 | * | 12/2001 | Sasaki | 360/317 |
| 6,419,845 B1 | * | 7/2002 | Sasaki | 216/22 |

FOREIGN PATENT DOCUMENTS

JP        8-249614        9/1996

* cited by examiner

Primary Examiner—A. Dexter Tugbang
Assistant Examiner—Paul D. Kim
(74) Attorney, Agent, or Firm—Oliff & Berridge PLC

(57) ABSTRACT

Provided is a method of manufacturing a thin film magnetic head which enables dimensional control of a pole width and enables reducing the time required to form the pole width. After a top pole chip precursory layer made of iron nitride is formed by sputtering, a surface of the top pole chip precursory layer is polished and flattened. A first mask precursory layer and a photoresist film are formed in sequence on the flattened top pole chip precursory layer. A photoresist pattern having an opening is formed by selectively exposing and patterning the photoresist film by photolithography. The surface of the top pole chip precursory layer is polished and flattened, and thus a surface of the first mask precursory layer formed over the top pole chip precursory layer is also flat. Thus, pattern deformation resulting from light reflected from an underlayer during exposure is prevented, and therefore the opening of the photoresist pattern can be formed with high accuracy.

32 Claims, 33 Drawing Sheets

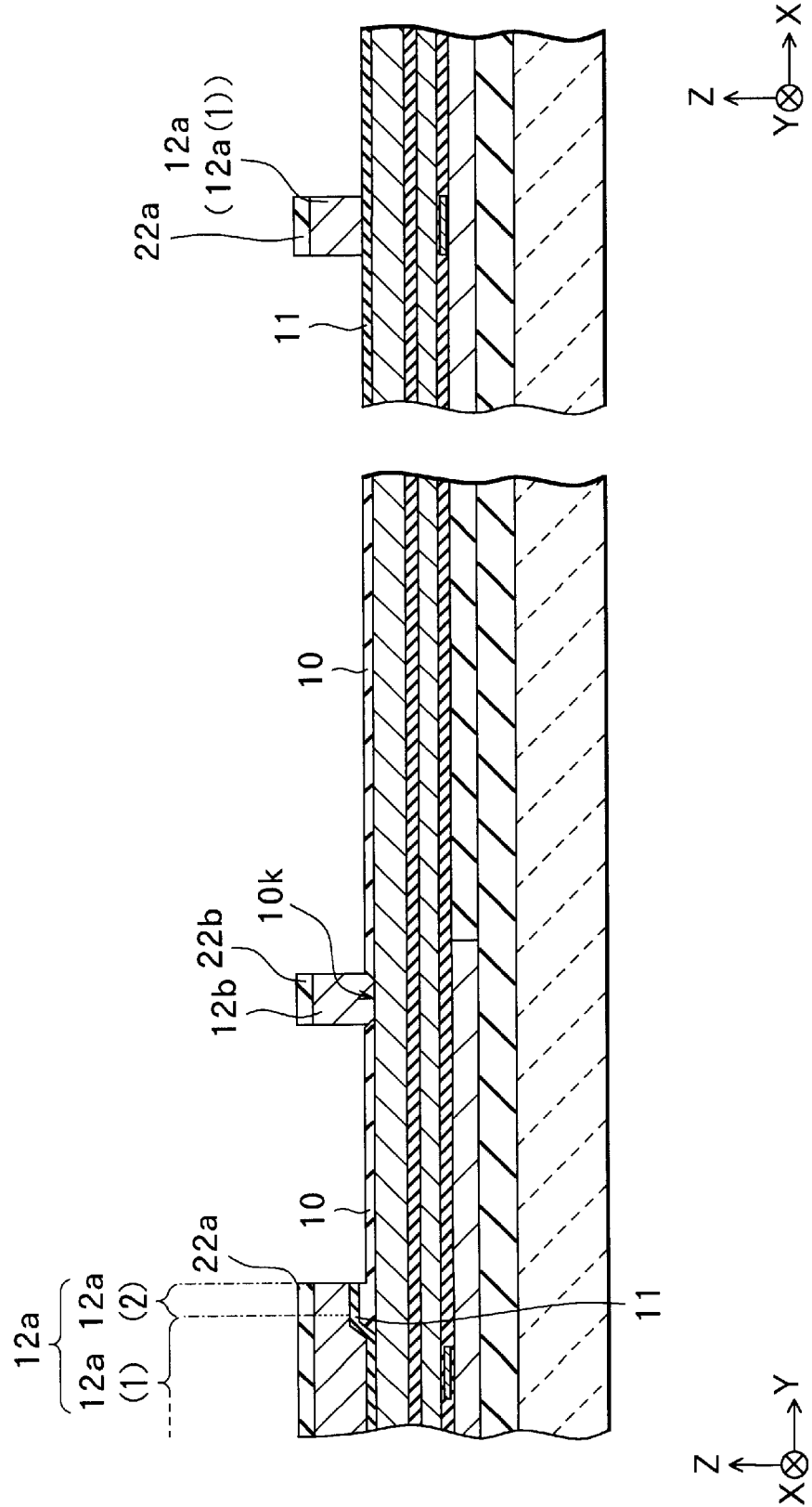

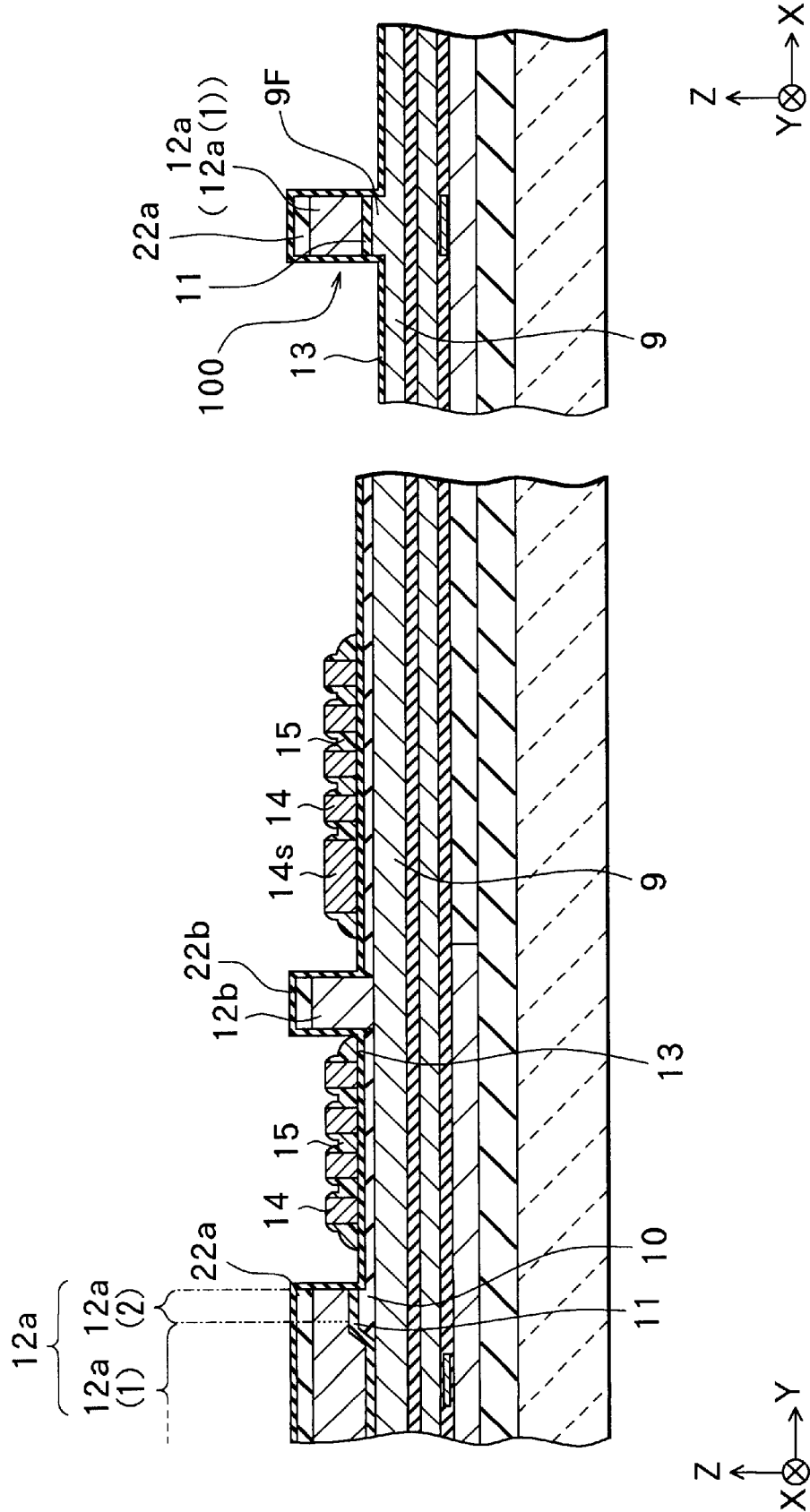

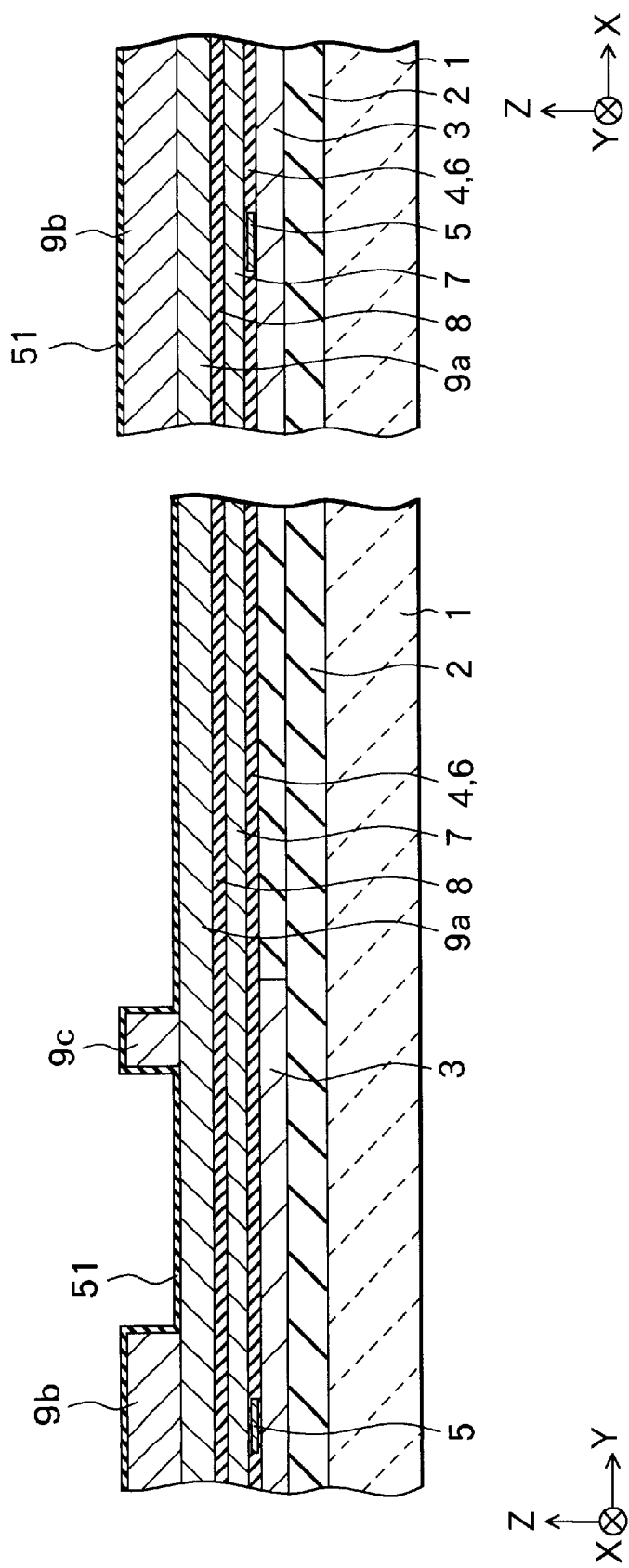

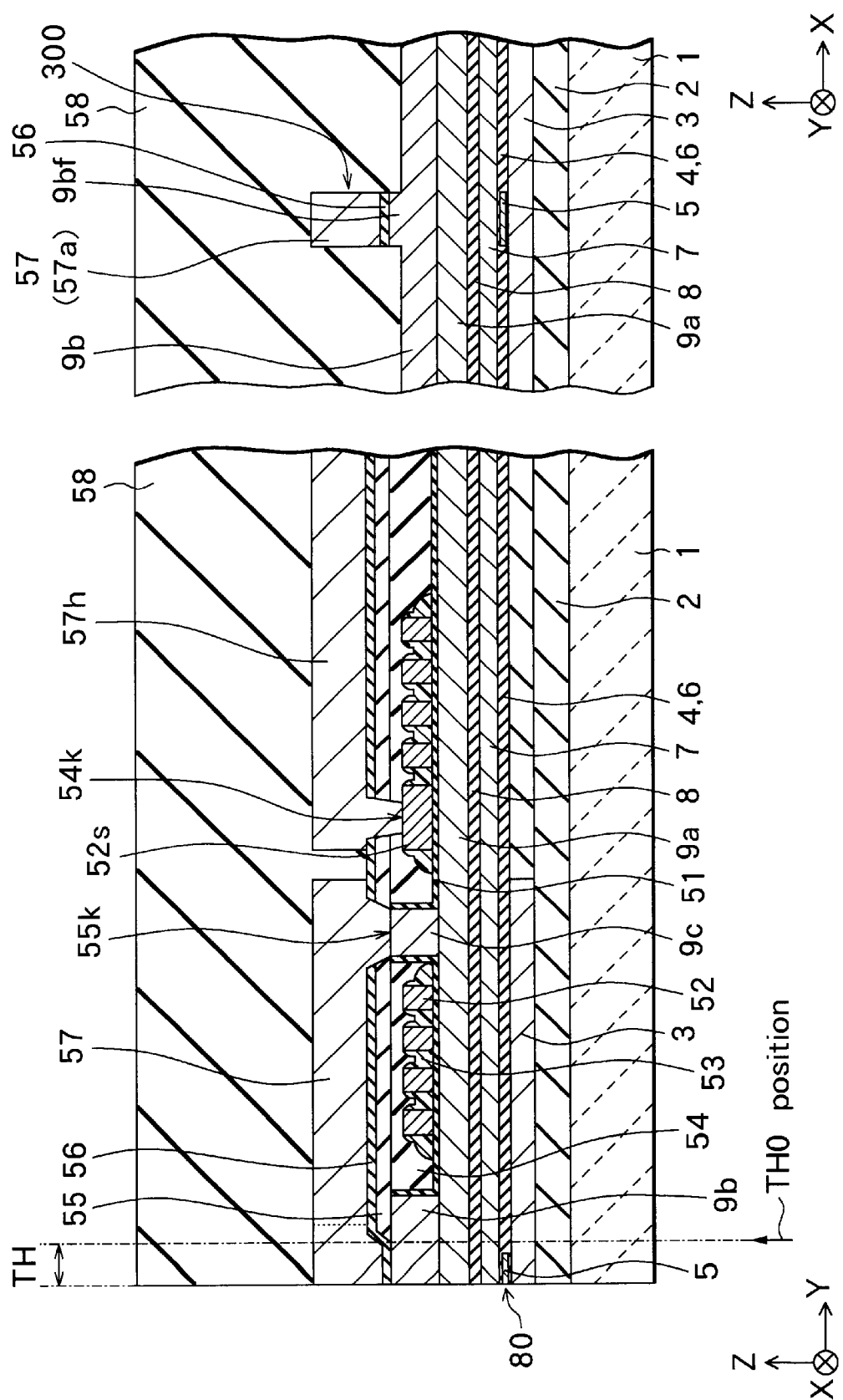

METHOD OF MANUFACTURING THIN FILM MAGNETIC HEAD

BACKGROUND OF THE INVENTION

1. Field of the Invention

The invention relates to a method of manufacturing a thin film magnetic head having at least an inductive magnetic transducer for writing.

2. Description of the Related Art

Recently, an improvement in performance of a thin film magnetic head has been sought in accordance with an increase in a surface recording density of a hard disk drive. A composite thin film magnetic head, which has a stacked structure comprising a recording head having an inductive magnetic transducer for writing and a reproducing head having a magnetoresistive (hereinafter referred to as MR) element for reading, is widely used as the thin film magnetic head.

The increase of the recording density of the performance of the recording head requires the increase of a track density on a magnetic recording medium. For this purpose, it is necessary to realize a recording head having a narrow track structure in which the on-air-bearing-surface widths of a top pole and a bottom pole, which are formed on and under a write gap, respectively, with the write gap in between, are as narrow as a few microns to the submicron order. Semiconductor processing technology is used in order to achieve this recording head.

A method of manufacturing a composite thin film magnetic head will be now described with reference to FIGS. 36 to 41, as an example of a conventional method of manufacturing a thin film magnetic head.

In the method of manufacturing, first, as shown in FIG. 36, an insulating layer 102 made of, for example, aluminum oxide ($Al_2O_3$, hereinafter referred to as "alumina") is deposited with a thickness of about 5.0 $\mu$m to about 10.0 $\mu$m on a substrate 101 made of, for example, altic ($Al_2O_3$—TiC). Then, a bottom shield layer 103 for a reproducing head is formed on the insulating layer 102. Then, for example, an alumina layer is deposited by sputtering with a thickness of 100 nm to 200 nm on the bottom shield layer 103, and thus a shield gap film 104 is formed. Then, an MR film 105 for forming an MR element for reproducing is formed with a thickness of a few tens of nanometers on the shield gap film 104, and the MR film 105 is patterned into a desired shape by high-accuracy photolithography. Then, lead layers (not shown) for functioning as lead electrode layers to be electrically connected to the MR film 105 are formed on both sides of the MR film 105. After that, a shield gap film 106 is formed on the lead layers, the shield gap film 104 and the MR film 105, and thus the MR film 105 is sandwiched in between the shield gap films 104 and 106. Then, a top shield-cum-bottom pole (hereinafter referred to as a bottom pole) 107 made of a magnetic material for use in both the reproducing and recording heads, e.g., a nickel-iron alloy (NiFe, hereinafter referred to as "Permalloy (a trade name)") is formed on the shield gap film 106.

Then, as shown in FIG. 37, a write gap layer 108 made of an insulating material, e.g., alumina is formed on the bottom pole 107, and a photoresist film 109 is formed into a predetermined pattern on the write gap layer 108 by high-accuracy photolithography. Then, a thin film coil 110 made of, for example, copper (Cu) for an inductive recording head is formed on the photoresist film 109 by plating, for example. Then, a photoresist film 111 is formed into a predetermined pattern by high-accuracy photolithography so as to coat the photoresist film 109 and the thin film coil 110. Then, the photoresist film 111 is subjected to heat treatment at a temperature of, for example, 250° C. in order to provide insulation among windings of the thin film coil 110.

Then, as shown in FIG. 38, the write gap layer 108 is partially etched at a more rearward position than the thin film coil 110 (on the right side in FIG. 38) in order to form a magnetic path, whereby an opening 108a is formed and thus a part of the bottom pole 107 is exposed. Then, a magnetic material having high saturation magnetic flux density, e.g., Permalloy is formed into a film by electroplating so as to coat an exposed surface of the bottom pole 107, the photoresist film 111 and the write gap layer 108. Then, the plated film made of Permalloy is selectively etched by ion milling using a mask (not shown) made of a photoresist film having a predetermined planar shape, and thus a top yoke-cum-top pole (hereinafter referred to as a top pole) 112 is formed. For example, the top pole 112 has a planar shape shown in FIG. 41 to be described later and includes a yoke portion 112a and a pole chip portion 112b. The top pole 112 is in contact with and magnetically coupled to the bottom pole 107 in the opening 108a. Then, both the write gap layer 108 and the bottom pole 107 are selectively etched by about 0.5 $\mu$m by ion milling using a part (the pole chip portion 112b) of the top pole 112 as a mask (see FIG. 40), and thereafter an overcoat layer 113 made of, for example, alumina is formed on the top pole 112. Finally, a track surface of the recording head and the reproducing head, i.e., an air bearing surface 120 is formed by machining and polishing, and, as a result, a thin film magnetic head is completed.

FIGS. 39 to 41 show the structure of the completed thin film magnetic head. FIG. 39 shows a cross section of the thin film magnetic head in a direction perpendicular to the air bearing surface 120. FIG. 40 shows an enlarged view of a cross section of a pole portion in a direction parallel to the air bearing surface 120. FIG. 41 shows a planar structure of the thin film magnetic head. FIG. 38 corresponds to a cross section viewed from the direction of the arrows along the line XXXVIII—XXXVIII of FIG. 41. The overcoat layer 113 and so on are not shown in FIGS. 39 to 41. In FIG. 41, the thin film coil 110 and the photoresist film 111 are shown, but their outermost ends alone are shown.

In FIGS. 39 and 41, "TH" indicates a throat height, and "MRH" indicates an MR height. The "throat height (TH)" refers to one of factors that determine the performance of the recording head, and refers to a length between the position of an edge of the insulating layer (the photoresist film 111) for electrically isolating the thin film coil 110 from the other conductive portions, which is closest to the air bearing surface 120, i.e., a throat height zero position (a TH0 position) and the position of the air bearing surface 120. The optimization of the throat height (TH) is desired for the improvement in the performance of the recording head. The throat height (TH) is controlled by the amount of polishing of the air bearing surface 120. The "MR height (MRH)" refers to a length between the position of a farthest edge of the MR film 105 from the air bearing surface 120, i.e., an MR height zero position (an MRH0 position) and the position of the air bearing surface 120. The MR height (MRH) is also controlled by the amount of polishing of the air bearing surface 120.

Factors that determine the performance of the thin film magnetic head include an apex angle (θ) shown in FIG. 39, in addition to the throat height (TH), the MR height (MRH)

and so on. The apex angle θ refers to an average degree of inclination of an inclined surface of the photoresist film 111 close to the air bearing surface 120.

As shown in FIG. 40, a structure in which the respective parts of both the write gap layer 108 and the bottom pole 107 are etched in self-alignment with the pole chip portion 112b of the top pole 112 is called a trim structure. The trim structure can prevent the increase in an effective track width resulting from a spread of a magnetic flux generated during writing data on a narrow track. In FIG. 40, "P2W" indicates a width of a portion (hereinafter referred to as "a pole portion 500") having the trim structure, namely, a pole width (hereinafter sometimes referred to as "a track width"). In FIG. 40, "P2L" indicates a thickness of the pole chip portion 112b forming a part of the pole portion 500, namely, a pole length. As shown in FIG. 40, lead layers 121 for functioning as lead electrode layers to be electrically connected to the MR film 105 are provided on both sides of the MR film 105. The lead layers 121 are not shown in FIGS. 36 to 39.

As shown in FIG. 41, the top pole 112 has the yoke portion 112a occupying most of the top pole 112, and the pole chip portion 112b having a substantially uniform width as the pole width P2W. An outer edge of the yoke portion 112a forms an angle α with a surface parallel to the air bearing surface 120 at a coupling portion between the yoke portion 112a and the pole chip portion 112b, and an outer edge of the pole chip portion 112b forms an angle β with the surface parallel to the air bearing surface 120 at the above-mentioned coupling portion. For example, α is about 45 degrees, and β is 90 degrees. As described above, the pole chip portion 112b is a portion to be used as a mask for forming the trim structure of the pole portion 500. As can be seen from FIGS. 39 and 41, the pole chip portion 112b extends on the flat write gap layer 108, and the yoke portion 112a extends on a coil portion (hereinafter referred to as "an apex portion"), which is coated with the photoresist film 111 and rises like a hill.

Detailed structural features of the top pole are described in Unexamined Japanese Patent Application Publication No. Hei 8-249614, for example.

Since the pole width P2W of the pole portion 500 defines a write track width on the recording medium, the increase of the recording density requires narrowing of the pole width P2W by forming the pole portion 500 with high accuracy. Too great a pole width P2W causes the occurrence of a phenomenon in which data is written on adjacent regions as well as a predetermined write track region on the recording medium, i.e., a side erase phenomenon, and consequently the recording density cannot be improved. Therefore, it is important to narrow the pole width P2W of the pole portion 500 and to make the pole width P2W uniform over a direction of thickness (a vertical direction in FIG. 40) and a direction of length (a horizontal direction in FIG. 39).

Methods of forming the top pole 112 include, in addition to a wet process such as frame plating, a dry process of patterning a plated film made of Permalloy by selectively etching the plated film by means of ion milling as described above, for example.

However, the applicant and so on have found out that this method using ion milling causes the following problems. For example, when a surface of a plated film is irradiated with ion beams from a direction substantially perpendicular to the surface of the plated film (a direction that forms an angle of about 0 to 30 degrees with the normal to the surface of the plated film), an etching product generated during etching is redeposited on a non-etched portion, and thus the width of the pole chip portion 112b is partly greater than a designed value. For example, when a surface of a plated film is irradiated with ion beams from a direction substantially parallel to the surface of the plated film (a direction that forms an angle of about 50 to 70 degrees with the normal to the surface of the plated film), the above-mentioned phenomenon of redeposition of the etching product is avoided, but the amount of etching increases as the process proceeds, and thus the width of the pole chip portion 112b is partly smaller than the designed value. In particular, when the pole portion 500 is formed by using ion milling under the latter conditions, the pole width P2W becomes nonuniform as shown in FIG. 42.

In a conventional method, a photoresist film for forming a mask (a photoresist pattern) to be used for patterning a plated film is formed on an underlayer (a Permalloy layer) having a concave and convex structure. Thus, during exposure, light is reflected obliquely or transversely from a surface of the underlayer, the reflected light increases or reduces an exposed region, and, as a consequence, the accuracy in forming the mask deteriorates. The deterioration in the accuracy in forming the mask is also caused by that Permalloy having relatively high reflectance is used as a material of the plated film that is the underlayer of the photoresist film.

In the conventional method, the pole portion 500 is formed by ion milling having a low etching rate, thus an etching process takes a long time, and therefore a considerable time is required for the completion of processing of the pole portion 500. This tendency manifests itself not only during forming the pole portion 500 but also during forming the top pole 112 and other magnetic layer portions (the bottom shield layer 103, the bottom pole 107, etc.).

SUMMARY OF THE INVENTION

The invention is designed to overcome the foregoing problems. It is an object of the invention to provide a method of manufacturing a thin film magnetic head, which enables forming a thin film magnetic head with high accuracy in a short time.

There is provided a method of manufacturing a thin film magnetic head of the invention having: a first magnetic layer and a second magnetic layer magnetically coupled to each other having two magnetic poles which face each other with a gap layer in between and are to be faced with a recording medium, a thin film coil provided between the two magnetic layers, and an insulating layer for insulating the thin film coil from the two magnetic layers, the first magnetic layer having a first magnetic layer portion that includes a first uniform-width portion extending away from a recording-medium-facing surface to be faced with the recording medium and defining a write track width on the recording medium, and a second magnetic layer portion that extends in a region in which the thin film coil portion is provided and that is magnetically coupled to the first magnetic layer portion, the second magnetic layer having a second uniform-width portion corresponding to the first uniform-width portion of the first magnetic layer, wherein at least one of the step of forming the first magnetic layer and the step of forming the second magnetic layer includes the steps of: forming a magnetic material layer; polishing and flattening a surface of the magnetic material layer; forming a first mask on the magnetic material layer flattened; and selectively etching the magnetic material layer by reactive ion etching using the first mask.

In the method of manufacturing a thin film magnetic head of the invention, the first mask is formed on a flat surface of the magnetic material layer, and the magnetic material layer is selectively etched by reactive ion etching using the first mask, whereby at least one of the first magnetic layer and the second magnetic layer is formed.

In the method of manufacturing a thin film magnetic head of the invention, an inorganic material may be used as a material of the first mask. Preferably, a material containing aluminum oxide or aluminum nitride is used as the inorganic material.

In the method of manufacturing a thin film magnetic head of the invention, a planar shape of the first mask may include a portion corresponding to a planar shape of at least the first uniform-width portion of the first magnetic layer portion.

When the first magnetic layer portion further includes a wide portion being located in an opposite side of the first uniform-width portion from the recording-medium-facing surface, being magnetically coupled to the first uniform-width portion and having a greater width than a width of the first uniform-width portion, when a step is formed in a width direction at a coupling position between the first uniform-width portion and the wide portion, and when a corner is formed with a side edge surface of the first uniform-width portion and a step surface of the wide portion at the step, it is preferable that the first mask is formed so as to include a portion having a planar shape corresponding to a planar shape of the wide portion and that an angle of a portion of the first mask, the portion corresponding to the corner of the first magnetic layer portion, be within a range of 90 degrees to 120 degrees.

In the method of manufacturing a thin film magnetic head of the invention, the step of forming the first mask may include the steps of: forming a mask precursory layer made of an inorganic material on the surface of the magnetic material layer; forming a second mask on a surface of the mask precursory layer; and forming the first mask by patterning the mask precursory layer by use of the second mask. Preferably, the mask precursory layer is patterned by reactive ion etching at a temperature within a range of 50° C. to 300° C. in a gaseous atmosphere containing at least one of chlorine and boron trichloride.

In the method of manufacturing a thin film magnetic head of the invention, a metal film pattern having a predetermined shape which is formed on the surface of the mask precursory layer may be used as the second mask, or a photoresist film pattern having a predetermined shape which is formed on the surface of the mask precursory layer may be used as the second mask. When the metal film pattern is used as the second mask, the metal film pattern may be formed by selectively growing a plated film on the surface of the mask precursory layer, or the metal film pattern may be formed by selectively etching a metal layer formed on the surface of the mask precursory layer.

In the method of manufacturing a thin film magnetic head of the invention, at least the first uniform-width portion of the first magnetic layer may be formed by the step of processing, or at least the second uniform-width portion of the second magnetic layer may be formed by the step of selectively etching the magnetic material layer.

In the method of manufacturing a thin film magnetic head of the invention, a region of the gap layer excluding a portion corresponding to the first uniform-width portion of the first magnetic layer may be selectively removed by reactive ion etching. Preferably, formation of the first uniform-width portion of the first magnetic layer, selective removal of the gap layer, and formation of the second uniform-width portion of the second magnetic layer are successively performed. To process the above-mentioned portions, it is preferable that the first mask made of an inorganic material be used to form the first uniform-width portion of the first magnetic layer and that at least one of the first mask and the first uniform-width portion be used as an etching mask to selectively remove the gap layer and form the second uniform-width portion of the second magnetic layer.

In the method of manufacturing a thin film magnetic head of the invention, in the step of forming the first magnetic layer, the second magnetic layer portion may be selectively formed from the first magnetic layer portion by patterning using reactive ion etching. Preferably, the second magnetic layer portion is formed in such a manner that the second magnetic layer portion partly overlaps the first magnetic layer portion and that the edge thereof close to the recording-medium-facing surface is located far from the position of the recording-medium-facing surface.

In the method of manufacturing a thin film magnetic head of the invention, when the thin film coil portion has a first thin film coil and the insulating layer has a first insulating layer portion which the first thin film coil is embedded in, the method may include the steps of: forming the first insulating layer portion so as to cover at least the first magnetic layer portion and the first thin film coil; and forming a first flat surface by polishing a surface of the first insulating layer portion until at least the first magnetic layer portion is exposed. In this case, the second magnetic layer portion may be formed on the first flat surface in such a manner that the second magnetic layer is brought into contact with the first magnetic portion exposed.

In the method of manufacturing a thin film magnetic head of the invention, when the first magnetic layer further includes a third magnetic layer portion for magnetically coupling the first magnetic layer portion to the second magnetic layer portion between the first magnetic layer portion and the second magnetic layer portion, the third magnetic layer portion may be formed on the first flat surface by reactive ion etching. Preferably, the third magnetic layer portion is formed in such a manner that the third magnetic layer portion partly overlaps both of the first magnetic layer portion and a part of the second magnetic layer portion and that the edge thereof close to the recording-medium-facing surface is located far from the position of the recording-medium-facing surface.

In the method of manufacturing a thin film magnetic head of the invention, when the thin film coil portion further has a second thin film coil provided in a different layer from the first thin film coil and the insulating layer further has a second insulating layer portion which the second thin film coil is embedded in, the method may include the steps of: forming a first connecting pattern on an end of the second thin film coil simultaneously with forming the second thin film coil, the first connecting pattern being a part of the thin film coil portion and being integral with the second thin film coil; forming a second connecting pattern on the first connecting pattern simultaneously with forming the third magnetic layer portion, the second connecting pattern being a part of the thin film coil portion; forming the second insulating layer portion so as to coat at least the third magnetic layer portion, the second thin film coil and the second connecting pattern; forming a second flat surface by polishing a surface of the second insulating layer portion until at least both of the third magnetic layer portion and the second connecting pattern are exposed; and forming a conductive layer pattern on the second flat surface so as to be electrically connected to an exposed surface of the second connecting pattern. In this case, the second magnetic layer portion may be further formed on the second flat surface.

In the method of manufacturing a thin film magnetic head of the invention, when the thin film magnetic head further has a magnetic transducer film extending away from the recording-medium-facing surface and a third magnetic layer for magnetically shielding the magnetic transducer film, the third magnetic layer may be formed by patterning with reactive ion etching.

In the method of manufacturing a thin film magnetic head of the invention, the magnetic material layer is formed by sputtering using a predetermined magnetic material. Preferably, a material containing iron nitride, or an amorphous alloy such as a material containing a zirconium-cobalt-iron alloy is used as the magnetic material.

In the method of manufacturing a thin film magnetic head of the invention, it is preferable that the step of selectively etching the magnetic material layer be performed at a temperature within a range of 50° C. to 300° C. in a gaseous atmosphere containing at least one of chlorine, boron trichloride and hydrogen chloride.

Other and further objects, features and advantages of the invention will appear more fully from the following description.

BRIEF DESCRIPTION OF THE DRAWINGS

FIGS. 4A and 4B are cross sectional views for describing a step following the step of FIGS. 3A and 3B;

FIGS. 5A and 5B are cross sectional views for describing a step following the step of FIGS. 4A and 4B;

FIGS. 32A and 32B are cross sectional views for describing a step of a method of manufacturing a thin film magnetic head according to a third embodiment of the invention;

FIGS. 34A and 34B are cross sectional views for describing a step following the step of FIGS. 33A and 33B;

DETAILED DESCRIPTION OF THE PREFERRED EMBODIMENTS

Embodiments of the invention will be described in detail below with reference to the accompanying drawings.

[First Embodiment]

Firstly, the description is given with reference to FIGS. 1A to 14 with regard to an example of a method of manufacturing a composite thin film magnetic head as a method of manufacturing a thin film magnetic head according to a first embodiment of the invention. Since a thin film magnetic head according to the embodiment is embodied by the method of manufacturing a thin film magnetic head according to the embodiment, the thin film magnetic head will be described in conjunction with the method of manufacturing a thin film magnetic head.

Figures 6A, 6B:
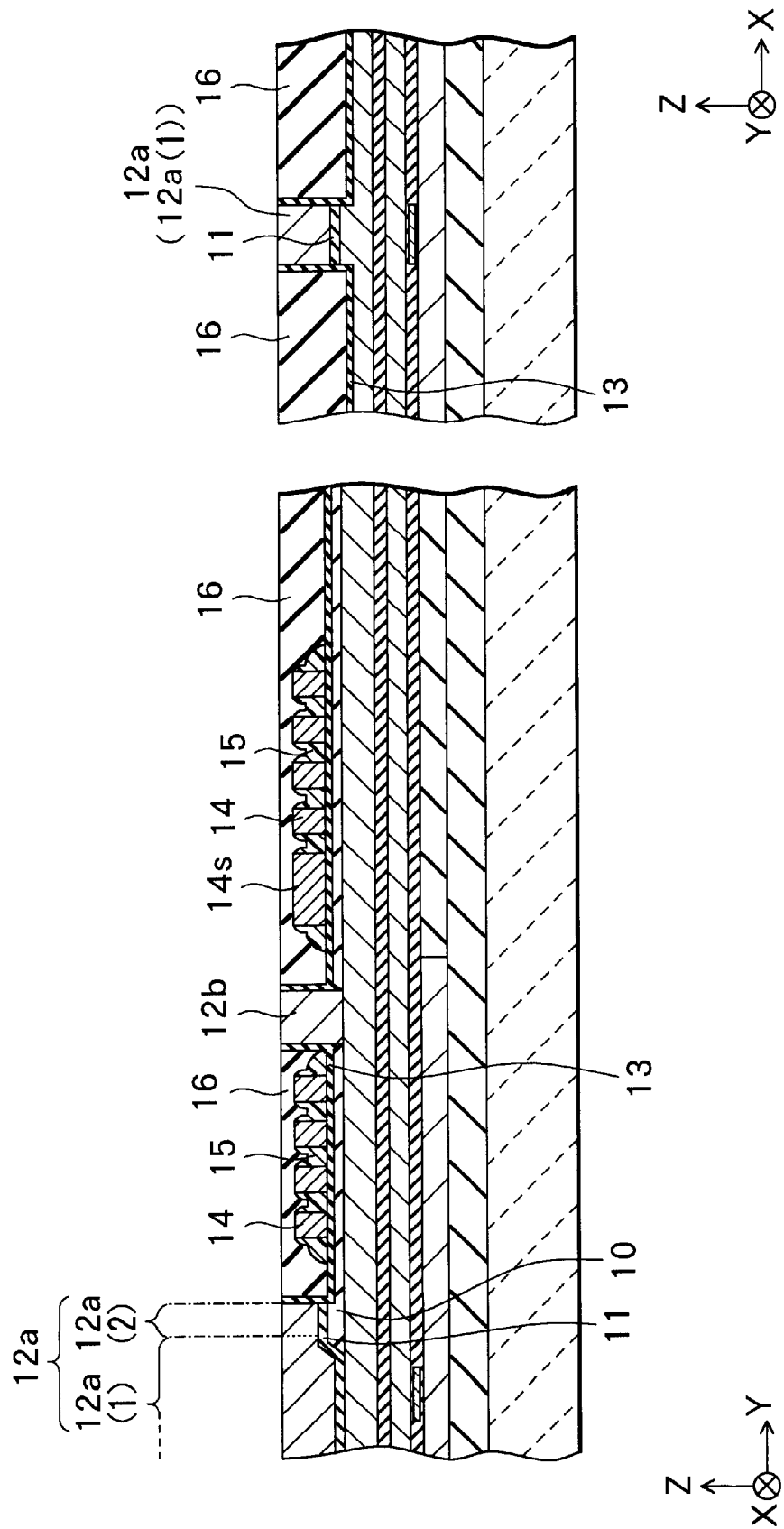
FIGS. 6A and 6B are cross sectional views for describing a step following the step of FIGS. 5A and 5B.
Figures 7A, 7B:
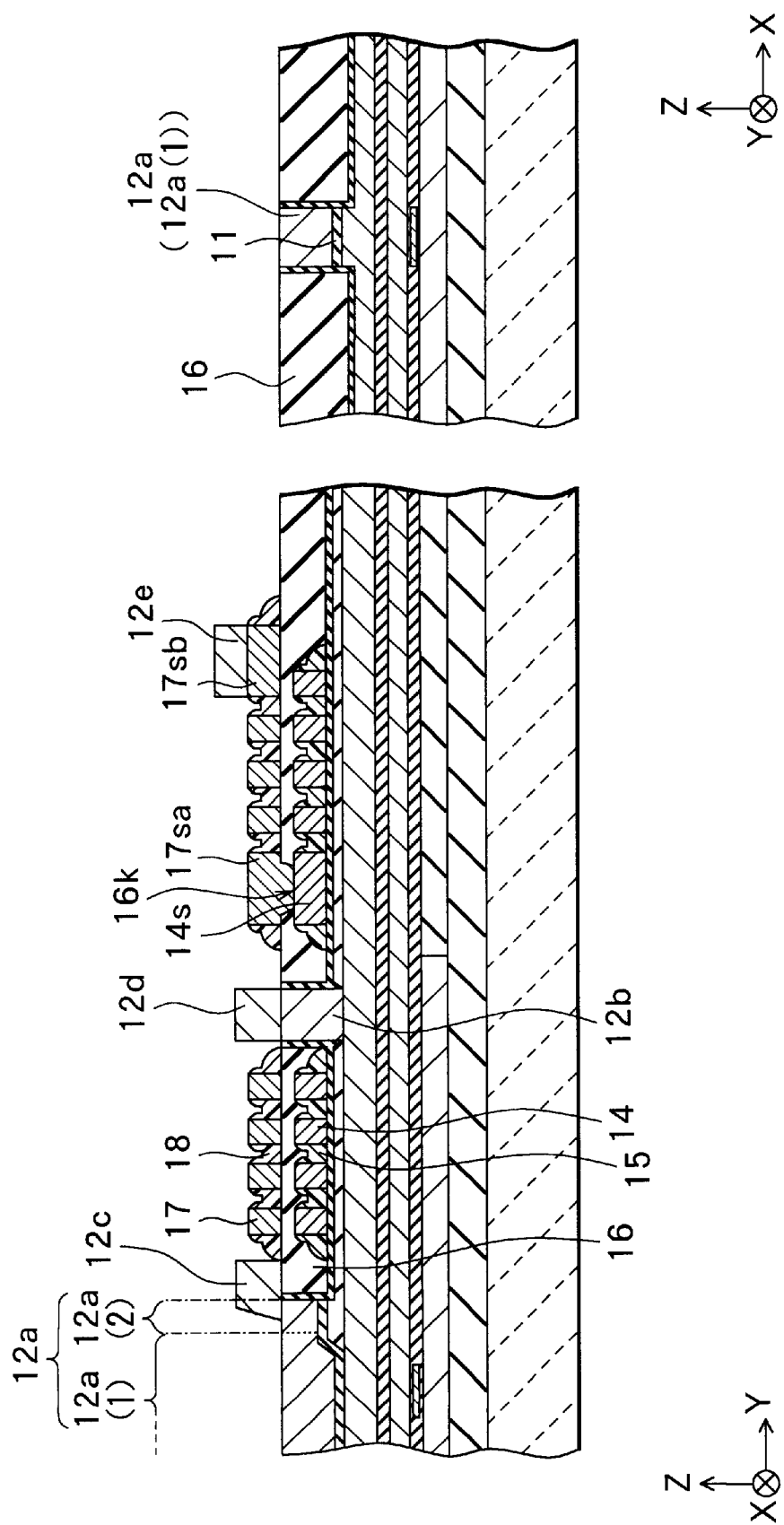
FIGS. 7A and 7B are cross sectional views for describing a step following the step of FIGS. 6A and 6B.
Figures 8A, 8B:
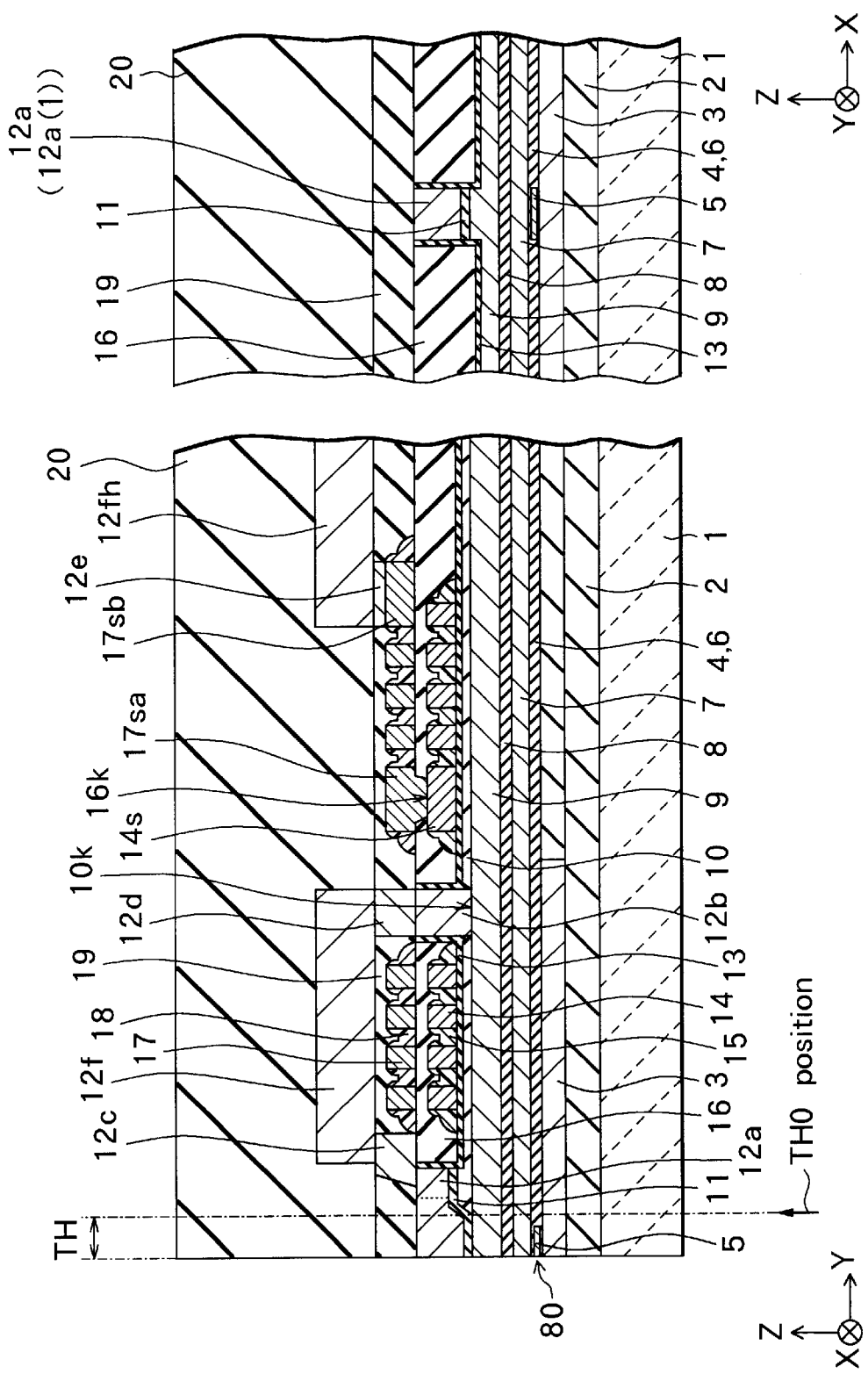
FIGS. 8A and 8B are cross sectional views for describing a step following the step of FIGS. 7A and 7B.

FIGS. 1A, 2A, 3A, 4A, 5A, 6A, 7A and 8A show a cross section perpendicular to an air bearing surface. FIGS. 1B, 2B, 3B, 4B, 5B, 6B, 7B and 8B show a cross section of a pole portion parallel to the air bearing surface. FIGS. 9 to 14 are perspective views corresponding to main manufacturing steps. FIG. 12 corresponds to a state shown in FIGS. 4A and 4B, FIG. 13 corresponds to a state shown in FIGS. 6A and 6B, and FIG. 14 corresponds to a state shown in FIGS. 8A and 8B. Insulating films 13 and 15, a thin film coil 14 and so on shown in FIGS. 5A and 5B are not shown in FIG. 13, and insulating films 13, 15, 16, 18 and 19, thin film coils 14 and 17, an overcoat layer 20 and so on shown in FIGS. 8A and 8B are not shown in FIG. 14.

In the following description, an X-axis direction, a Y-axis direction and a Z-axis direction in FIGS. 1A to 14 are expressed as "a width direction", "a length direction" and "a thickness direction", respectively. The side close to an air bearing surface 80 in the Y-axis direction (or the side to form the air bearing surface 80 in the following step) is expressed as "a front side (or a frontward side)", and the opposite side is expressed as "a rear side (or a rearward side)".

<Method of Manufacturing Thin Film Magnetic Head>

Figure 1A:
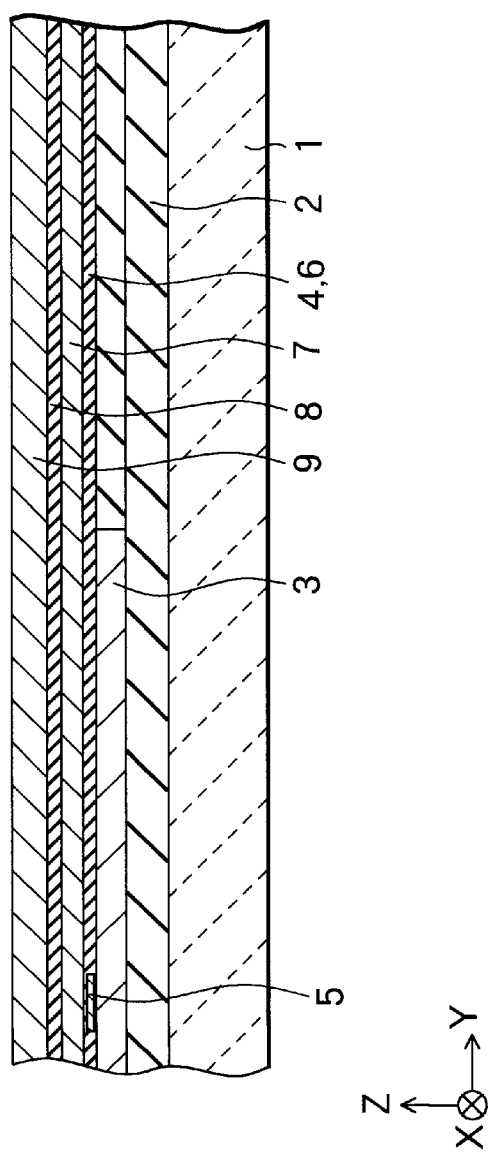
FIGS. 1A and 1B are cross sectional views for describing a step of a method of manufacturing a thin film magnetic head according to a first embodiment of the invention.
Figure 1B:
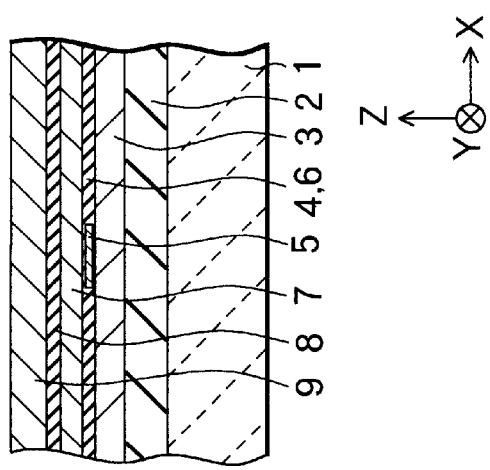

In the method of manufacturing according to the embodiment, first, as shown in FIGS. 1A and 1B, an insulating layer 2 made of, for example, alumina is deposited with a thickness of about 3.0 $\mu$m to 5.0 $\mu$m on a substrate 1 made of, for example, altic ($Al_2O_3$—TiC). Then, for example, Permalloy (Ni: 80 wt %, Fe: 20 wt %) is selectively formed with a thickness of about 3.0 $\mu$m on the insulating layer 2 by using, for example, photolithography and plating, and thus a bottom shield layer 3 for a reproducing head is formed. Besides the above-mentioned material, Permalloy (Ni: 45 wt %, Fe: 55 wt %) may be used as a material of the bottom shield layer 3. Then, an insulating film made of, for example, alumina is formed with a thickness of about 4.0 $\mu$m to 5.0 $\mu$m over the overall surface. After that, a surface of the insulating film is polished by, for example, CMP (Chemical Mechanical Polishing) until the bottom shield layer 3 is exposed, and thus the overall surface is flattened.

Next, as shown in FIGS. 1A and 1B, for example, an alumina layer is sputter deposited with a thickness of about 100 nm to 200 nm on the bottom shield layer 3, and thus a shield gap film 4 is formed. Then, an MR film 5 for forming an MR element that is a principal part of the reproducing head is formed on the shield gap film 4, and the MR film 5 is formed into a desired shape by high-accuracy photolithography. Then, lead layers (not shown) for functioning as lead electrode layers to be electrically connected to the MR film 5 are formed on both sides of the MR film 5. After that, a shield gap film 6 is formed on the lead layers, the shield gap film 4 and the MR film 5, and thus the MR film 5 is sandwiched in between the shield gap films 4 and 6. The MR film 5 corresponds to a specific example of "a magnetic transducer film" of the invention.

Next, as shown in FIGS. 1A and 1B, a top shield layer 7 is selectively formed with a thickness of about 1.0 $\mu$m to 1.5 $\mu$m on the shield gap film 6. A material of the top shield layer 7, a method of forming the top shield layer 7 and so on are the same as in the case of the bottom shield layer 3. The bottom shield layer 3 and the top shield layer 7 correspond to a specific example of "a third magnetic layer" of the invention.

Next, as shown in FIGS. 1A and 1B, an insulating film 8 made of, for example, alumina is formed with a thickness of about 0.15 $\mu$m to 0.2 $\mu$m on the top shield layer 7 by sputtering, for example. Then, a bottom pole 9 made of, for example, iron nitride (FeN) is selectively formed on the insulating film 8. The bottom pole 9 is formed through the following procedure. That is, first, for example, an iron nitride layer is formed with a thickness of about 2.0 $\mu$m to 2.5 $\mu$m on the insulating film 8 by sputtering, for example. Subsequently, the formed iron nitride layer is etched and patterned by reactive ion etching (hereinafter referred to as "RIE") using a mask having a predetermined shape and material, and thus the bottom pole 9 is selectively formed (see FIG. 15). Details of a step of patterning an iron nitride layer by RIE as described above will be described later. The bottom pole 9 corresponds to a specific example of "a second magnetic layer" of the invention.

Figures 2A, 2B:
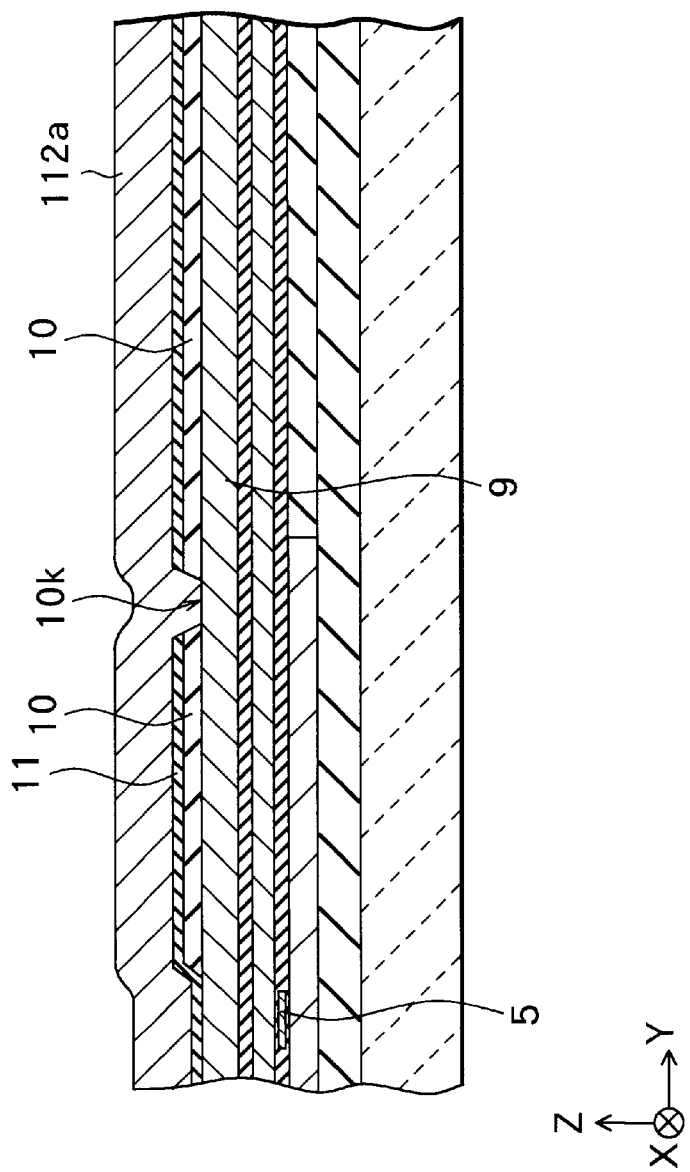
FIGS. 2A and 2B are cross sectional views for describing a step following the step of FIGS. 1A and 1B.

Next, as shown in FIGS. 2A and 2B, for example, an alumina layer is formed with a thickness of about 0.5 $\mu$m to 1.0 $\mu$m on the bottom pole 9 by, for example, sputtering, and thereafter the alumina layer is etched and patterned by RIE using a mask (not shown) made of, for example, a photoresist film, whereby an insulating film pattern 10 is selectively formed. This etching process selectively removes a part of a front region of the alumina layer, and a part of a region of the alumina layer in which a magnetic path connecting portion 12b is to be formed in the following step. In the latter region in particular, an opening 10k for connecting the bottom pole 9 to a top pole 12 to be formed in the following step is formed. The insulating film pattern 10 is used to define a throat height zero position (a THO position) that is a reference position for determining a throat height (TH). To form the insulating film pattern 10, for example, the position of a most front edge (hereinafter referred to as "a most front end") of the insulating film pattern 10 is substantially matched to the position of a most rear edge (hereinafter referred to as "a most rear end") of the MR film 5. For example, it is preferable that an inclined surface be formed near at least a front edge of the insulating film pattern 10. This enables smoothing the flow of a magnetic flux through a region of a top pole chip 12a to be formed in the following step over the above-mentioned inclined surface portion. Chlorine gas containing $CF_4$ or the like, for example, is used for the above-mentioned etching process.

Next, as shown in FIGS. 2A and 2B, a write gap layer 11 made of, for example, alumina is formed with a thickness of about 0.15 $\mu$m to 0.2 $\mu$m over the overall surface by sputtering, for example. In forming the write gap layer 11, the opening 10k formed in the previous step is not coated with alumina. The write gap layer 11 corresponds to a specific example of "a gap layer" of the invention.

Next, as shown in FIGS. 2A and 2B, a top pole chip precursory layer 112a made of, for example, iron nitride (hereinafter sometimes referred to as "an iron nitride layer") is formed with a thickness of about 2.0 μm to 3.0 μm over the overall surface by sputtering, for example. The top pole chip precursory layer 112a is a preparatory layer that is to be formed into the top pole chip 12a (and the magnetic path connecting portion 12b) by patterning using the etching process in the following step. In the following description, the preparatory layer to be patterned so as to have a predetermined shape in the following step is called "a precursory layer" and is expressed in the same manner. As shown in FIG. 2A, a surface portion of the top pole chip precursory layer 112a has a concave and convex structure corresponding to a concave and convex structure of an underlayer. Besides iron nitride, an amorphous alloy having high saturation magnetic flux density, such as a zirconium-cobalt-iron alloy (FeCoZr), zirconia iron nitride (FeZrN) or cobalt iron nitride (FeCoN), may be used as a material of the top pole chip precursory layer 112a. The top pole chip precursory layer 112a corresponds to a specific example of "a magnetic material layer" of the invention.

Figure 3B:
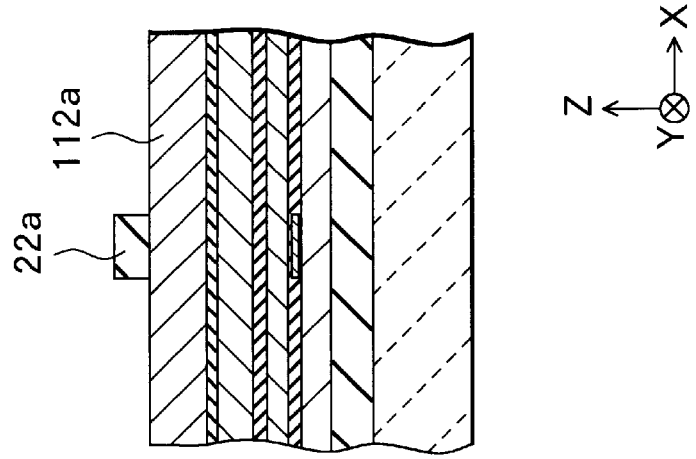
FIGS. 3A and 3B are cross sectional views for describing a step following the step of FIGS. 2A and 2B.
Figure 3A:
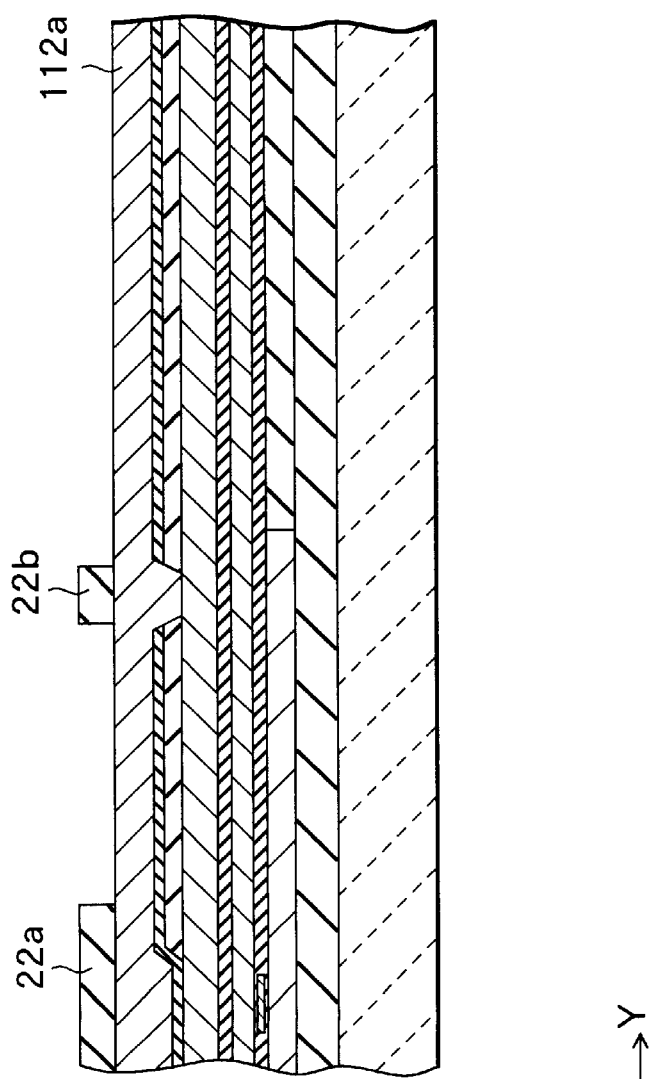

Next, as shown in FIGS. 3A and 3B, the surface of the top pole chip precursory layer 112a is flattened by polishing the surface by about 0.5 μm to 1.0 μm by means of CMP, for example. Then, a first mask 22a and the other mask 22b made of, for example, alumina are selectively formed at predetermined positions on the flattened top pole chip precursory layer 112a. A method of forming the first mask 22a and the other mask 22b will be described later.

Next, the top pole chip precursory layer 112a is selectively etched and patterned by using the first mask 22a, and thus the top pole chip 12a is selectively formed from a partial region on the write gap layer 11 to a partial region on the insulating film pattern 10 as shown in FIGS. 4A and 4B and FIG. 12. At the same time when the top pole chip 12a is formed, the magnetic path connecting portion 12b (not shown in FIG. 12) is formed in the opening 10k by using the other mask 22b. Both the top pole chip 12a and the magnetic path connecting portion 12b form a part of the top pole 12. The top pole chip 12a has a planar shape shown in FIG. 15 to be described later, and includes an end portion 12a(1) having a uniform width for defining a write track width on a recording medium (not shown), and a rear end portion 12a(2) having a greater width than the width of the end portion 12a(1). The top pole chip 12a corresponds to a specific example of "a first magnetic layer portion" of the invention, the end portion 12a(1) corresponds to a specific example of "a first uniform-width portion" of the invention, and the rear end portion 12a(2) corresponds to a specific example of "a wide portion" of the invention.

A method of forming the top pole chip 12a will be now described in detail with reference to FIGS. 9 to 11 in conjunction with FIGS. 4A and 4B and FIG. 12.

Figure 9:
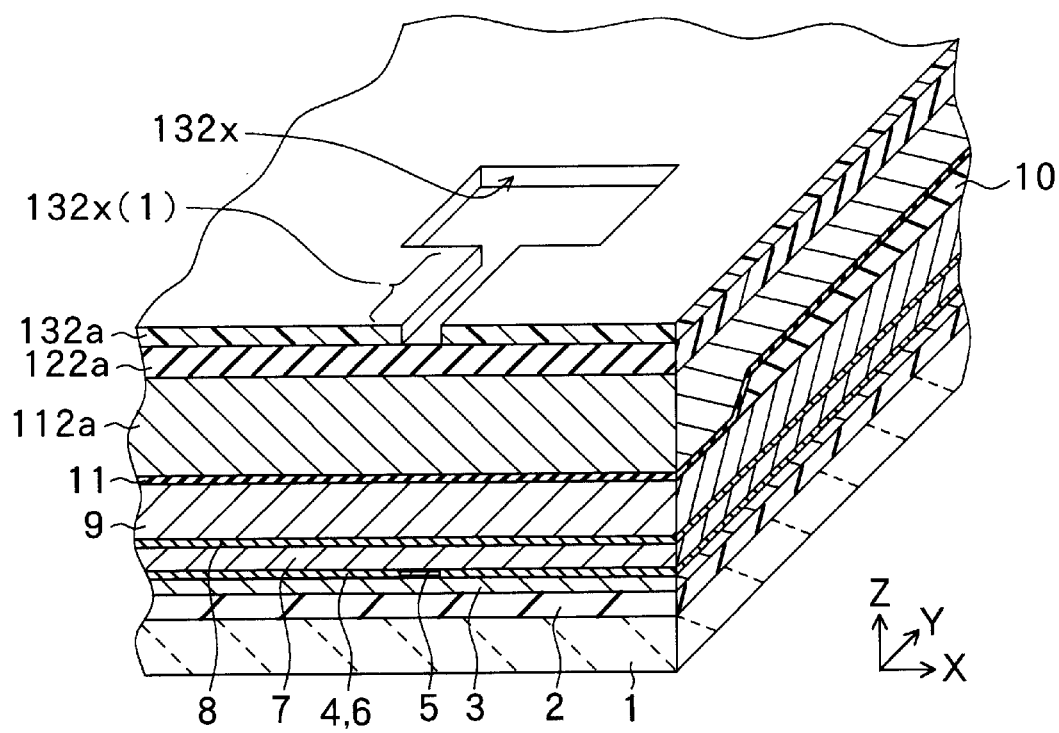
FIG. 9 is a perspective view for describing a step between the step shown in FIGS. 2A and 2B and the step shown in FIGS. 3A and 3B.
Figure 10:
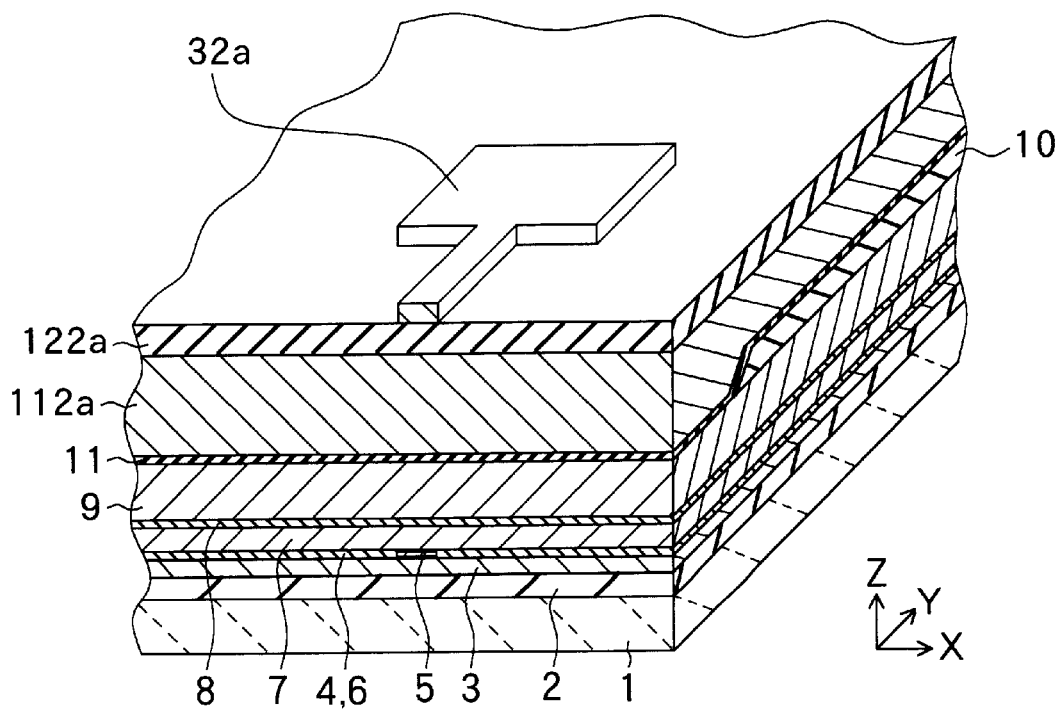
FIG. 10 is a perspective view for describing a step following the step of FIG. 9.

First, as shown in FIG. 9, a first mask precursory layer 122a made of an inorganic material such as alumina is formed with a thickness of about 1.0 μm to 2.0 μm on the flattened top pole chip precursory layer 112a by sputtering, for example. At this time, the first mask precursory layer 122a is formed in such a manner that a surface of the first mask precursory layer 122a is also flattened. By patterning by means of the etching process in the following step, the first mask precursory layer 122a is formed into the first mask 22a for patterning the top pole chip precursory layer 112a. Besides alumina, aluminum nitride (AlN) or the like, for example, may be used as the inorganic material which the first mask precursory layer 122a is to be formed of. The first mask precursory layer 122a corresponds to a specific example of "a mask precursory layer" of the invention.

Next, for example, Permalloy is formed with a thickness of about 50 nm on the flattened first mask precursory layer 122a by, for example, sputtering, and thus an electrode film (not shown) for serving as a seed layer for electroplating is formed. Then, a photoresist film is formed with a thickness of about 1.0 μm on the electrode film, and the photoresist film is patterned by photolithography, whereby a photoresist pattern 132a having an opening 132x having a predetermined shape is formed as shown in FIG. 9. A planar shape of the opening 132x corresponds to the planar shape of the top pole chip 12a. Since the photoresist film for forming the photoresist pattern 132a is formed on a flat surface, little light is reflected obliquely or transversely from a surface of the electrode film (the seed layer) during exposure, as distinct from the case in which the photoresist film is formed on an inclined surface. This prevents pattern deformation resulting from an increase or a reduction in an exposed region, etc., and enables high-accuracy formation of, in particular, a portion 132x(1) of the opening 132x corresponding to the end portion 12a(1) of the top pole chip 12a. Since the inorganic material having relatively low reflectance, such as alumina, is used as the material of the first mask precursory layer 122a, it is possible to prevent the reflection itself of light from the surface of the first mask precursory layer 122a during exposure, as compared to the case in which a material having relatively high reflectance, such as Permalloy, is used. Also in this respect, contribution is therefore given to the improvement of the accuracy in forming the opening 132x. Forming the photoresist pattern 132a does not necessarily require using a photolithography process as described above, and the photoresist film may be selectively etched and patterned by RIE, ion milling or the like, for example.

Next, a plated film made of, for example, Permalloy is grown with a thickness of about 0.5 μm to 1.0 μm in a region of the opening 132x by electroplating using the above-mentioned electrode film as the seed layer, and thereafter the photoresist pattern 132a is removed. Thus, a second mask 32a made of the plated film is formed as shown in FIG. 10. The second mask 32a has a shape corresponding to the planar shape of the top pole chip 12a. Since the photoresist pattern 132a is formed with high accuracy as described above, the second mask 32a can be formed with high accuracy. A local-minimum uniform-width portion of the second mask 32a corresponding to the pole portion is also formed with high accuracy. The second mask 32a corresponds to a specific example of "a second mask" of the invention for functioning as "a metal film pattern" made of the plated film.

Figure 11:
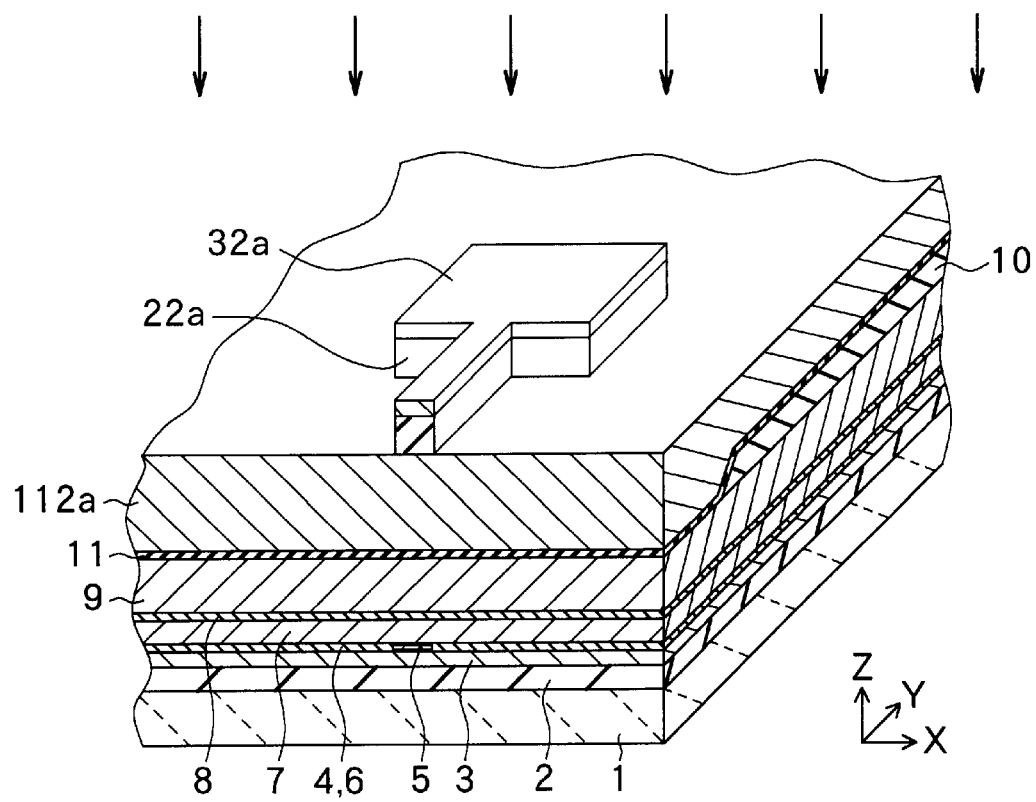
FIG. 11 is a perspective view for describing a step following the step of FIG. 10.
Figure 12:
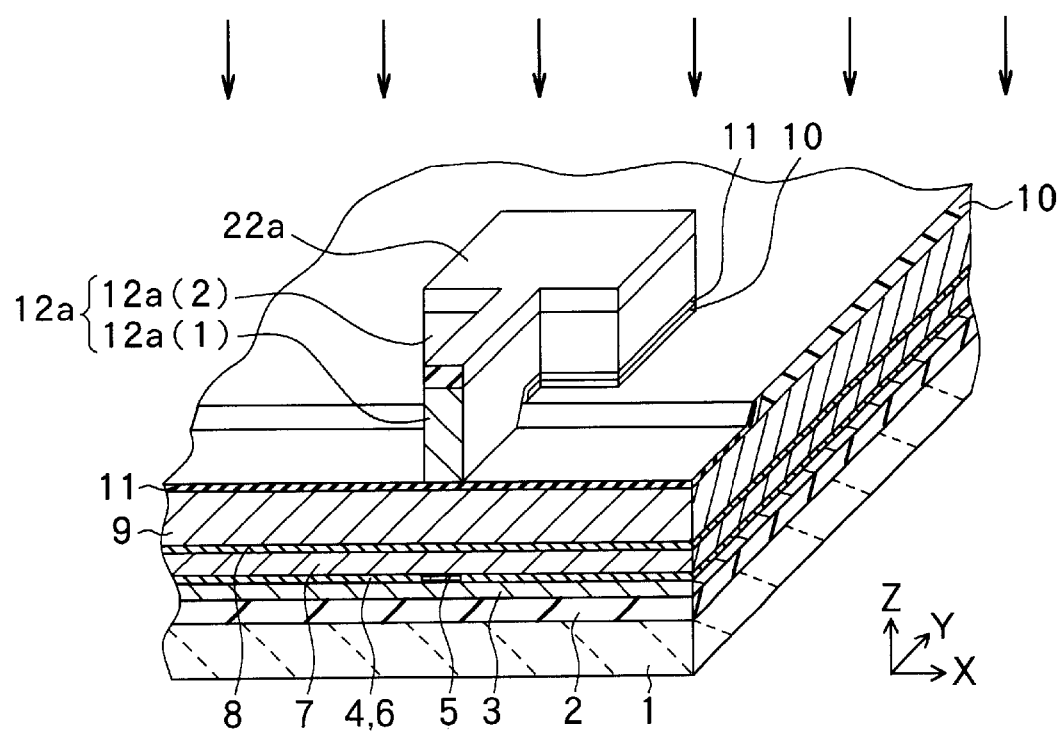
FIG. 12 is a perspective view corresponding to the cross sectional views shown in FIGS 4A and 4B.

Next, the first mask precursory layer 122a is selectively etched by, for example, RIE using the second mask 32a, and thus the first mask 22a made of alumina is formed as shown in FIG. 11. This etching process selectively removes a region of the first mask precursory layer 122a (not shown in FIG. 11) except a portion corresponding to the second mask 32a. The first mask 22a has a shape corresponding to the planar shape of the top pole chip 12a in the same manner as the second mask 32a. At the same time when the above-mentioned region of the first mask precursory layer 122a is etched, the second mask 32a itself is also etched and thus a film thickness of the second mask 32a decreases. The second mask 32a does not necessarily have to remain at the time of completion of formation of the first mask 22a, and the second mask 32a may disappear in the etching process.

For the etching process using RIE, it is preferable that a processing temperature is within a range of 50° C. to 300° C., and that gas containing at least one of chlorine ($Cl_2$), boron trichloride (BCl$_3$) and hydrogen chloride (HCl), and hydrogen (H$_2$), oxygen (O$_2$), nitrogen (N$_2$), argon (Ar) or the like is used as etching gas. Adoption of the above-mentioned conditions allows the etching process using RIE to be performed for a short time. Preferably, etching gas for etching the first mask precursory layer 122a by RIE contains at least one of chlorine and boron trichloride. When both chlorine and boron trichloride are used, it is preferable that the feed rates of chlorine and boron trichloride are, for example, about 20 ml/min to 40 ml/min (milliliter per minute) and about 60 ml/min to 80 ml/min, respectively. For example, it is preferable that pressure for etching is about 100 Pa to 400 Pa, and that output for etching has a radio frequency of about 30 W to 60 W or a microwave frequency of about 130 W. When the above-mentioned conditions are used, the first mask precursory layer 122a can be processed at a processing speed of about 200 nm/min.

Next, the top pole chip precursory layer 112a is selectively etched by RIE using the first mask 22a, and thus the top pole chip 12a made of iron nitride is formed as shown in FIGS. 4A and 4B and FIG. 12. This etching process selectively removes a region (excluding a portion to form the magnetic path connecting portion 12b) of the top pole chip precursory layer 112a (not shown in FIGS. 4A and 4B and FIG. 12) except a portion corresponding to the first mask 22a. In etching the top pole chip precursory layer 112a, for example, parts of both the insulating film pattern 10 and the write gap layer 11 corresponding to the above-mentioned region are also etched. The etching process is not necessarily limited to this case, and only the top pole chip precursory layer 112a may be etched by controlling etching conditions. Iron nitride, an amorphous alloy (a zirconium-cobalt-iron alloy) or the like is used as the material of the top pole chip precursory layer 112a, thereby avoiding redeposition of an etching product on a peripheral wall of a non-etched portion during etching using RIE. Thus, particularly, the end portion 12a(1) of the top pole chip 12a can be formed with high accuracy.

For etching the top pole chip precursory layer 112a by RIE, it is particularly preferable that a processing temperature is within a range of 150° C. to 250° C. When, for example, chlorine is used as etching gas, it is preferable that the feed rate of chlorine is, for example, 100 ml/min to 200 ml/min. As in the case of the second mask 32a, the first mask 22a may remain at the time of completion of formation of the top pole chip 12a (see FIGS. 4A and 4B and FIG. 12), or the first mask 22a may disappear in the etching process. The top pole chip 12a can be formed with high accuracy for a short time by using the above-described approach. The same approach as the approach for forming the top pole chip 12a is used to form the above-mentioned bottom pole 9, and thus the bottom pole 9 can be also formed with high accuracy for a short time.

The magnetic path connecting portion 12b is formed by the same approach as the approach for forming the top pole chip 12a, by using the other mask 22b (see FIG. 4A) that is formed of the same material as the material of the first mask 22a by the same step as the step of forming the first mask 22a.

Subsequently, the method of manufacturing a thin film magnetic head according to the embodiment will be described with reference to FIGS. 5B and 13.

Figure 13:
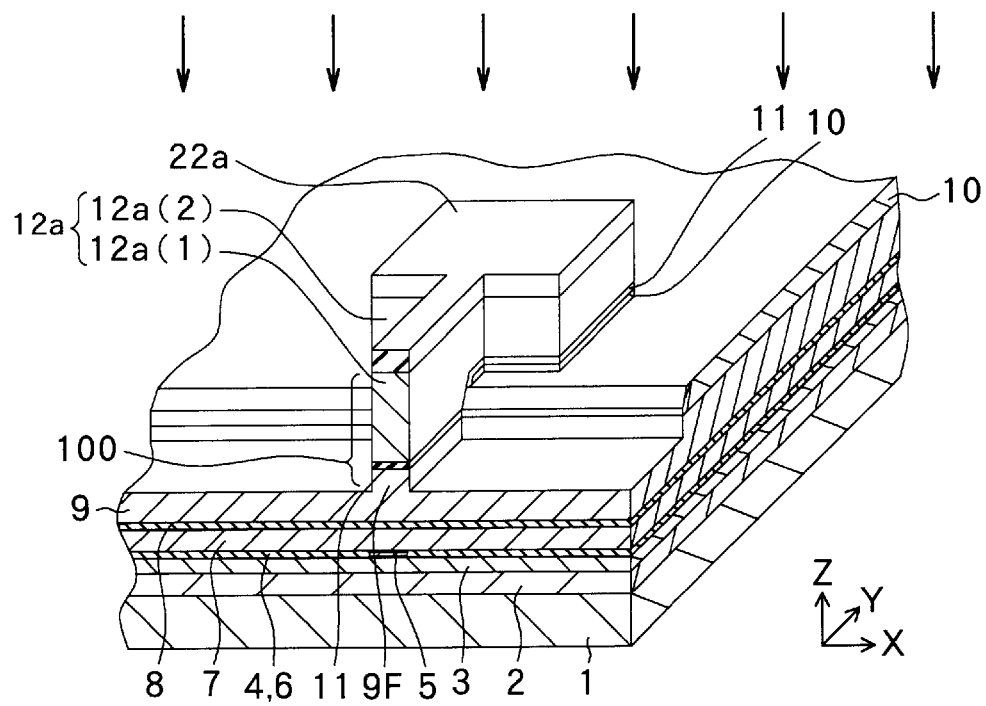
FIG. 13 is a perspective view corresponding to the cross sectional views shown in FIGS. 5A and 5B.

As shown in FIGS. 5B and 13, for example under the same conditions as the conditions under which the top pole chip 12a is formed, parts of both the write gap layer 11 and the bottom pole 9 are selectively etched by about 0.5 µm by means of RIE using as a mask the first mask 22a and a photoresist film (not shown) that is selectively formed in a more rearward region than the position of the most front end of the insulating film pattern 10. This etching process selectively removes regions of the write gap layer 11 and the bottom pole 9 except a portion corresponding to a frontward portion of the end portion 12a(1) of the top pole chip 12a (a more front portion than the position of the most front end of the insulating film pattern 10), and thus a pole portion 100 having a trim structure is formed. The pole portion 100 comprises the end portion 12a(1) of the top pole chip 12a, a portion (9F) of the bottom pole 9 corresponding to the end portion 12a(1), and a part of the write gap layer 11 sandwiched between the end portion 12a(1) and the portion 9F, and these portions have substantially the same width. The etching process using RIE enables the pole portion 100 to be formed with high accuracy for a short time. To perform the etching process using RIE in order to form the pole portion 100, for example, it is preferable that etching gas containing chlorine of about 20 to 40 ml/min and boron trichloride of about 60 to 80 ml/min be used.

Even if the first mask 22a is etched and thus disappears in the above-mentioned etching process using RIE, this does not become a problem. In this case, the top pole chip 12a itself functions as an etching mask for an underlayer region of the top pole chip 12a (the write gap layer 11 and the bottom pole 9). Since etching reduces a film thickness of the top pole chip 12a, it is preferable that the film thickness be rather great in previous consideration of the amount of reduction in the film thickness. The portion 9F corresponds to a specific example of "a second uniform-width portion" of the invention.

Next, as shown in FIG. 5A, an insulating film 13 made of, for example, alumina is formed with a thickness of about 0.3 µm to 0.5 µm over the overall surface.

Next, as shown in FIG. 5A, a first-layer thin film coil 14 made of, for example, copper (Cu) for an inductive recording head is selectively formed by, for instance, electroplating with a thickness of about 1.0 µm to 2.0 µm on the flat insulating film 13 in a more rearward region than a region in which the top pole chip 12a is provided (except a region in which the magnetic path connecting portion 12b is provided). The thin film coil 14 has a spiral planar structure shown in FIG. 15 to be described later, for example. The thin film coil 14 is, in part alone, shown in FIG. 5A. At the same time when the thin film coil 14 is formed, for example, a coil connecting portion 14s is integrally formed with the thin film coil 14 on the insulating film 13 at an inside terminal end of the thin film coil 14. The coil connecting portion 14s is a portion for electrically connecting the thin film coil 14 to a coil connecting portion 17sa (see FIG. 7A) to be formed in the following step. For example, the thin film coil 14 is formed in such a manner that the most front end of an outermost periphery portion of the thin film coil 14 is located by about 2.0 µm to 3.0 µm more rearward than the position of the most front end of the insulating film pattern 10. The first-layer thin film coil 14 corresponds to a specific example of "a first thin film coil layer" of the invention.

Next, as shown in FIG. 5A, an insulating film 15 is formed into a predetermined pattern between wirings of the thin film coil 14 (including the coil connecting portion 14s) and around the wirings by high-accuracy photolithography using a material exhibiting fluidity during heating, e.g., an organic insulating material such as a photoresist. To form the insulating film 15, the photoresist is subjected to heat treatment at a temperature of, for example, about 200° C., thereby allowing the photoresist to flow and fill up a gap between the windings of the thin film coil 14. The insulating film 15 may be formed in such a manner that the insulating film 15 does not coat top surfaces of both the thin film coil 14 and the coil connecting portion 14s (see FIG. 5A) or the insulating film 15 coats the top surfaces thereof.

Next, for example, an alumina layer is formed with a thickness of about 3.0 μm to 4.0 μm over the overall surface by, for instance, sputtering, and thus a region having a concave and convex structure comprising the top pole chip 12a, the magnetic path connecting portion 12b, the thin film coil 14, the coil connecting portion 14s and so on is filled with the alumina layer. After that, as shown in FIGS. 6A and 6B, the overall surface of the alumina layer is polished by, for example, CMP, and thus an insulating film 16 which the thin film coil 14 and so on are to be filled with is formed. In this case, the surface of alumina is polished until both the top pole chip 12a and the magnetic path connecting portion 12b are exposed. For example, the surface of alumina is polished in such a manner that a thickness of the polished top pole chip 12a is about 1.5 μm to 2.5 μm. An inorganic insulating material such as alumina is used as a material of the insulating film 16, and it is thus possible to prevent the occurrence of clogging of a polishing surface of a CMP polishing disc and to also make the polished surface smoother, as distinct from the case in which a soft insulating material such as a photoresist is used. The insulating films 15 and 16 correspond to a specific example of "a first insulating layer portion" of the invention.

Next, as shown in FIGS. 7A and 7B, the insulating film 16 coating the top surface of the coil connecting portion 14s is partly etched by, for example, RIE or ion milling, and thus an opening 16k for connecting the coil connecting portion 14s to the coil connecting portion 17sa to be formed in the following step is formed.

Next, as shown in FIGS. 7A and 7B, a second-layer thin film coil 17 made of, for example, copper (Cu) is selectively formed with a thickness of about 1.0 μm to 2.0 μm on the flattened insulating film 16 over the thin film coil 14 by electroplating having the same step as the step of forming the first-layer thin film coil 14. The thin film coil 17 has the same planar structure as the planar structure of the thin film coil 14. At the same time when the thin film coil 17 is formed, for example, the coil connecting portion 17sa is formed on the coil connecting portion 14s at an inside terminal end of the thin film coil 17, and a wiring connecting portion 17sb is formed on the insulating film 16 at an outside terminal end of the thin film coil 17. The coil connecting portion 17sa and the wiring connecting portion 17sb are integral with the thin film coil 17. The thin film coil 14 and the thin film coil 17 are electrically connected to each other through the coil connecting portions 14s and 17sa in the opening 16k and are also electrically connected to the wiring connecting portion 17sb. The second-layer thin film coil 17 corresponds to a specific example of "a second thin film coil layer" of the invention, and the wiring connecting portion 17sb corresponds to a specific example of "a first connecting pattern" of the invention.

Next, as shown in FIGS. 7A and 7B, an insulating film 18 is selectively formed between wirings of the thin film coil 17 (including the coil connecting portion 17sa and the wiring connecting portion 17sb) and around the wirings by using the same material and forming method (including heat treatment) as in the case of the insulating film 15. The insulating film 18 may be formed in such a manner that the insulating film 18 does not coat top surfaces of the thin film coil 17, the coil connecting portion 17sa and the wiring connecting portion 17sb (see FIG. 7A) or the insulating film 18 coats the top surfaces thereof.

Next, as shown in FIGS. 7A and 7B, an intermediate connecting portion 12c to form a part of the top pole 12 is selectively formed with a thickness of about 2.0 μm to 3.0 μm on a flat surface in a region from over the insulating film 16 to over the rear end portion 12a(2) of the top pole chip 12a by using the same material and forming method as in the case of the top pole chip 12a and the magnetic path connecting portion 12b, for example. The intermediate connecting portion 12c has a planar shape shown in FIG. 15 to be described later, for example. Structural features of the intermediate connecting portion 12c will be described later. The intermediate connecting portion 12c partly overlaps and is in contact with a part of the rear end portion 12a(2), and the intermediate connecting portion 12c is magnetically coupled to the part of the rear end portion 12a(2).

At the same time when the intermediate connecting portion 12c is formed, a magnetic path connecting portion 12d to form a part of the top pole 12 is formed on the magnetic path connecting portion 12b, and an intermediate connecting pattern 12e is formed on the wiring connecting portion 17sb. Since the thin film coil 17 is coated with the insulating film 18, damage or the like of the thin film coil 17 resulting from the etching process or the like for forming the intermediate connecting portion 12c or the like is avoided. The intermediate connecting pattern 12e is a pattern for electrically connecting the thin film coils 14 and 17 to a coil connecting wiring 12fh (see FIG. 8A) to be formed in the following step. A material and method for forming the magnetic path connecting portion 12d and the intermediate connecting pattern 12e are the same as in the case of the top pole chip 12a or the like. The same approach as in the case of the top pole chip 12a or the like is used as a method of forming the intermediate connecting portion 12c, the magnetic path connecting portion 12d and the intermediate connecting pattern 12e, and thus the above-mentioned portions can be formed with high accuracy in a short time. Preferably, for example, the intermediate connecting portion 12c is formed in such a manner that the most front end thereof is located by about 0.5 μm to 1.0 μm more rearward than the position of the most front end of the insulating film pattern 10. Preferably, for example, the intermediate connecting portion 12c is formed in such a manner that a front edge portion of the intermediate connecting portion 12c forms an inclined surface. Thus, the front edge portion of the intermediate connecting portion 12c is tapered. The intermediate connecting portion 12c corresponds to a specific example of "a third magnetic layer portion" of the invention, and the intermediate connecting pattern 12e corresponds to a specific example of "a second connecting pattern" of the invention. The thin film coils 14 and 17, the coil connecting portions 14s and 17sa, the wiring connecting portion 17sb and the intermediate connecting pattern 12e correspond to a specific example of "a thin film coil portion" of the invention.

Next, an insulating layer made of, for example, alumina is formed with a thickness of about 3.0 μm to 4.0 μm over the overall surface, and thereafter, as shown in FIGS. 8A and 8B, the overall surface of the alumina insulating layer is polished and flattened by, for example, CMP, whereby an insulating film 19 which the thin film coil 17 and so on are to be filled with is formed. In this case, the surface of the alumina insulating layer is polished until the intermediate connecting portion 12c, the magnetic path connecting portion 12d and the intermediate connecting pattern 12e are exposed. The insulating films 18 and 19 correspond to a specific example of "a second insulating layer portion" of the invention, and the insulating films 15, 16, 18 and 19 correspond to a specific example of "an insulating layer" of the invention.

Next, as shown in FIGS. 8A and 8B, a top yoke 12*f* to form a part of the top pole 12 is selectively formed with a thickness of about 2.0 μm to 3.0 μm in a region of a flattened region between the magnetic path connecting portion 12*d* and the intermediate connecting portion 12*c*. For example, the top yoke 12*f* has a planar shape shown in FIG. 15 to be described later, and includes a yoke portion 12*f*(1) extending on a region over the thin film coils 14 and 17, and a connecting portion 12*f*(2) extending so as to partly overlap a part of the intermediate connecting portion 12*c* in front of the yoke portion 12*f*(1). Structural features of the top yoke 12*f* will be described later. A rearward portion of the top yoke 12*f* is magnetically coupled to the bottom pole 9 through the magnetic path connecting portions 12*b* and 12*d* via the opening 10*k*, and a frontward portion of the top yoke 12*f* is magnetically coupled to the top pole chip 12*a* through the intermediate connecting portion 12*c*.

Figure 14:
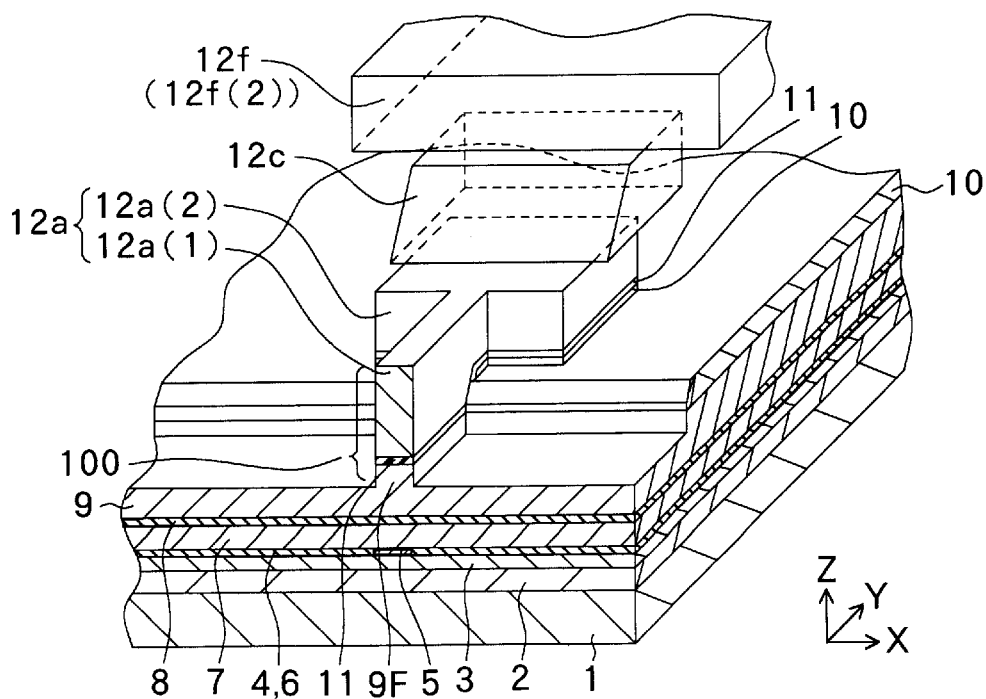
FIG. 14 is a perspective view corresponding to the cross sectional views shown in FIGS. 8A and 8B.

At the same time when the top yoke 12*f* is formed, the coil connecting wiring 12*fh* is formed in a region from over the intermediate connecting pattern 12*e* to an external circuit (not shown). The coil connecting wiring 12*fh* is provided to electrically connect the intermediate connecting pattern 12*e* to the external circuit (not shown). A material and method for forming the top yoke 12*f* and the coil connecting wiring 12*fh* are the same as in the case of the above-mentioned top pole chip 12*a* or the like. The use of this approach enables also forming the top yoke 12*f* and the coil connecting wiring 12*fh* with high accuracy in a short time. For example, the top yoke 12*f* is formed in such a manner that the most front end thereof is located more rearward than the position of a top end of a front edge surface of the intermediate connecting portion 12*c*, and that the position of the most rear end thereof substantially matches the positions of the most rear ends of the magnetic path connecting portions 12*b* and 12*d*. In this case, a three-dimensional structure around the connecting portion 12*f*(2) is as shown in FIG. 14. The top yoke 12*f* corresponds to a specific example of "a second magnetic layer portion" of the invention, and the coil connecting wiring 12*fh* corresponds to a specific example of "a conductive layer pattern" of the invention. The top pole 12 comprising the top pole chip 12*a*, the intermediate connecting portion 12*c*, the magnetic path connecting portions 12*b* and 12*d* and the top yoke 12*f* corresponds to a specific example of "a first magnetic layer" of the invention.

Next, as shown in FIGS. 8A and 8B, an overcoat layer 20 made of, for example, alumina is formed so as to coat the overall surface. Finally, an air bearing surface 80 of the recording head and the reproducing head is formed by machining and polishing, and, as a result, a thin film magnetic head is completed.

<Structure of Thin Film Magnetic Head>

Next, the structure of the thin film magnetic head according to the embodiment will be described with reference to FIG. 15.

Figure 15:
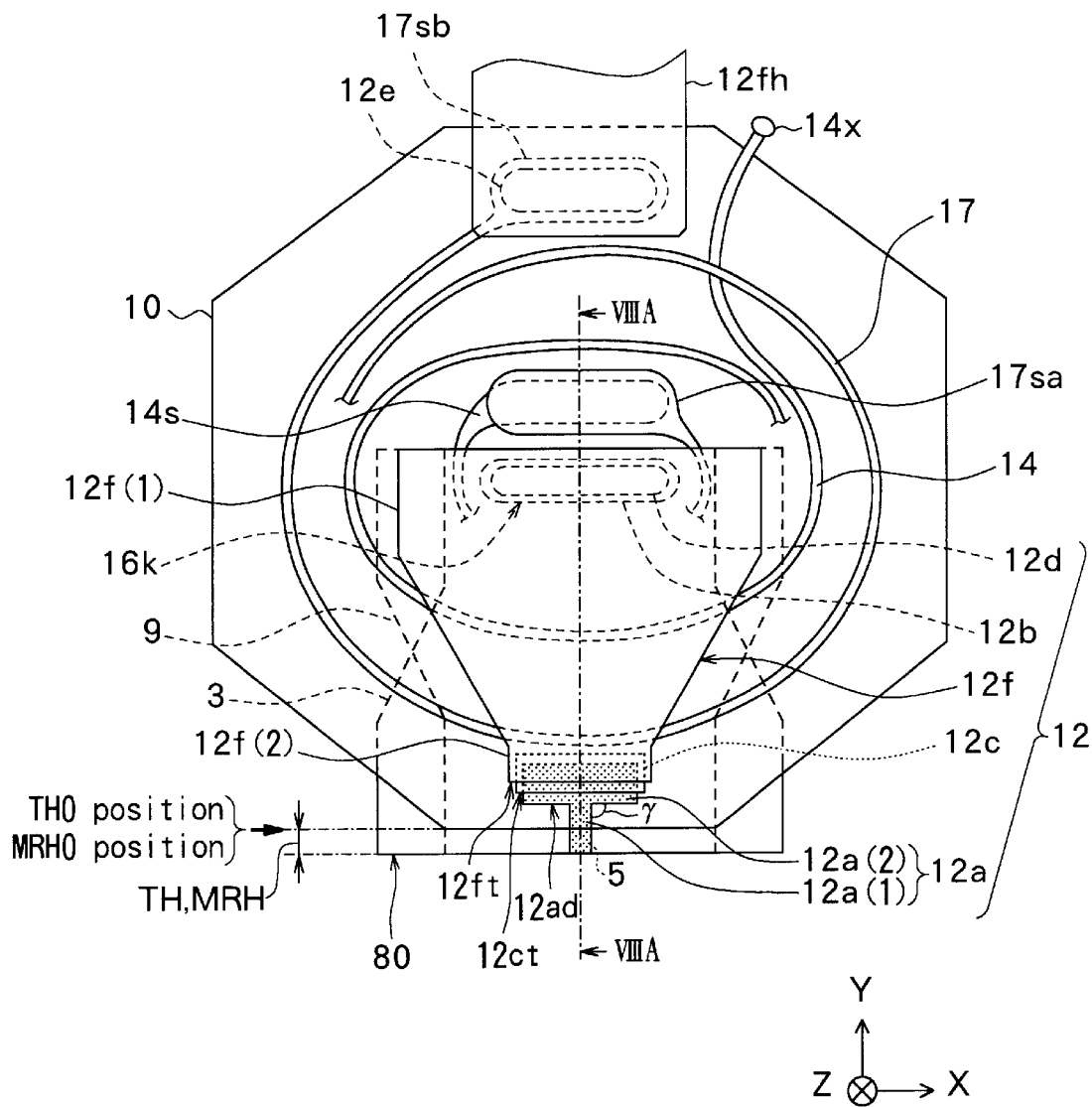
FIG. 15 is a plan view of a planar structure of a thin film magnetic head according to the first embodiment of the invention.

FIG. 15 shows a schematic representation of a planar structure of the thin film magnetic head manufactured by the method of manufacturing a thin film magnetic head according to the embodiment. The insulating films 15, 16, 18 and 19, the overcoat layer 20 and so on are not shown in FIG. 15. FIG. 15 shows the thin film coils 14 and 17 but shows their outermost periphery portions alone, and FIG. 15 shows the insulating film pattern 10 but shows its outermost end alone. FIG. 8A corresponds to a cross section viewed from the direction of the arrows along the line VIIIA—VIIIA of FIG. 15. The expressions about the X-axis, Y-axis and Z-axis directions in FIG. 15 are the same as the expressions in FIGS. 1A to 14.

As shown in FIG. 15, the position of the most front end of the insulating film pattern 10 is the position that is the reference position for determining the throat height (TH), i.e., the throat height zero position (the TH0 position). The throat height (TH) is defined as a length between the position (the TH0 position) of the most front end of the insulating film pattern 10 and the air bearing surface 80. "An MRH0 position" in FIG. 15 represents the position of the most rear end of the MR film 5, i.e., an MR height zero position. An MR height (MRH) refers to a length between the MR height zero position and the air bearing surface 80. For example, the throat height zero position (the TH0 position) substantially matches the MR height zero position (the MRH0 position).

For example, the top pole 12 comprises the top pole chip 12*a*, the intermediate connecting portion 12*c*, the magnetic path connecting portions 12*b* and 12*d* and the top yoke 12*f*, which are separately formed. In other words, the top pole 12 comprises a collection of these portions.

The top yoke 12*f* includes the yoke portion 12*f*(1) having a large area for containing a magnetic flux generated by the thin film coils 14 and 17, and the connecting portion 12*f*(2) having a uniform width smaller than the width of the yoke portion 12*f*(1). For example, the width of the yoke portion 12*f*(1) is substantially uniform at the rearward portion thereof, and is gradually narrower at the frontward portion thereof closer to the air bearing surface 80. For instance, the width of the connecting portion 12*f*(2) is greater than the width of the intermediate connecting portion 12*c* to be described later. However, the width of the connecting portion 12*f*(2) is not necessarily limited to this case, and, for example, the width of the connecting portion 12*f*(2) may be smaller than the width of the intermediate connecting portion 12*c*.

For example, the intermediate connecting portion 12*c* has a rectangular planar shape, and the width of the intermediate connecting portion 12*c* is greater than the width of the rear end portion 12*a*(2) of the top pole chip 12*a* to be described later. However, the width of the intermediate connecting portion 12*c* may be smaller than the width of the rear end portion 12*a*(2).

For example, the top pole chip 12*a* includes the end portion 12*a*(1) and the rear end portion 12*a*(2), and the end portion 12*a*(1) is closer to the air bearing surface 80 than the rear end portion 12*a*(2). The end portion 12*a*(1) and the rear end portion 12*a*(2) have rectangular planar shapes. The end portion 12*a*(1) has a substantially uniform width over the overall area thereof, and the width thereof delimits the write track width during recording. The width of the rear end portion 12*a*(2) is greater than the width of the end portion 12*a*(1). In other words, a step is formed in the width direction at a coupling portion between the end portion 12*a*(1) and the rear end portion 12*a*(2).

For example, a step surface 12*ad* of the step portion of the top pole chip 12*a* close to the rear end portion 12*a*(2) is located more rearward than the TH0 position (or the MRH0 position). For example, a front edge surface 12*ct* of the intermediate connecting portion 12*c* is located more rearward than the position of the step surface 12*ad*, and, for example, a front edge surface 12*ft* of the top yoke 12*f* is located more rearward than the position of the edge surface 12*ct*. That is, the intermediate connecting portion 12*c* and the top yoke 12*f* are arranged in such a manner that both of them are positioned far from the air bearing surface 80. The positions of the intermediate connecting portion 12*c* and the top yoke 12*f* are not necessarily limited to the above-mentioned case. For example, the position of the edge surface 12ct may match the position of the step surface 12ad, or the positions of both the edge surface 12ct and the edge surface 12ft may match the position of the step surface 12ad. The centers of the top yoke 12f, the intermediate connecting portion 12c and the top pole chip 12a match one another in the width directions thereof.

An angle γ of a corner portion at which a side edge surface of the end portion 12a(1) of the top pole chip 12a crosses the step surface 12ad is equal to 90 degrees, for example. The angle γ of the corner portion is not necessarily limited to this case, and, preferably, the angle γ is within a range of, for example, 90 degrees to 120 degrees. The angle γ is within the above-mentioned range, and thus the flow of a magnetic flux flowing from the rear end portion 12a(2) into the end portion 12a(1) can be smoothed. A portion of the first mask 22a (see FIG. 11) to be used to form the top pole chip 12a, which corresponds to the above-mentioned corner portion, has the same angle, whereby the top pole chip 12a can have the above-described structural features.

As shown in FIGS. 8A, 14 and 15, a front part of the top yoke 12f partly overlaps and is magnetically coupled to a part of the intermediate connecting portion 12c, and a part of the intermediate connecting portion 12c also partly overlaps and is magnetically coupled to a part of the rear end portion 12a(2) of the top pole chip 12a. On the other hand, as shown in FIGS. 8A and 15, a rearward part of the top yoke 12f is also magnetically coupled to the bottom pole 9 through the magnetic path connecting portions 12b and 12d in the opening 10k. In other words, the top pole 12 (the top pole chip 12a, the intermediate connecting portion 12c, the magnetic path connecting portions 12b and 12d and the top yoke 12f) is connected to the bottom pole 9, and thus a propagation path of a magnetic flux, i.e., a magnetic path is formed.

As shown in FIG. 15, both the thin film coils 14 and 17 comprise wirings having a spiral planar shape. The coil connecting portion 14s and a terminal 14x are formed at the inside terminal end of the thin film coil 14 and the outside terminal end thereof, respectively. Both the coil connecting portion 14s and the terminal 14x are integral with the thin film coil 14. The coil connecting portion 17sa and the wiring connecting portion 17sb are formed at the inside terminal end of the thin film coil 17 and the outside terminal end thereof, respectively. Both the coil connecting portion 17sa and the wiring connecting portion 17sb are integral with the thin film coil 17. The thin film coils 14 and 17 are electrically connected to each other through the coil connecting portions 14s and 17sa. The intermediate connecting pattern 12e is formed on the wiring connecting portion 17sb, and the thin film coils 14 and 17 are electrically connected to the coil connecting wiring 12fh through the wiring connecting portion 17sb and the intermediate connecting pattern 12e. Both the terminal 14x and a rear end portion (not shown) of the coil connecting wiring 12fh are connected to an external circuit (not shown), and the external circuit allows a current to pass through the thin film coils 14 and 17.

<Functions of Thin Film Magnetic Head>

Next, a function of the thin film magnetic head according to the embodiment will be described with reference to FIGS. 8A, 14 and 15.

Now, a basic operation of the thin film magnetic head, i.e., an operation for recording data on a recording medium and an operation for reproducing data from a recording medium will be briefly described.

In the thin film magnetic head according to the embodiment, when a current passes through the thin film coils 14 and 17 by an external circuit (not shown) at the time of the recording operation of information, a magnetic flux is generated in response to the current. The generated magnetic flux propagates through the top yoke 12f from the yoke portion 12f(1) to the connecting portion 12f(2), and propagates to the end portion 12a(1) via the intermediate connecting portion 12c magnetically coupled to the top yoke 12f and the rear end portion 12a(2) of the top pole chip 12a. The magnetic flux that propagates to the end portion 12a(1) further propagates and reaches to the end portion close to the air bearing surface 80, and thus the magnetic flux generates a signal magnetic field for recording to the outside near the write gap layer 11. The signal magnetic field allows a magnetic recording medium to be partly magnetized, thereby enabling information to be recorded on the magnetic recording medium.

For reproducing, a sense current is passed through the MR film 5 of the reproducing head. Since resistance of the MR film 5 changes in response to a reproducing signal magnetic field from the magnetic recording medium, information recorded on the magnetic recording medium can be read out by detecting a change in the resistance according to a change in the sense current.

<Functions and Effects of Method of Manufacturing Thin Film Magnetic Head>

Next, characteristic functions and effects of the method of manufacturing a thin film magnetic head according to the embodiment will be described with reference to FIGS. 9 to 13.

In the embodiment, as shown in FIG. 9, the first mask precursory layer 122a is formed on the top pole chip precursory layer 112a flattened by a polishing process. Thus, the surface of the first mask precursory layer 122a is flattened, even if the underlayer of the region in which the top pole chip precursory layer 112a is provided has a concave and convex structure. When photolithography is applied to the photoresist film formed on the flattened first mask precursory layer 122a, little light is reflected obliquely or transversely from the underlayer (the first mask precursory layer 122a) in a step of exposing, and thus the increase or reduction in the exposed region can be prevented. Moreover, the reflection itself of light from the underlayer during exposure can be prevented because the inorganic material having relatively low reflectance, such as alumina, is used as the material of the first mask precursory layer 122a. Therefore, more particularly, the opening 132x of the photoresist pattern 132a can be formed with high accuracy so that the local-minimum-width region 132x(1) corresponding to the end portion 12a(1) of the top pole chip 12a may be precisely uniform in the length direction and the thickness direction. As a result, the second mask 32a (see FIG. 10) and the first mask 22a (see FIG. 11) can be formed with high accuracy in the same manner, and, finally, the end portion 12a(1) of the top pole chip 12a (see FIG. 12) can be formed with high accuracy.

Moreover, in the embodiment, as shown in FIG. 12, the top pole chip 12a is formed by selectively etching and patterning the top pole chip precursory layer 112a (not shown in FIG. 12) (see FIG. 11) by means of RIE using the first mask 22a. In general, RIE has a high processing speed as compared to ion milling. For etching using RIE, chlorine gas is selected and a processing temperature is controlled so as to be within a range of 50° C. to 300° C., and thus etching conditions are optimized so as to promote reactivity of a chemical reaction during etching. Thus, the top pole chip 12a can be formed in a very short time as compared to the case of a conventional method using ion milling. The above-mentioned functions and effects are obtained also in the case of forming other magnetic layer portions (the bottom pole 9, the intermediate connecting portion 12c, the magnetic path connecting portions 12b and 12d and the top yoke 12f), the pole portion 100 (see FIG. 13) and so on by the same approach as the approach for forming the top pole chip 12a. The pole portion 100 is formed by RIE as described above, and thus a processing time can be reduced as compared to the case in which the end portion 12a(1) and the portion 9F are processed by ion milling and the write gap layer 11 is selectively removed by RIE.

Furthermore, in the embodiment, iron nitride, an amorphous alloy (a zirconium-cobalt-iron alloy) or the like is used as the material of the top pole chip precursory layer 112a, and the top pole chip precursory layer 112a made of this material is etched by RIE, whereby the top pole chip 12a can be formed with high accuracy. The above-mentioned functions and effects are obtained also in the case of forming other magnetic layer portions except the top pole chip 12a by using the same material and approach. More particularly, this permits avoiding a partial increase in the width of a non-etched portion due to redeposition of an etching product or a partial reduction in the width of a non-etched portion due to excessive etching resulting from a conventional method of processing a plated film made of Permalloy by ion milling, or the like. Consequently, as shown in FIG. 13, a pole width of the pole portion 100 can be made uniform over the thickness direction and the length direction.

As described above, according to the method of manufacturing a thin film magnetic head of the embodiment, the top pole chip precursory layer 112a is formed and thereafter the surface thereof is polished and flattened, thus the accuracy in forming the second mask 32a and the first mask 22a can be improved, and finally the top pole chip 12a can be formed with high accuracy.

Moreover, in the embodiment, the reflection itself of light from the underlayer (the first mask precursory layer 122a) in a step of photolithography for forming the photoresist pattern 132a can be also prevented because the inorganic material having relatively low reflectance, such as alumina, is used as the material of the first mask precursory layer 122a. Also in this respect, contribution is given to the improvement of the accuracy in forming the opening 132x.

Moreover, in the embodiment, the magnetic layer portions constituting the thin film magnetic head (the bottom pole 9, the top pole chip 12a, the intermediate connecting portion 12c, the magnetic path connecting portions 12b and 12d, the top yoke 12f and so on) are formed by RIE under appropriate conditions, and therefore the time required for forming can be reduced as compared to the case of the use of conventional ion milling. This advantage is similarly obtained also when the first mask 22a and the pole portion 100 having the trim structure are formed by RIE, and, as a result, the time required to manufacture the whole thin film magnetic head can be greatly reduced.

Moreover, in the embodiment, since iron nitride, an amorphous alloy (a zirconium-cobalt-iron alloy) or the like is used as the material of the above-mentioned magnetic material layer, few etching products are redeposited in a step of RIE and thus the magnetic layer portions can be formed with high accuracy. More particularly, since the pole width of the pole portion 100 including the end portion 12a(1) of the top pole chip 12a can be made uniform over the overall area, stable recording characteristics can be obtained and adaptation can be also made to the reduction of the pole width for improving a recording density.

Moreover, in the embodiment, since the inorganic material having a low etching rate, such as alumina, is used as the material of the first mask 22a for patterning the top pole chip precursory layer 112a, the amount of etching of the first mask 22a itself can be reduced as compared to the case in which a soft material having a high etching rate, such as a photoresist film, is used as the material of the first mask 22a. As a result, loss in the thickness of the top pole chip 12a to be finally formed can be reduced. The above-mentioned effect is similarly obtained also in the case of the magnetic path connecting portion 12b to be formed by using the other mask 22b made of alumina, or the like.

Moreover, in the embodiment, the first mask 22a is formed by RIE, and thus the time required to form the first mask 22a can be reduced as compared to the case in which ion milling is used. Also in this respect, contribution is given to the reduction of the time required to manufacture the whole thin film magnetic head.

Moreover, in the embodiment, as shown in FIG. 7A, the intermediate connecting pattern 12e is provided on the wiring connecting portion 17sb so that the position of a top surface of the intermediate connecting pattern 12e may be higher than the positions of top surfaces of both the intermediate connecting portion 12c and the magnetic path connecting portion 12d. Thus, when these portions are coated with alumina and thereafter a surface of alumina is polished in order to form the insulating film 19, the intermediate connecting pattern 12e as well as both the intermediate connecting portion 12c and the magnetic path connecting portion 12d can be exposed. Thus, the step of forming an opening by removing a part of the insulating film 19 in order to connect the wiring connecting portion 17sb to the coil connecting wiring 12fh is unnecessary, as distinct from the case in which the intermediate connecting pattern 12e is not formed. Moreover, a new step for forming the intermediate connecting pattern 12e is not necessary, because the intermediate connecting pattern 12e is formed by the same step as the step of forming the intermediate connecting portion 12c and the magnetic path connecting portion 12d. Therefore, the number of manufacturing steps can be reduced.

Moreover, in the embodiment, an organic insulating material such as a photoresist exhibiting fluidity during heating is used as the material of the insulating films 15 and 18 to be filled between the wirings of both the thin film coil 14 (including the coil connecting portion 14s) and the thin film coil 17 (including the coil connecting portion 17sa and the wiring connecting portion 17sb). Therefore, the above-mentioned material can fill up the gap between the wirings of the thin film coils 14 and 17 or the like and thus can ensure that the windings are insulated from one another, as distinct from the case in which an inorganic insulating material such as alumina not exhibiting fluidity during heating is used.

Moreover, in the embodiment, as shown in FIGS. 4A and 12, parts of both the insulating film pattern 10 and the write gap layer 11 are also etched when the top pole chip precursory layer 112a is selectively etched by RIE in order to form the top pole chip 12a. Thus, the position of a surface of a region in which the thin film coil 14 is provided is lower than the position of a bottom surface of the rear end portion 12a(2) of the top pole chip 12a. Thus, the insulating film 16 having a sufficient thickness exists over the thin film coil 14, and therefore the insulating film 16 can ensure that the thin film coil 14 is insulated from the thin film coil 17 to be formed in the following step.

Moreover, in the embodiment, the angle of a portion of the first mask 22a corresponding to the corner portion at which the side edge surface of the end portion 12a(1) of the top pole chip 12a crosses the step surface 12ad is within a range of 90 degrees to 120 degrees, and thus the angle γ of the corner portion of the formed top pole chip 12a can be within the same range. Thus, the flow of a magnetic flux traveling from the rear end portion 12a(2) of the top pole chip 12a toward the end portion 12a(1) thereof can be smoothed.

Moreover, in the embodiment, the inclined surface is formed near the front edge of the insulating film pattern 10, and thus the flow of a magnetic flux through the top pole chip 12a in a region over the inclined surface portion can be smoothed.

Moreover, in the embodiment, the front edge surface of the intermediate connecting portion 12c forms the inclined surface, and thus the flow of a magnetic flux flowing from the intermediate connecting portion 12c into the top pole chip 12a can be smoothed.

In the embodiment, iron nitride, an amorphous alloy (a zirconium-cobalt-iron alloy) or the like is used as the material of the magnetic material layer for forming each of the magnetic layer portions constituting the thin film magnetic head, but, besides these materials, Permalloy or the like, for example, may be used. When Permalloy is used as the material of the magnetic material layer, it is preferable that the percentage of content of nickel (Ni) in the composition of Permalloy be 45% or less, for example. Redeposition of an etching product during the etching process using RIE can be prevented by reducing the percentage of content of nickel in the composition.

Moreover, in the embodiment, sputtering is used as the method of forming the first mask precursory layer 122a, but the method is not necessarily limited to this embodiment. Preferably, for example, CVD (Chemical Vapor Deposition), particularly, LP (Low pressure)-CVD is used. The use of this method allows the first mask precursory layer 122a to be more precisely formed, and enables reducing an etching rate during etching.

Moreover, in the embodiment, electroplating is used to form the bottom shield layer 3 and the top shield layer 7, but the method is not necessarily limited to this embodiment. For example, sputtering may be used to form both the bottom shield layer 3 and the top shield layer 7, or either the bottom shield layer 3 or the top shield layer 7. In this case, besides the above-mentioned Permalloy, iron nitride may be used as the material of the bottom shield layer 3 and the top shield layer 7. Thus, the use of the same approach as in the case of the top pole chip 12a or the like enables forming the bottom shield layer 3 and the top shield layer 7 with high accuracy in a short time. Also in this respect, contribution is given to the reduction of the time required to manufacture the whole thin film magnetic head.

Moreover, in the embodiment, the top shield layer 7 and the bottom pole 9 are separately formed and the insulating film 8 is provided between the top shield layer 7 and the bottom pole 9, but the method is not necessarily limited to this embodiment. For example, no insulating film 8 may be provided between the top shield layer 7 and the bottom pole 9. In this case, the top shield layer 7 and the bottom pole 9 may be integrally formed into a single layer.

Moreover, in the embodiment, the end portion 12a(1) of the top pole chip 12a and the portion 9F of the bottom pole 9 that constitute the pole portion 100 are continuously formed, but the method is not necessarily limited to this embodiment. For example, the portion 9F may be formed immediately after forming the bottom pole 9.

Moreover, in the embodiment, a photoresist is used as the material of the insulating films 15 and 18, but the material is not necessarily limited to this embodiment. For example, a polyimide resin, SOG (Spin on glass) or the like exhibiting fluidity during heating similarly to the photoresist may be used.

Moreover, in the embodiment, alumina is used as the material of the write gap layer 11 and sputtering is used as the approach for forming the write gap layer 11, but the material and approach are not necessarily limited to this embodiment. Besides alumina, an inorganic insulating material such as aluminum nitride (AlN), silicon oxide or silicon nitride may be used as the material of the write gap layer 11, or nonmagnetic metal such as tantalum (Ta), titanium-tungsten (WTi) or titanium nitride (TiN) may be used as the material. Besides sputtering, CVD (Chemical Vapor Deposition) may be used as the method of forming the write gap layer 11. Forming the write gap layer 11 by using this method enables preventing the gap layer from containing a pinhole or the like, and thus enables avoiding the leakage of a magnetic flux through the write gap layer 11. This effect is beneficial, particularly when the thickness of the write gap layer 11 is reduced.

Moreover, in the embodiment, the coil connecting portions 14s and 17sa are provided at the inside terminal ends of the thin film coils 14 and 17, respectively, and the wiring connecting portion 17sb is provided at the outside terminal end of the thin film coil 17, but the positions of the above-mentioned portions are not necessarily limited to this embodiment. For example, the positions of the coil connecting portions 14s and 17sa may be changed from the inside to the outside, or the position of the wiring connecting portion 17sb may be changed from the outside to the inside. In this case, it is preferable that, in addition to the change of the position of the wiring connecting portion 17sb, the positions of the intermediate connecting pattern 12e and the coil connecting wiring 12fh are changed in the same manner.

<Modification 1-1>

Figure 16:
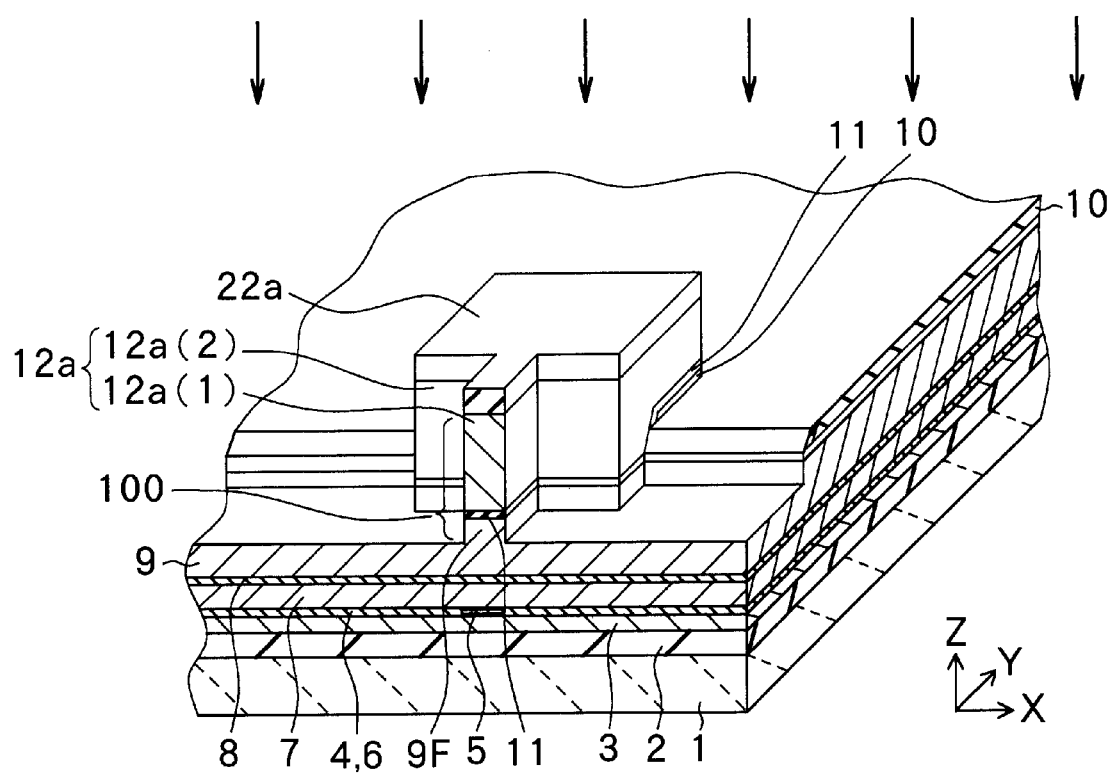
FIG. 16 is a perspective view of a modification of a peripheral portion around a pole portion of the thin film magnetic head according to the first embodiment of the invention.

In the embodiment, as shown in FIG. 13, a coupling position between the end portion 12a(1) of the top pole chip 12a and the rear end portion 12a(2) thereof is located more rearward than the position of the most front end of the insulating film pattern 10, but the coupling position is not necessarily limited to this embodiment. For example, as shown in FIG. 16, the above-mentioned coupling position may be shifted frontward. In this case, since the length of the end portion 12a(1) can be reduced and the rear end portion 12a(2) having higher magnetic volume than magnetic volume of the end portion 12a(1) can be closer to the air bearing surface (forward in FIG. 16), overwrite characteristics can be improved. In FIG. 16, the structural features of the top pole chip 12a and so on except the above-mentioned respect are the same as the structural features shown in FIG. 13.

<Modification 1-2>

Figures 17A, 17B:
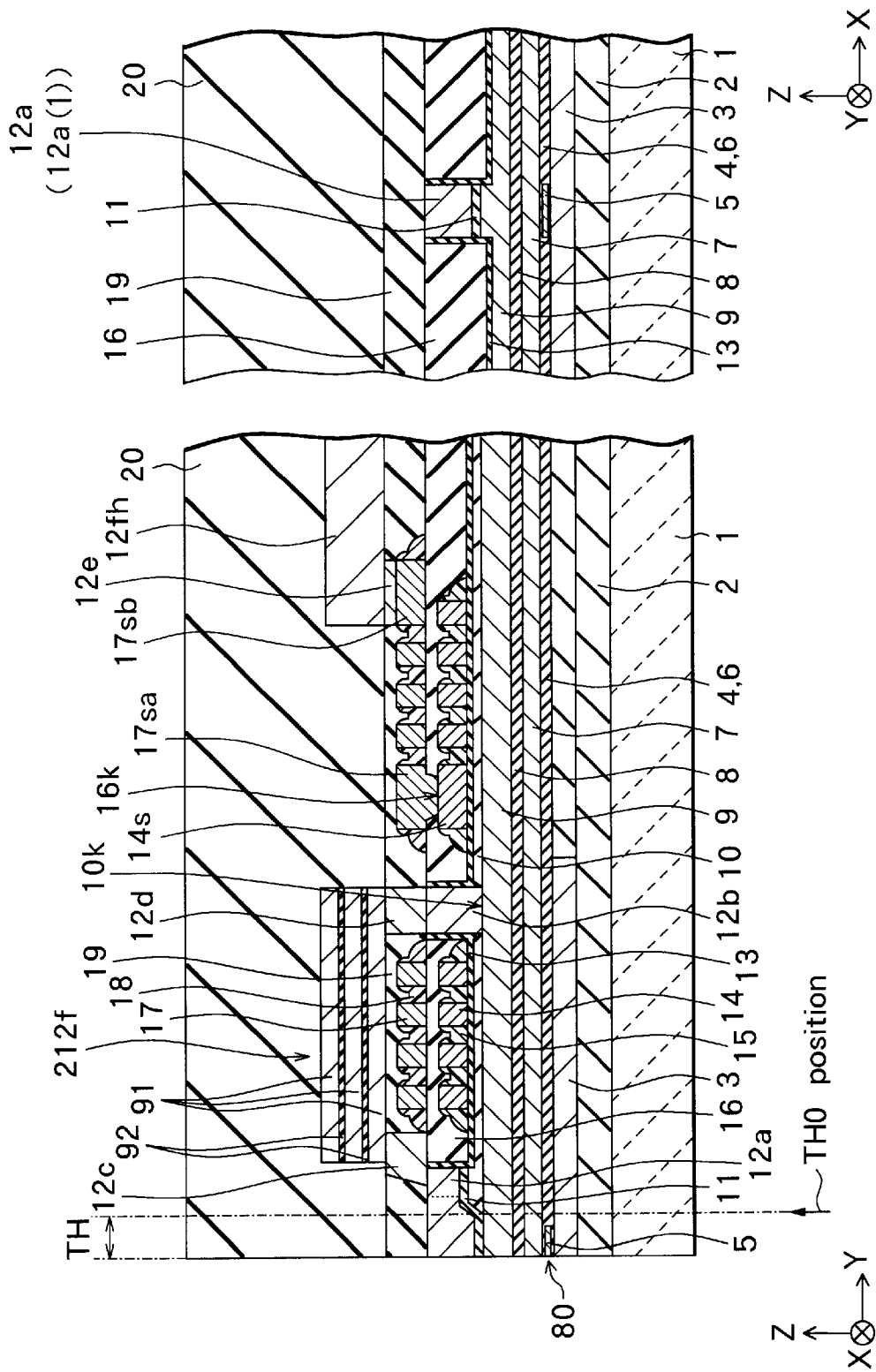
FIGS. 17A and 17B are cross sectional views of a modification of a top yoke of the thin film magnetic head according to the first embodiment of the invention.

In the embodiment, the description is given with regard to the case in which the top yoke (12f) has a single-layer structure of iron nitride, but the top yoke is not necessarily limited to this embodiment. For example, as shown in FIGS. 17A and 17B, a top yoke (212f) may have a stacked structure comprising a high saturation magnetic flux density material layer 91 such as iron nitride alternating with an inorganic insulating material layer 92 such as alumina. The top yoke having this structure allows preventing an eddy current from being generated in the magnetic path, and enables improving radio frequency characteristics. Both the high saturation magnetic flux density material layer 91 and the inorganic insulating material layer 92 are also formed by RIE, and thus the time required for forming can be reduced. In FIGS. 17A and 17B, the portions except for the top yoke 212f are the same as the above-mentioned portions shown in FIGS. 8A and 8B.

Moreover, in the embodiment, the second mask (32a) is formed as the plated film by electroplating, but the second mask is not necessarily limited to this embodiment. With reference to FIGS. 18 to 21, the description is given below with regard to the case in which the second mask is formed by using methods other than electroplating. In FIGS. 18 to 21, the same parts as the elements shown in FIG. 9 are indicated by the same reference numerals, and the description thereof is appropriately omitted.

<Modification 1-3>

Figure 18:
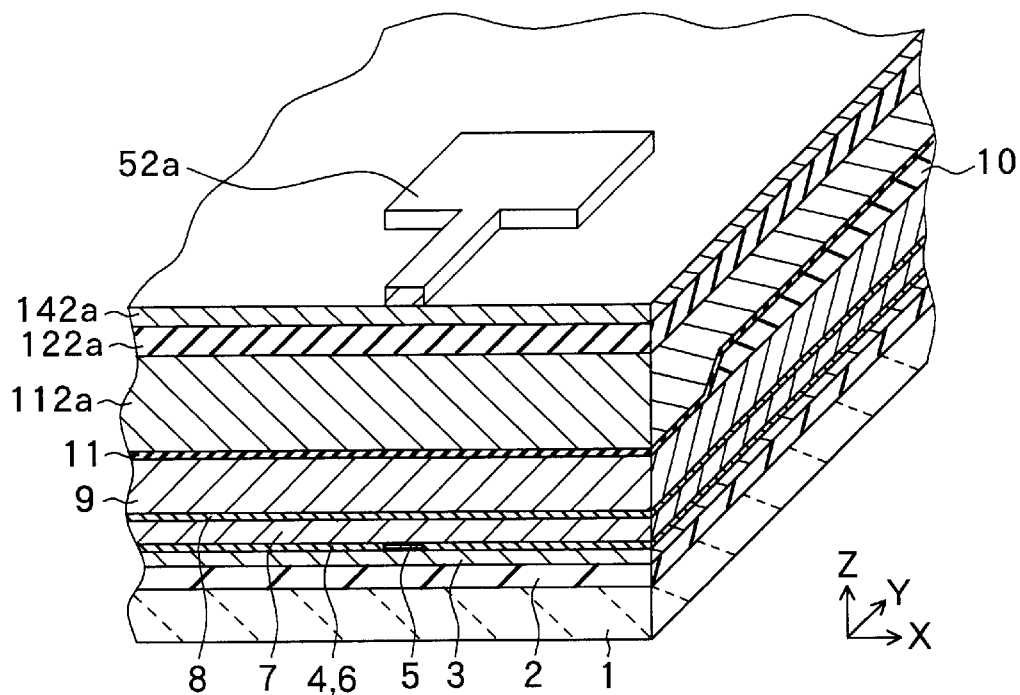
FIG. 18 is a perspective view for describing a modification of a method of forming a second mask of the first embodiment of the invention.
Figure 19:
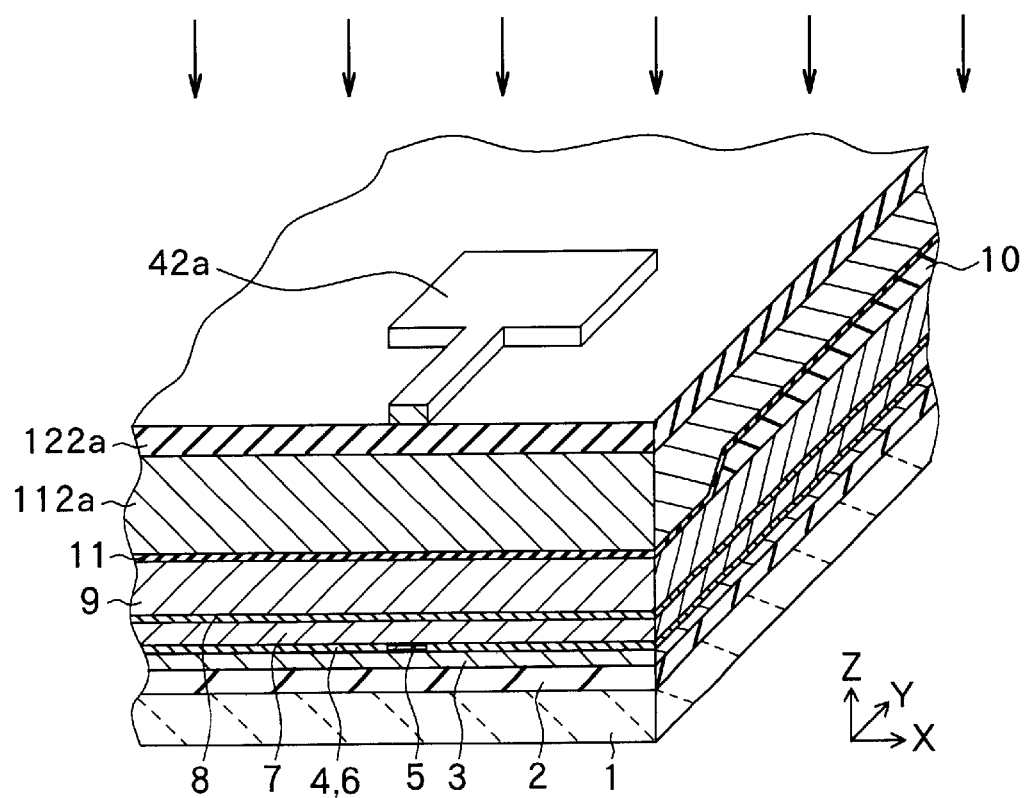
FIG. 19 is a perspective view for describing a step following the step of FIG. 18.

FIGS. 18 and 19 are perspective views for describing a third modification of the embodiment. In the modification, first, as shown in FIG. 18, a second mask precursory layer 142a made of, for example, iron nitride is formed on the first mask precursory layer 122a by sputtering, for instance. Then, a third mask 52a made of, for example, a photoresist film is provided at a predetermined position on the second mask precursory layer 142a, and the second mask precursory layer 142a is selectively etched by, for example, RIE or ion milling using the third mask 52a as an etching mask, whereby a second mask 42a is formed as shown in FIG. 19. The third mask 52a has a shape corresponding to the planar shape of the top pole chip 12a. Since the steps after the step of forming the second mask 42a are the same as the steps of the above-described embodiment, the description thereof is omitted. Also when the second mask 42a is used, the same effects as the effects of the above-described embodiment can be obtained. Metal other than iron nitride (e.g., Permalloy or the like) may be used as a material of the second mask precursory layer 142a. In this case, the second mask precursory layer 142a may be formed by plating the overall surface with Permalloy or the like by means of electroplating. The second mask precursory layer 142a corresponds to a specific example of "a metal layer" of the invention, and the second mask 42a corresponds to a specific example of "a second mask" of the invention for functioning as "a metal film pattern" to be formed by selectively etching the metal layer.

<Modification 1-4>

Figure 20:
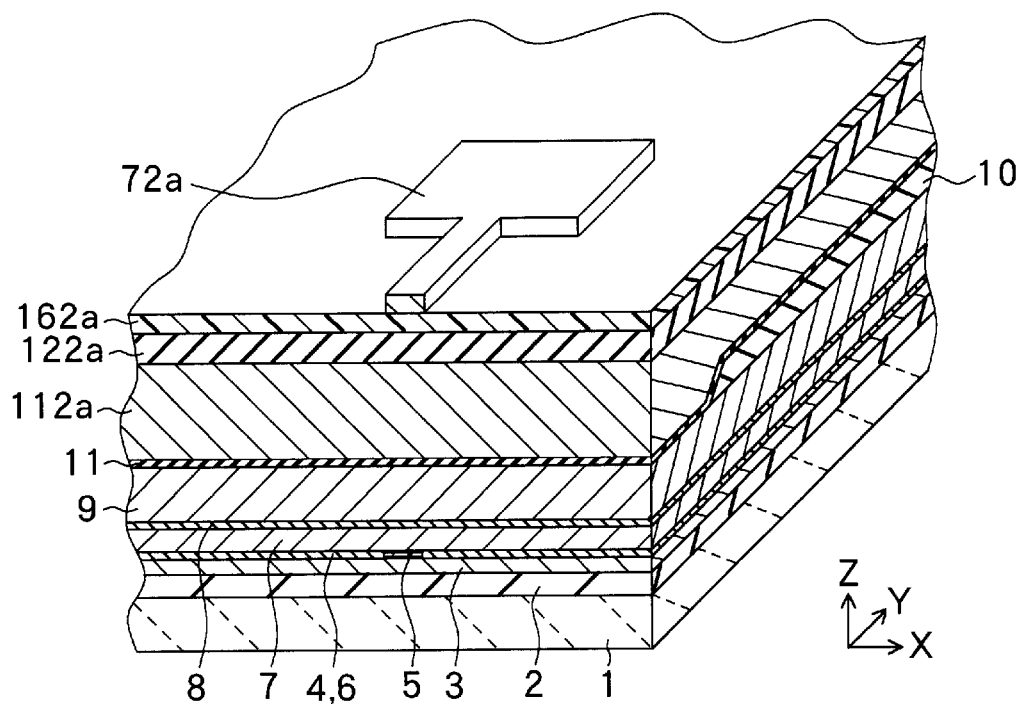
FIG. 20 is a perspective view for describing another modification of the method of forming a second mask of the first embodiment of the invention.
Figure 21:
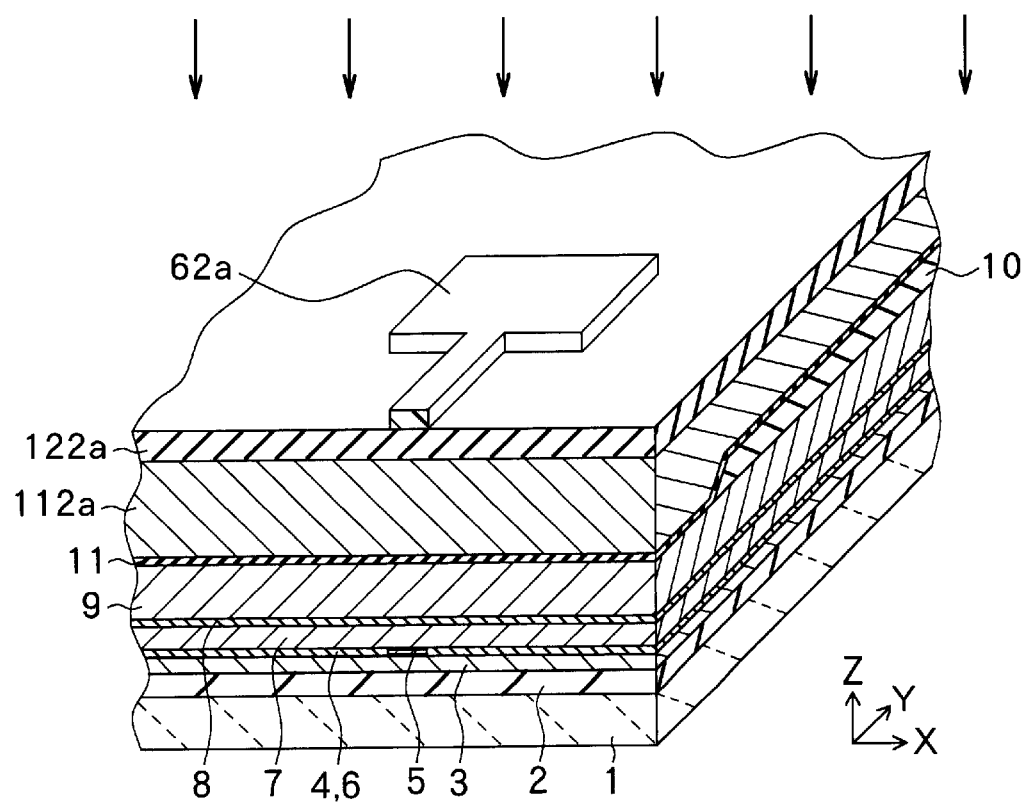
FIG. 21 is a perspective view for describing a step following the step of FIG. 20.

FIGS. 20 and 21 are perspective views for describing a fourth modification of the embodiment. In the modification, first, as shown in FIG. 20, a second mask precursory layer 162a made of, for example, a photoresist film is formed on the first mask precursory layer 122a. Then, a third mask 72a is provided at a predetermined position on the second mask precursory layer 162a, and the second mask precursory layer 162a is selectively etched and patterned by, for example, RIE or ion milling using the third mask 72a as an etching mask, whereby a second mask 62a is formed as shown in FIG. 21. The third mask 72a has a shape corresponding to the planar shape of the top pole chip 12a. Since the steps after the step of forming the second mask 62a are the same as the steps of the above-described embodiment, the description thereof is omitted. Also when the second mask 62a is used, the same effects as the effects of the above-described embodiment can be obtained. The etching process does not necessarily have to be used to pattern the second mask precursory layer 162a, and, for example, photolithography may be used. The second mask 62a corresponds to a specific example of "a second mask" of the invention for functioning as "a photoresist film pattern".

<Modification 1-5>

Figure 22:
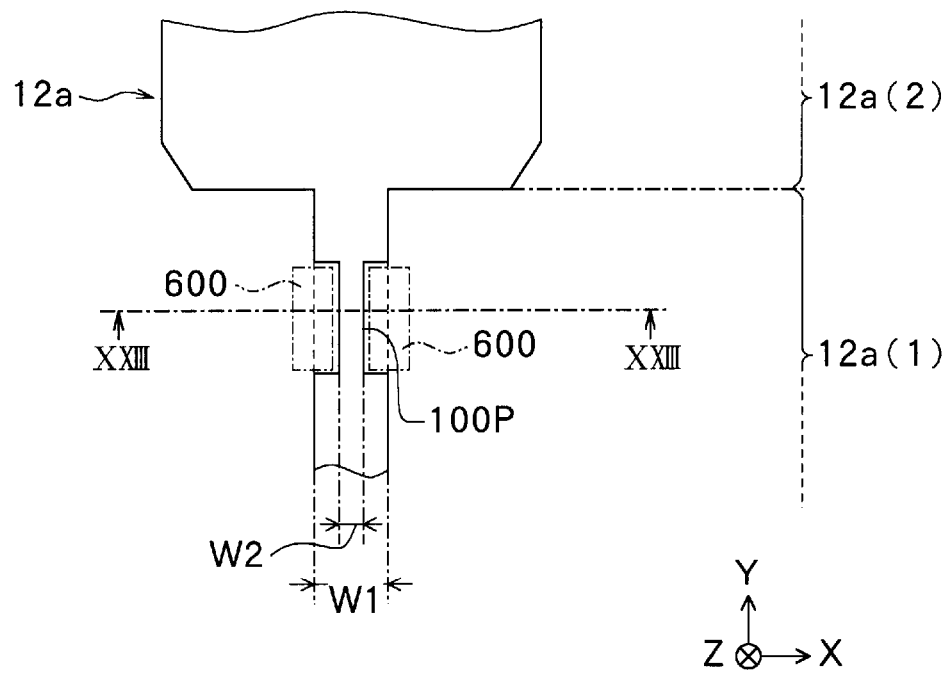
FIG. 22 is a plan view of an enlarged representation of a peripheral portion around a pole portion, for describing a modification of a method of forming the pole portion.
Figure 23:
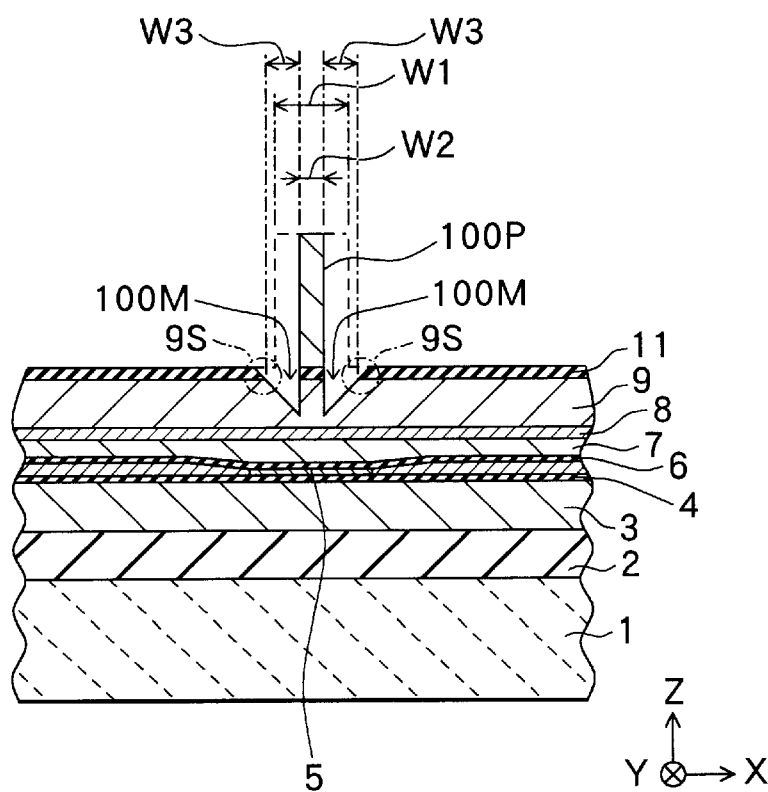
FIG. 23 is a cross sectional view corresponding to the plan view shown in FIG. 22.
Figure 24:
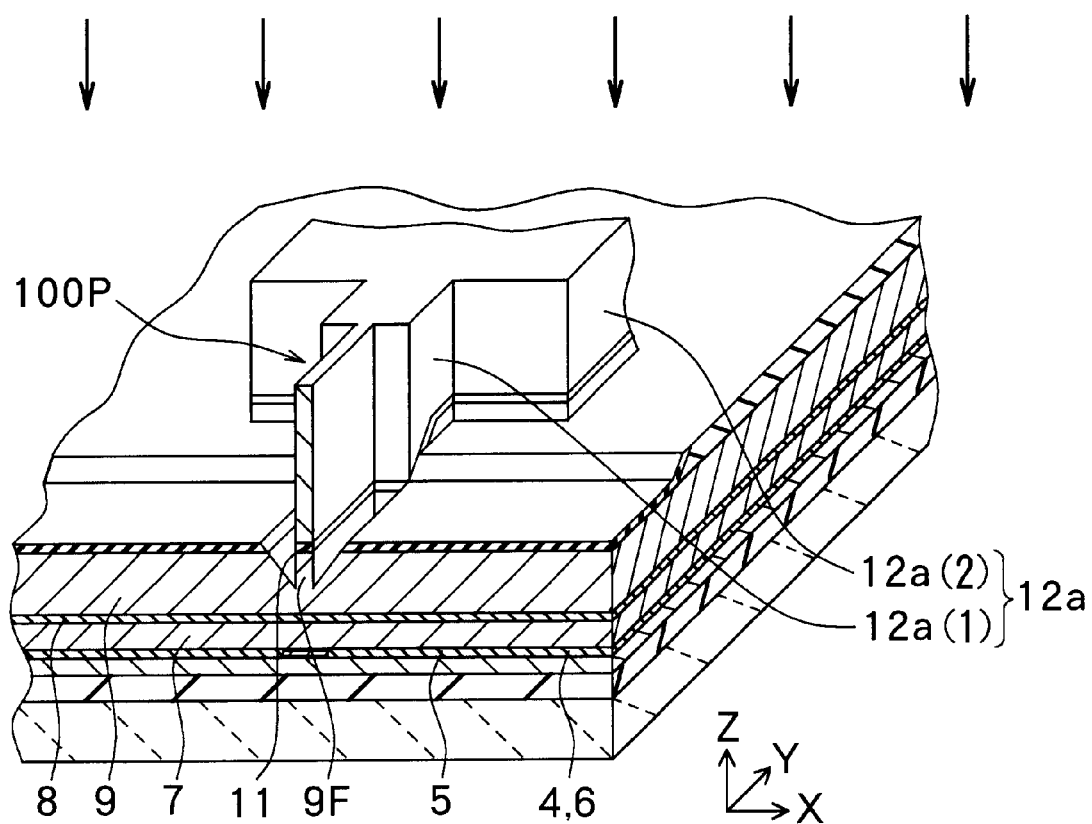
FIG. 24 is a perspective view corresponding to the cross sectional view shown in FIG. 23.

In the above-described embodiment, as shown in FIGS. 5B and 13, the pole portion 100 is formed by only the etching process using RIE, but the approach for forming the pole portion 100 is not necessarily limited to this embodiment. The limit of the minimum pole width that can be formed by using this approach is about 0.3 $\mu$m, and an attempt to make the pole width smaller than 0.3 $\mu$m causes considerable deterioration in the accuracy in processing the pole portion 100. For example, as shown in FIGS. 22 to 24, a method using the etching process using RIE in combination with an etching process using FIB (Focused Ion Beam) is effective for a method of realizing a pole width of 0.3 $\mu$m or less (a pole portion 100P). FIG. 22 shows an enlarged representation of a planar structure of the pole portion 100P under etching and a peripheral region around the pole portion 100P. FIG. 23 shows a sectional structure of the etched pole portion 100P and the peripheral region around the etched pole portion 100P. FIG. 24 shows an enlarged representation of a perspective structure of the etched pole portion 100P and the peripheral region around the etched pole portion 100P. FIGS. 22 to 24 show a step following the step of the above-described embodiment shown in FIG. 12. In FIGS. 22 to 24, the same parts as the elements of the above-described embodiment shown in FIG. 12 are indicated by the same reference numerals. The descriptions about the X-axis, Y-axis and Z-axis directions in FIGS. 22 to 24 are the same as in the case of the above-described embodiment. In FIG. 22, the top pole chip 12a is shown, but only a part of the rear end portion 12a(2) of the top pole chip 12a and the end portion 12a (1) thereof are shown, and the other portions thereof are not shown. FIG. 23 corresponds to a cross section viewed from the direction of the arrows along the line XXIII—XXIII of FIG. 22.

To form the pole portion 100P by using the etching process using RIE in combination with the etching process using FIB, the top pole chip 12a (the width of the end portion 12a(1)=W1, W1≧0.3 $\mu$m) is first formed by the etching process using RIE. Then, as shown in FIG. 22, the etching process using FIB takes place within, for example, a region 600 shown in FIG. 22, whereby a portion of the end portion 12a(1) corresponding to the region 600 is removed, and, in succession to this process, portions of both the write gap layer 11 and the bottom pole 9 corresponding to the region 600 are also removed. Thus, the pole portion 100P having the trim structure is formed. As shown in FIG. 23, the pole portion 100P formed by the above-described etching process has a width W2 (W2<0.3 $\mu$m) which is smaller than the width W1, that is, the pole width can be further narrowed and reduced. Moreover, the pole width is uniform with high accuracy over the thickness direction and the length direction.

At this time, both the write gap layer 11 and the bottom pole 9 in a region corresponding to the region 600 are deeply grooved, and a groove portion 100M having, for example, a V-shaped sectional structure is formed in the bottom pole 9, in particular. For the etching process using FIB, it is preferable that a width W3 of the groove portion 100M be about 1 $\mu$m or more on a top surface portion of the bottom pole 9. The width W3 of the groove portion 100M is about 1 $\mu$m or more in order to prevent the occurrence of side erase resulting from an influence of a part (a portion 9S) of the bottom pole 9 during recording. In this case, a three-dimensional structure is as shown in FIG. 24. Thus, the pole width is narrowed and reduced with high accuracy, and thus higher-density, more stable recording characteristics can be obtained. To use the etching process using RIE in combination with the etching process using FIB, the pole portion 100 may be narrowed by FIB so as to have the pole width W2, after forming the pole portion 100 having the pole width W1 by RIE. The step of forming the insulating film 13 and the following steps are the same as the step of forming the same part (the insulating film 13) of the above-described embodiment shown in FIGS. 5A and 5B and the following steps thereof.

[Second Embodiment]

Next, a second embodiment of the invention will be described.

Figures 25A, 25B:
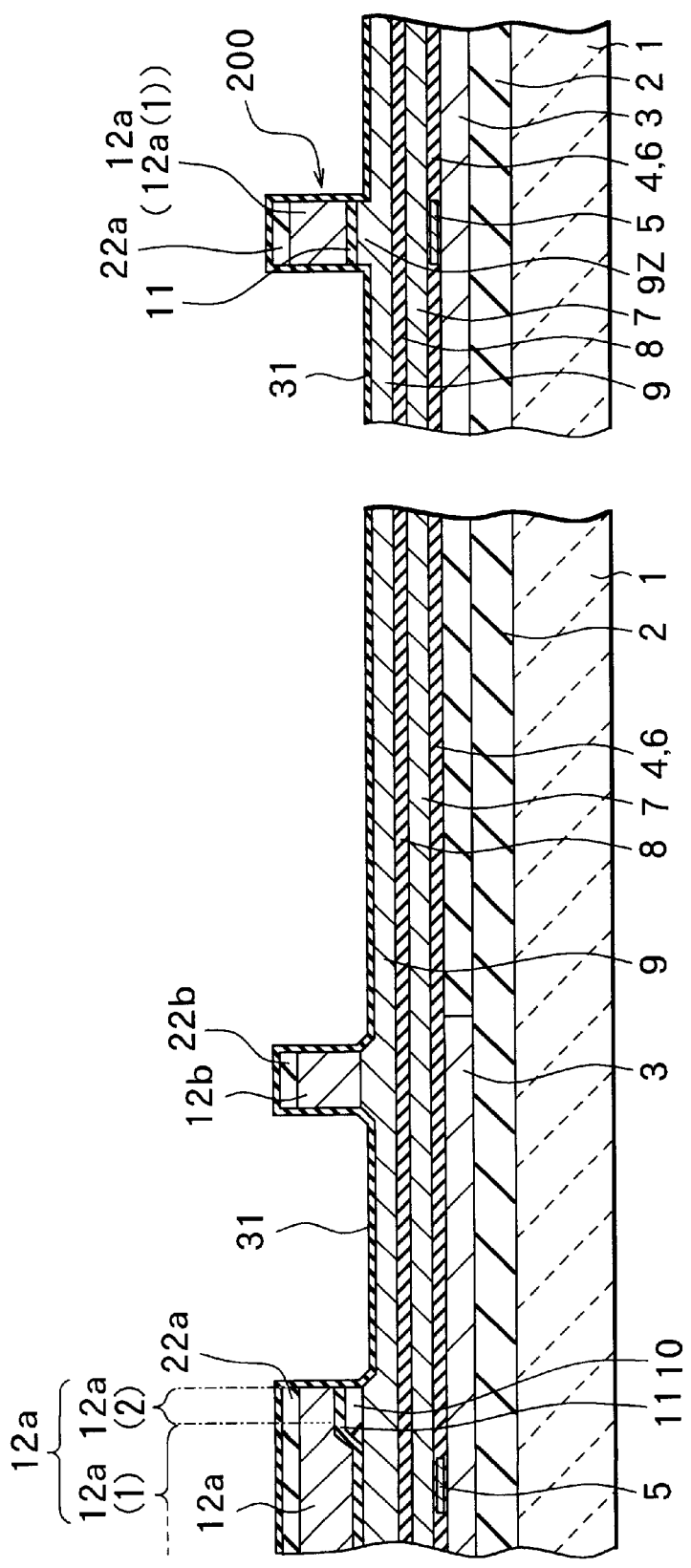
FIGS. 25A and 25B are cross sectional views for describing a step of a method of manufacturing a thin film magnetic head according to a second embodiment of the invention.
Figures 26A, 26B:
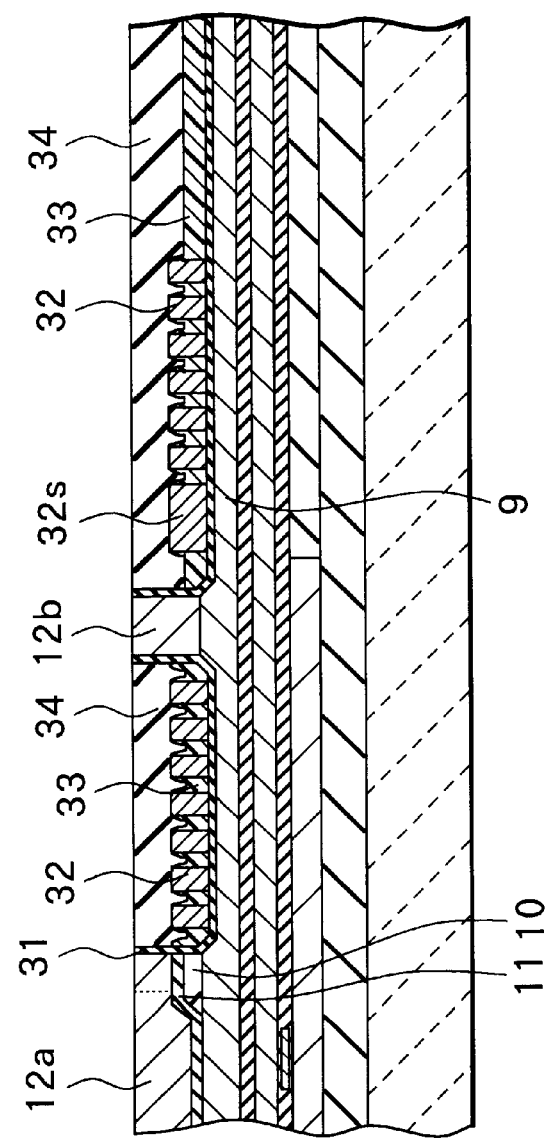
FIGS. 26A and 26B are cross sectional views for describing a step following the step of FIGS. 25A and 25B.
Figures 27A, 27B:
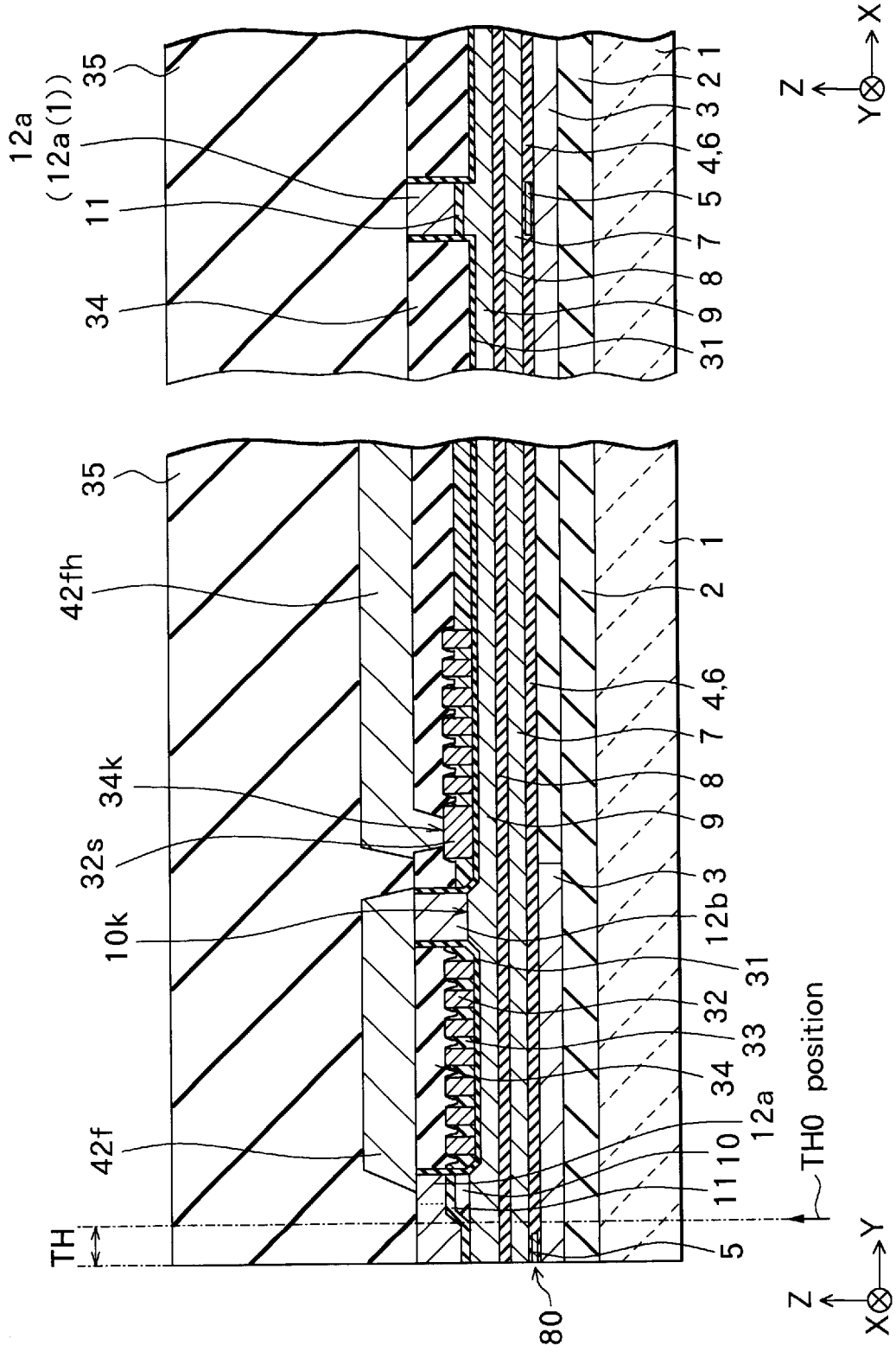
FIGS. 27A and 27B are cross sectional views for describing a step following the step of FIGS. 26A and 26B.
Figure 28:
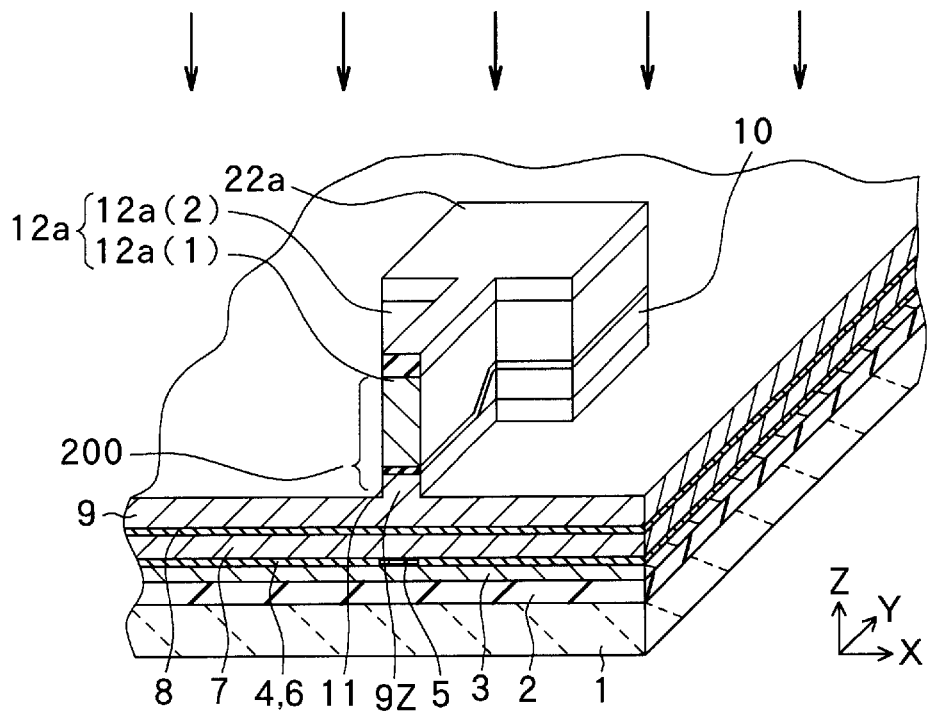
FIG. 28 is a perspective view corresponding to the cross sectional views shown in FIGS. 25A and 25B.
Figure 29:
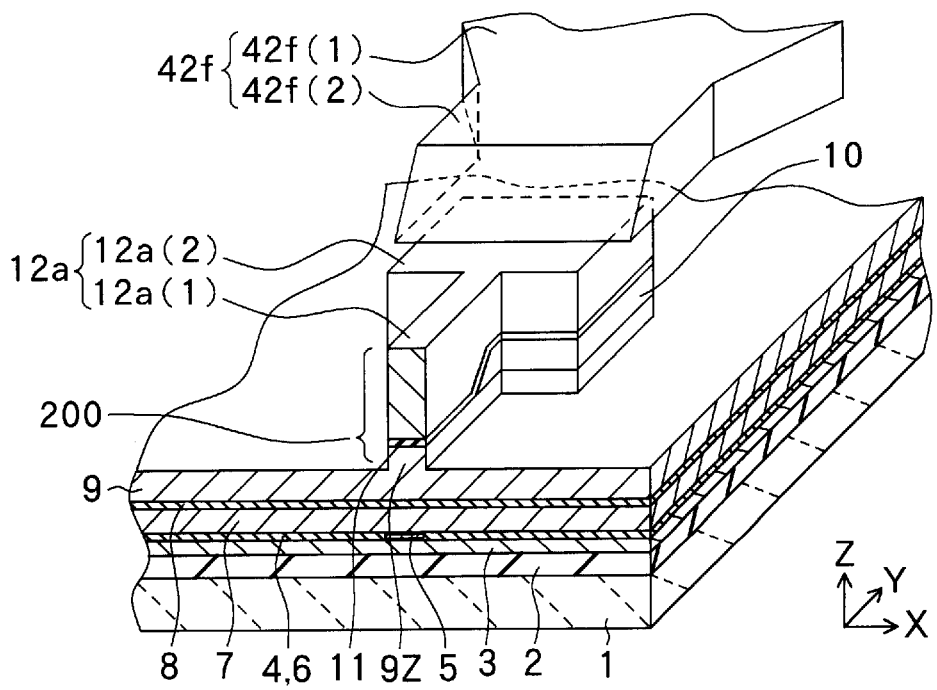
FIG. 29 is a perspective view corresponding to the cross sectional views shown in FIGS. 27A and 27B.

Firstly, the description is given with reference to FIGS. 25A to 29 with regard to a method of manufacturing a composite thin film magnetic head as a method of manufacturing a thin film magnetic head according to the second embodiment of the invention. Since a thin film magnetic head according to the embodiment is embodied by the method of manufacturing a thin film magnetic head according to the embodiment, the thin film magnetic head will be described in conjunction with the method of manufacturing a thin film magnetic head. FIGS. 25A, 26A and 27A show a cross section perpendicular to an air bearing surface, and FIGS. 25B, 26B and 27B show a cross section of a pole portion parallel to the air bearing surface. FIGS. 28 and 29 are perspective views corresponding to main manufacturing steps. FIG. 28 corresponds to a state shown in FIGS. 25A and 25B, and FIG. 29 corresponds to a state shown in FIGS. 27A and 27B. An insulating film 31 and so on shown in FIGS. 25A and 25B are not shown in FIG. 28, and a thin film coil 32, insulating films 33 and 34, an overcoat layer 35 and so on shown in FIGS. 27A and 27B are not shown in FIG. 29. The expressions about the X-axis, Y-axis and Z-axis directions in FIGS. 25A to 29 are the same as in the case of the above-described first embodiment. In FIGS. 25A to 29, the same parts as the elements of the above-described first embodiment are indicated by the same reference numerals.

In the method of manufacturing a thin film magnetic head according to the second embodiment, the step of forming the top pole chip 12a and the magnetic path connecting portion 12b shown in FIGS. 25A and 25B and the previous steps are the same as the step of the above-described first embodiment shown in FIGS. 4A and 4B and the previous steps, and thus the description thereof is omitted.

In the second embodiment, after forming the top pole chip 12a and the magnetic path connecting portion 12b, as shown in FIGS. 25A and 25B and FIG. 28, a pole portion 200 having the trim structure is formed by performing dry etching using RIE using both the first mask 22a and the other mask 22b as masks as in the case of forming the pole portion 100 of the above-described first embodiment. This etching process selectively removes the respective parts of the write gap layer 11, the insulating film pattern 10 and the bottom pole 9 in a region excluding portions corresponding to both the masks, and, more particularly, the position of a surface of the bottom pole 9 in an etched region is lower than the position of a surface of the bottom pole 9 in a non-etched region. The use of the etching process using RIE enables forming the pole portion 200 with higher accuracy in a shorter time, as compared to the case of the use of ion milling. The pole portion 200 comprises the end portion 12a(1) of the top pole chip 12a, a portion (9Z) of the bottom pole 9 corresponding to the end portion 12a(1), and the respective parts of the write gap layer 11 and the insulating film pattern 10 sandwiched between the end portion 12a(1) and the portion 9Z, and these portions have the same width. For example, the bottom pole 9 is etched by about 0.3 μm to 0.5 μm to form the pole portion 200. The portion 9Z corresponds to a specific example of "a second uniform-width portion" of the invention.

Next, as shown in FIGS. 25A and 25B, an insulating film 31 made of, for example, alumina is formed with a thickness of about 0.3 μm to 0.5 μm.

Next, as shown in FIGS. 26A and 26B, a thin film coil 32 made of, for example, copper (Cu) for an inductive recording head is formed by, for instance, electroplating with a thickness of about 1.0 μm to 2.0 μm on the flat insulating film 31 in a more rearward region than a region in which the top pole chip 12a is provided (except a region in which the magnetic path connecting portion 12b is provided). For example, the thin film coil 32 has the same structural features as the structural features of the thin film coil 14 of the above-described first embodiment. At the same time when the thin film coil 32 is formed, for example, a coil connecting portion 32s is integrally formed with the thin film coil 32 on the insulating film 31 at the inside terminal end of the thin film coil 32. The thin film coil 32 corresponds to "a first thin film coil layer" of the invention, and the thin film coil 32 and the coil connecting portion 32s correspond to a specific example of "a thin film coil portion" of the invention.

Next, as shown in FIGS. 26A and 26B, an insulating film 33 made of, for example, a photoresist is formed into a predetermined pattern between wirings of the thin film coil 32 (including the coil connecting portion 32s) and around the wirings by high-accuracy photolithography. A method of forming the insulating film 33 (including heat treatment) is the same as the method of forming the insulating film 15 of the above-described first embodiment. Then, for example, alumina is deposited with a thickness of about 3.0 μm to 4.0 μm over the overall surface by, for instance, sputtering, and thereafter the overall surface of alumina is polished until both the top pole chip 12a and the magnetic path connecting portion 12b are exposed. Thus, an insulating film 34 which the thin film coil 32 and so on are to be filled with is formed.

Next, as shown in FIGS. 27A and 27B, the insulating film 34 coating the top surface of the coil connecting portion 32s is partly etched by, for example, RIE or ion milling, and thus an opening 34k for connecting the coil connecting portion 32s to a coil connecting wiring 42fh to be formed in the following step is formed.

Next, as shown in FIGS. 27A and 27B and FIG. 29, a top yoke 42f to form a part of a top pole 42 is selectively formed with a thickness of about 2.0 μm to 3.0 μm in a region from over the magnetic path connecting portion 12b to over the rear end portion 12a(2) of the top pole chip 12a. At the same time when the top yoke 42f is formed, the coil connecting wiring 42fh (not shown in FIG. 29) is selectively formed in a region from over the opening 34k to the rearward portion.

The top yoke 42f and the coil connecting wiring 42fh are formed by the same approach as the approach for forming the top pole chip 12a or the like of the above-described first embodiment. That is, first, an iron nitride layer is formed over the overall surface by sputtering, and thereafter a surface of the iron nitride layer is polished and flattened by CMP, for example. Subsequently, a mask (not shown in FIGS. 27A and 27B) made of a plated film formed by, for example, frame plating is provided at a predetermined position on the surface of the iron nitride layer, and the iron nitride layer is patterned by RIE under predetermined conditions. The use of this approach enables forming the above-mentioned mask with high accuracy and also enables forming the top yoke 42f and the coil connecting wiring 42fh with high accuracy in a short time. FIGS. 27A and 27B show the case in which the above-mentioned mask itself is etched and disappears by the etching process for forming the top yoke 42f and so on. For example, the top yoke 42f has a planar shape shown in FIG. 30 to be described later. Structural features of the top yoke 42f will be described later. For example, the top yoke 42f is formed in such a manner that the most front end thereof is located by about 0.5 μm to 1.0 μm more rearward than the position (the TH0 position) of the most front end of the insulating film pattern 10 and that the top yoke 42f is tapered at least near the front end thereof. The top yoke 42f corresponds to a specific example of "a second magnetic layer portion" of the invention, and the top pole 42 comprising the top pole chip 12a, the magnetic path connecting portion 12b and the top yoke 42f corresponds to a specific example of "a first magnetic layer" of the invention.

Next, as shown in FIGS. 27A and 27B, the overcoat layer 35 made of, for example, alumina is formed so as to coat the overall surface, and thereafter the air bearing surface 80 is formed by machining and polishing. As a result, the thin film magnetic head according to the embodiment is completed.

Figure 30:
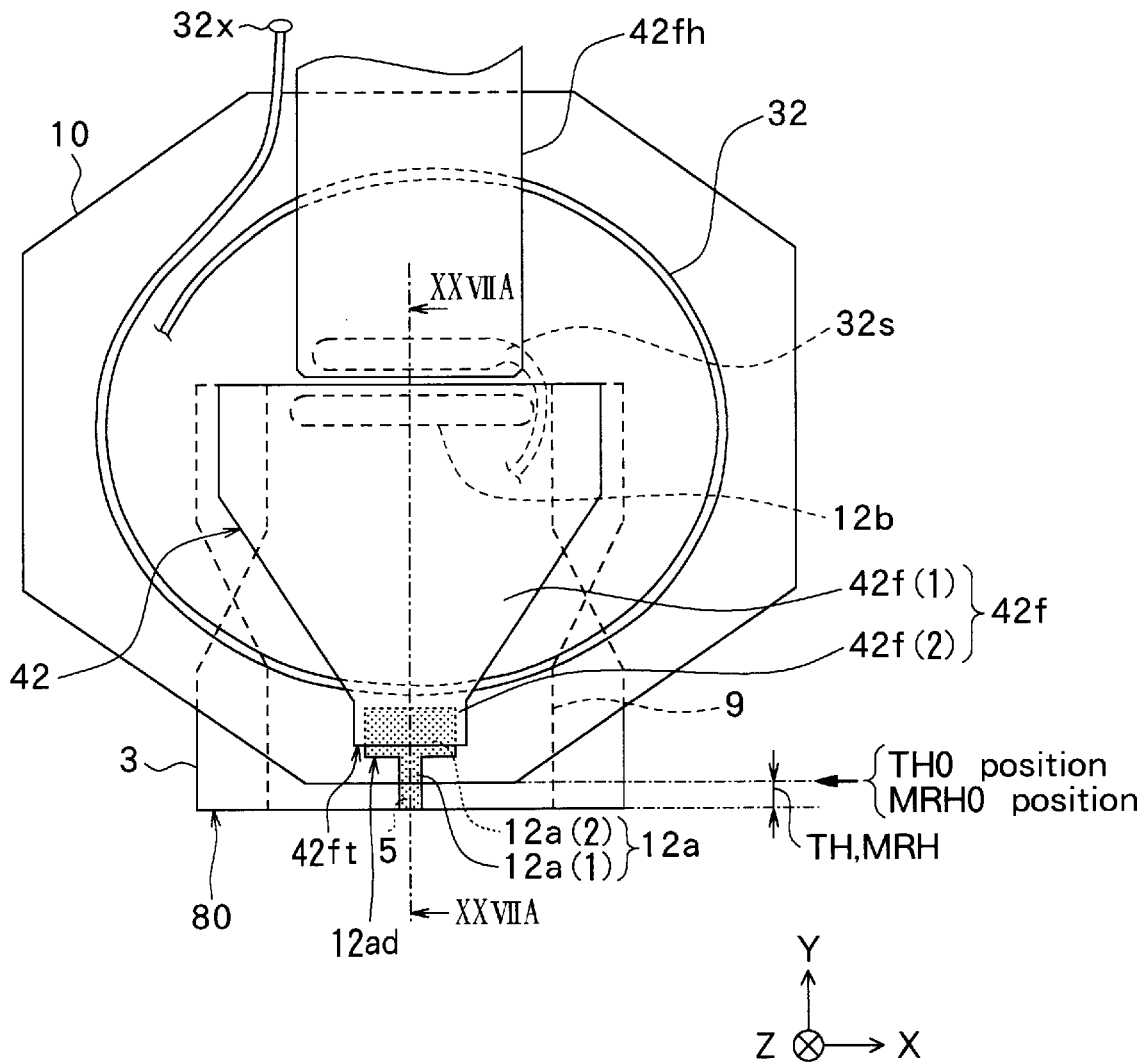
FIG. 30 is a plan view of a planar structure of a thin film magnetic head according to the second embodiment of the invention.

FIG. 30 shows a schematic representation of a planar structure of the thin film magnetic head manufactured by the method of manufacturing a thin film magnetic head according to the embodiment. In FIG. 30, the same parts as the elements of the above-described first embodiment shown in FIG. 15 are indicated by the same reference numerals. The insulating films 33 and 34, the overcoat layer 35 and so on are not shown in FIG. 30. FIG. 30 shows the thin film coil 32 but shows its outermost periphery portion alone. FIG. 27A corresponds to a cross section viewed from the direction of the arrows along the line XXVIIA—XXVIIA of FIG. 30.

As shown in FIG. 30, for example, the top pole 42 comprises the top pole chip 12a, the magnetic path connecting portion 12b and the top yoke 42f, which are separately formed. The top yoke 42f has the same planar shape as the planar shape of the top yoke 12f of the above-described first embodiment and includes a yoke portion 42f(1) and a connecting portion 42f(2) corresponding to the yoke portion 12f(1) and the connecting portion 12f(2) of the top yoke 12f, respectively. For example, a front edge surface 42f t of the top yoke 42f is located more rearward than the position of the step surface 12a d of the top pole chip 12a.

As shown in FIGS. 27A, 29 and 30, the top yoke 42f is magnetically coupled to the bottom pole 9 through the magnetic path connecting portion 12b in the opening 10k, and also partly overlaps and is magnetically coupled to a part of the rear end portion 12a(2) of the top pole chip 12a. That is, the top pole 42 (the top pole chip 12a, the magnetic path connecting portion 12b and the top yoke 42f) is connected to the bottom pole 9, and thus a magnetic path is formed.

As shown in FIG. 30, the thin film coil 32 and the coil connecting portion 32s have the same structural features as the structural features of the thin film coil 14 and the coil connecting portion 14s of the above-described first embodiment. The thin film coil 32 is electrically connected to the coil connecting wiring 42fh through the coil connecting portion 32s in the opening 34k. An outside terminal 32x of the thin film coil 32 and a rearward portion (not shown) of the coil connecting wiring 42fh are connected to an external circuit (not shown), and the external circuit allows a current to pass through the thin film coil 32.

Incidentally, the structural features of the elements other than the above-mentioned elements shown in FIG. 30 are the same as those of the elements of the above-described first embodiment (shown in FIG. 15).

In the embodiment, the etching process for forming the pole portion 200 is performed so as to also etch a part of the top surface portion of the bottom pole 9 in the more rearward region than the region in which the top pole chip 12a is provided (except the region in which the magnetic path connecting portion 12b is provided). Thus, the position of the surface of the underlayer (the insulating film 31) in a region in which the thin film coil 32 is provided can be lower than the position of the surface of the bottom pole 9. Since the position of the surface of the underlayer (the insulating film 31) in the region in which the thin film coil 32 is provided is lower than the position of the surface of the underlayer (the insulating film 13) of the thin film coil 14 of the above-described first embodiment, the insulating film 34 having a more sufficient thickness can be ensured over the thin film coil 32, and therefore an insulating effect can be further improved.

Moreover, in the embodiment, a front edge surface of the top yoke 42f forms an inclined surface, and thus the flow of a magnetic flux flowing from the top yoke 42f into the top pole chip 12a can be smoothed.

Since the functions, effects, modifications and so on of the method of manufacturing a thin film magnetic head according to the second embodiment are the same as those of the above-described first embodiment except for the above-mentioned functions, effects, modifications and so on, the description thereof is omitted.

Figure 31:
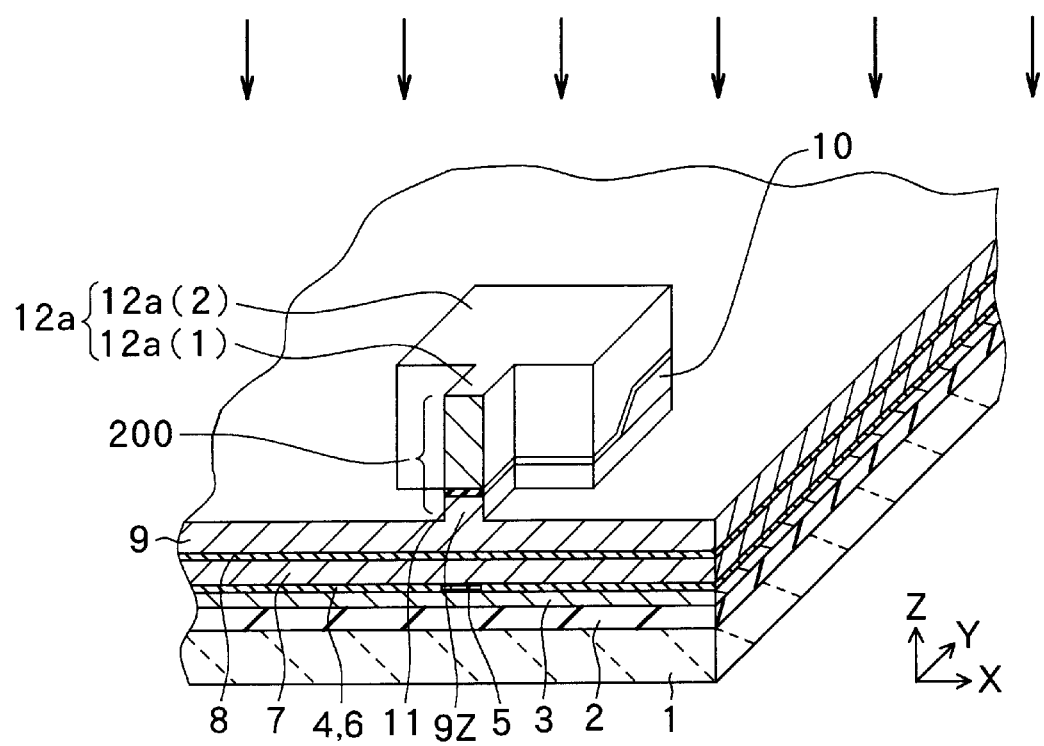
FIG. 31 is a perspective view of a modification of a peripheral portion around a pole portion of the thin film magnetic head according to the second embodiment of the invention.

In the embodiment, as shown in FIG. 28, the coupling position between the end portion 12a(1) of the top pole chip 12a and the rear end portion 12a(2) thereof is located more rearward than the position of the most front end of the insulating film pattern 10, but the coupling position is not necessarily limited to this embodiment. For example, as shown in FIG. 31, the above-mentioned coupling position may be shifted frontward. Also in this case, the same function as the function of the modification 1-1 of the above-described first embodiment enables overwrite characteristics to be improved. In FIG. 31, the structural features of the top pole chip 12a and so on except the above-mentioned respect are the same as the structural features shown in FIG. 28.

Moreover, in the embodiment, the pole portion 200 is formed by RIE, but the method of forming the pole portion 200 is not necessarily limited to this embodiment. For example, the pole portion 200 may be formed by using RIE in combination with FIB, as described by referring to the modification 1-5 of the above-mentioned first embodiment.

[Third Embodiment]

Next, a third embodiment of the invention will be described.

Firstly, the description is given with reference to FIGS. 32A to 34B with regard to a method of manufacturing a composite thin film magnetic bead as a method of manufacturing a thin film magnetic head according to the third embodiment of the invention. Since a thin film magnetic head according to the embodiment is embodied by the method of manufacturing a thin film magnetic head according to the embodiment, the thin film magnetic head will be described in conjunction with the method of manufacturing a thin film magnetic head. FIGS. 32A, 33A and 34A show a cross section perpendicular to an air bearing surface, and FIGS. 32B, 33B and 34B show a cross section of a pole portion parallel to the air bearing surface. The expressions about the X-axis, Y-axis and Z-axis directions in FIGS. 32A to 34B are the same as in the case of the above-described embodiments. In FIGS. 32A to 34B, the same parts as the elements of the above-described embodiments are indicated by the same reference numerals.

In the method of manufacturing a thin film magnetic head according to the third embodiment, the step of forming the insulating film 8 shown in FIGS. 32A and 32B and the previous steps are identical with the same steps of the above-described first embodiment shown in FIGS. 1A and 1B, and thus the description thereof is omitted.

In the third embodiment, after forming the insulating film 8, as shown in FIGS. 32A and 32B, a bottom magnetic layer 9a to form a part of the bottom pole 9 is formed with a thickness of about 1.0 μm to 2.0 μm on the insulating film 8. Then, a bottom pole chip 9b to form a part of the bottom pole 9 is selectively formed with a thickness of about 1.5 μm to 2.5 μm on a frontward region on the bottom magnetic layer 9a, and, simultaneously with this process, a bottom connecting portion 9c to form a part of the bottom pole 9 is selectively formed with the same thickness on a rearward region on the bottom magnetic layer 9a. The same approach as the approach for forming the top pole chip 12a of the above-described first embodiment is used as a method of forming the bottom magnetic layer 9a, the bottom pole chip 9b and the bottom connecting portion 9c. The use of this approach enables high-accuracy formation of a mask (not shown) for use in the etching process for forming the above-mentioned portions forming the bottom pole 9, and also enables forming the above-mentioned portions with high accuracy in a short time. The bottom pole 9 comprising the bottom magnetic layer 9a, the bottom pole chip 9b and the bottom connecting portion 9c corresponds to a specific example of "a second magnetic layer" of the invention.

Next, as shown in FIGS. 32A and 32B, an insulating film 51 made of, for example, alumina is formed with a thickness of about 0.3 μm to 0.5 μm over the overall surface.

Figures 33A, 33B:
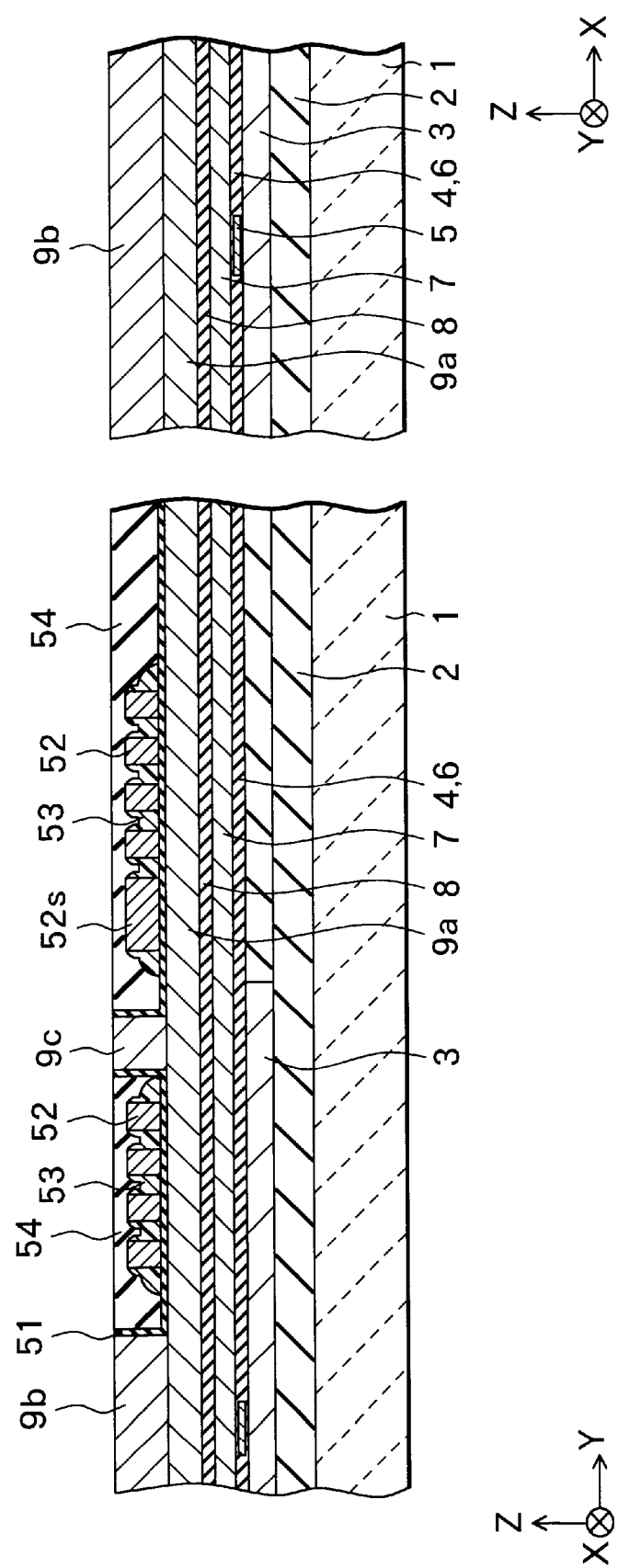
FIGS. 33A and 33B are cross sectional views for describing a step following the step of FIGS. 32A and 32B.

Next, as shown in FIGS. 33A and 33B, a thin film coil 52 made of, for example, copper (Cu) for an inductive recording head is selectively formed by, for instance, electroplating with a thickness of about 1.0 μm to 2.0 μm on the flat insulating film 51 in a more rearward region than a region in which the bottom pole chip 9b is provided (except a region in which the bottom connecting portion 9c is provided). For example, the thin film coil 52 is formed in such a manner that a coil connecting portion 52s is integrally formed with the thin film coil 52 at an inside terminal of the thin film coil 52. Then, an insulating film 53 made of, for example, a photoresist is formed between wirings of the thin film coil 52 (including the coil connecting portion 52s) and around the wirings. A method of forming the insulating film 53 (including heat treatment) is the same as the method of forming the insulating film 15 of the above-described first embodiment. Then, for example, alumina is deposited with a thickness of about 3.0 μm to 4.0 μm over the overall surface, and thereafter the overall surface of alumina is polished by, for example, CMP until the bottom pole chip 9b and the bottom connecting portion 9c are exposed. Thus, an insulating film 54 which the thin film coil 52 and so on are to be filled with is formed. The thin film coil 52 corresponds to a specific example of "a first thin film coil layer" of the invention, and the insulating films 53 and 54 correspond to a specific example of "a first insulating layer portion" of the invention.

Next, as shown in FIGS. 34A and 34B, for example, an alumina layer is formed with a thickness of about 0.5 μm to 1.0 μm over the overall surface by, for example, sputtering, and thereafter the alumina layer is etched and patterned by, for example, RIE, whereby an insulating film pattern 55 is selectively formed. This etching process selectively removes a part of a front region of the alumina layer, and a region over the bottom connecting portion 9c. In the latter region in particular, an opening 55k for connecting the bottom connecting portion 9c to a top pole 57 to be formed in the following step is formed. The insulating film pattern 55 is used to define the throat height zero position (the TH0 position), similarly to the insulating film pattern 10 of the above-described first embodiment. Details and so on of a region in which the insulating film pattern 55 is to be provided, structural features of the insulating film pattern 55 and a method of forming the insulating film pattern 55 are the same as in the case of the insulating film pattern 10.

Next, as shown in FIGS. 34A and 34B, a write gap layer 56 made of, for example, alumina is formed with a thickness of about 0.15 μm to 0.2 μm over the overall surface by sputtering, for example. In forming the write gap layer 56, the opening 55k formed in the previous step is not coated with alumina. The write gap layer 56 corresponds to a specific example of "a gap layer" of the invention.

Next, as shown in FIGS. 34A and 34B, the respective parts of the write gap layer 56, the insulating film pattern 55 and the insulating film 54 over the coil connecting portion 52s are selectively removed by, for example, RIE or ion milling, and thus an opening 54k for connecting the coil connecting portion 52s to a coil connecting wiring 57h to be formed in the following step is formed. Then, the top pole 57 is selectively formed with a thickness of about 1.5 μm to 3.0 μm in a region from on the bottom connecting portion 9c to the side to form the air bearing surface 80 (the left side in FIG. 34A) in the following step. At the same time when the top pole 57 is formed, the coil connecting wiring 57h is selectively formed in a region between a region over the opening 54k and a rearward region. The top pole 57 and the coil connecting wiring 57h are formed in the same manner as in the case of the top pole chip 12a and so on of the above-described first embodiment. That is, an iron nitride layer is formed, then a surface of the iron nitride layer is flattened, and thereafter the iron nitride layer is patterned by RIE under predetermined conditions. The use of this approach enables high-accuracy formation of a mask (not shown) for use in the etching process for forming the top pole 57 and the coil connecting wiring 57h, and also enables forming the above-mentioned portions with high accuracy in a short time. For example, the top pole 57 has a planar shape shown in FIG. 35 to be described later. The top pole 57 includes an end portion 57a for delimiting the write track width on a recording medium, an intermediate portion 57b having a greater width than the width of the end portion 57a, and a yoke portion 57c having a greater width and area than the width and area of the intermediate portion 57b. Details of structural features of the top pole 57 will be described later. The top pole 57 corresponds to a specific example of "a first magnetic layer" of the invention.

Next, as shown in FIG. 34B, the write gap layer 56 and the bottom pole chip 9b are etched by about 0.5 μm by means of dry etching using RIE as in the case of forming the pole portion 100 of the above-described first embodiment, and thus a pole portion 300 having the trim structure is formed. The use of the etching process using RIE enables forming the pole portion 300 with higher accuracy in a shorter time, as compared to the case of the use of ion milling or the like. This etching process is performed by using as a mask a photoresist film (not shown) formed more rearward than the position of the most rear end of the end portion 57a of the top pole 57. The pole portion 300 comprises the end portion 57a of the top pole 57, a portion (9bF) of the bottom pole chip 9b corresponding to the end portion 57a, and a part of the write gap layer 56 sandwiched between the end portion 57a and the portion 9bF, and these portions have substantially the same width. The end portion 57a corresponds to a specific example of "a first uniform-width portion" of the invention. The portion 9bF corresponds to a specific example of "a second uniform-width portion" of the invention.

Next, as shown in FIG. 34A, an overcoat layer 58 made of, for example, alumina is formed so as to coat the overall surface, and thereafter the air bearing surface 80 is formed by machining and polishing. As a result, the thin film magnetic head according to the embodiment is completed.

Figure 35:
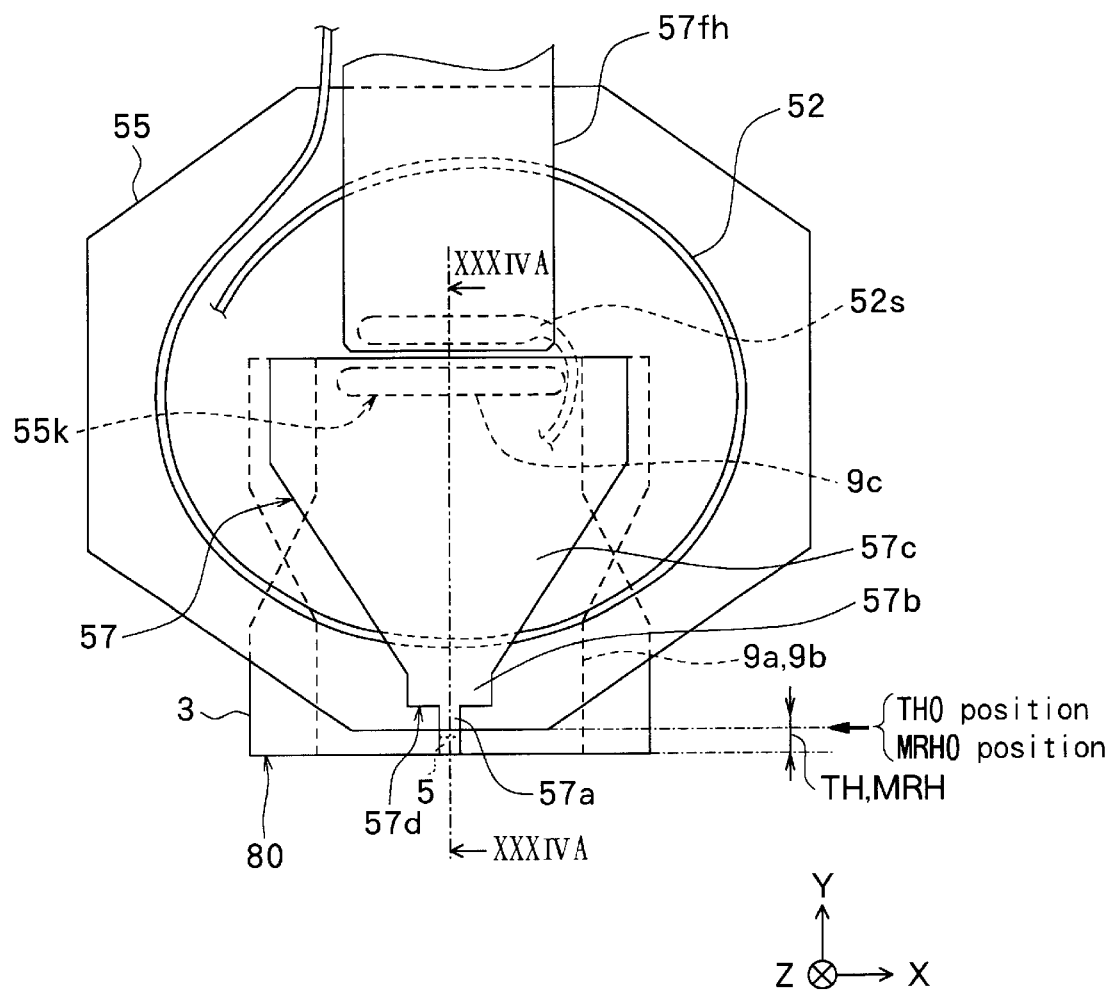
FIG. 35 is a plan view of a planar structure of a thin film magnetic head according to the third embodiment of the invention.
Figure 36:
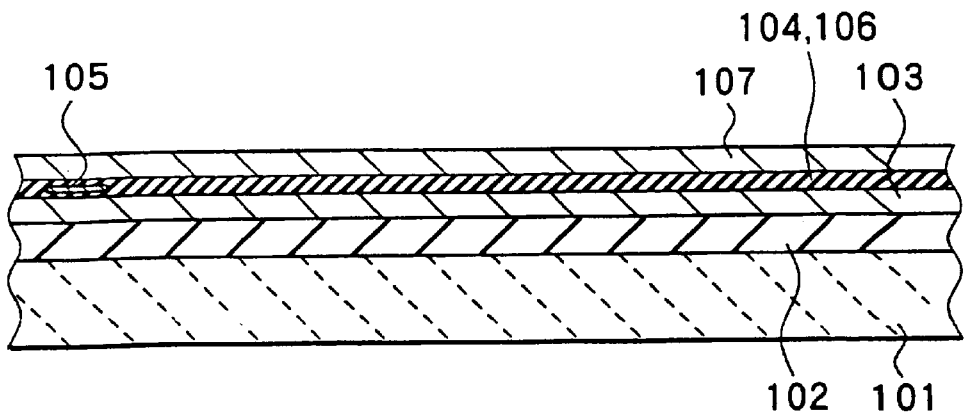
FIG. 36 is a cross sectional view for describing a step of a method of manufacturing a thin film magnetic head of a related art.
Figure 37:
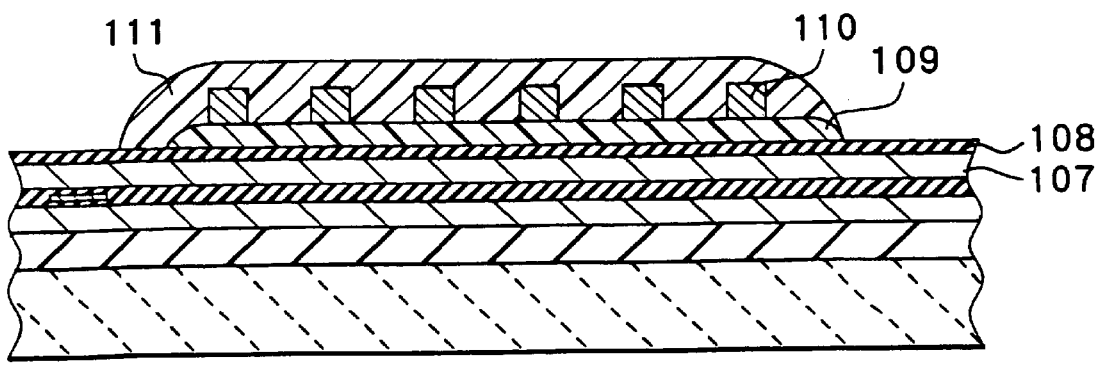
FIG. 37 is a cross sectional view for describing a step following the step of FIG. 36.
Figure 38:
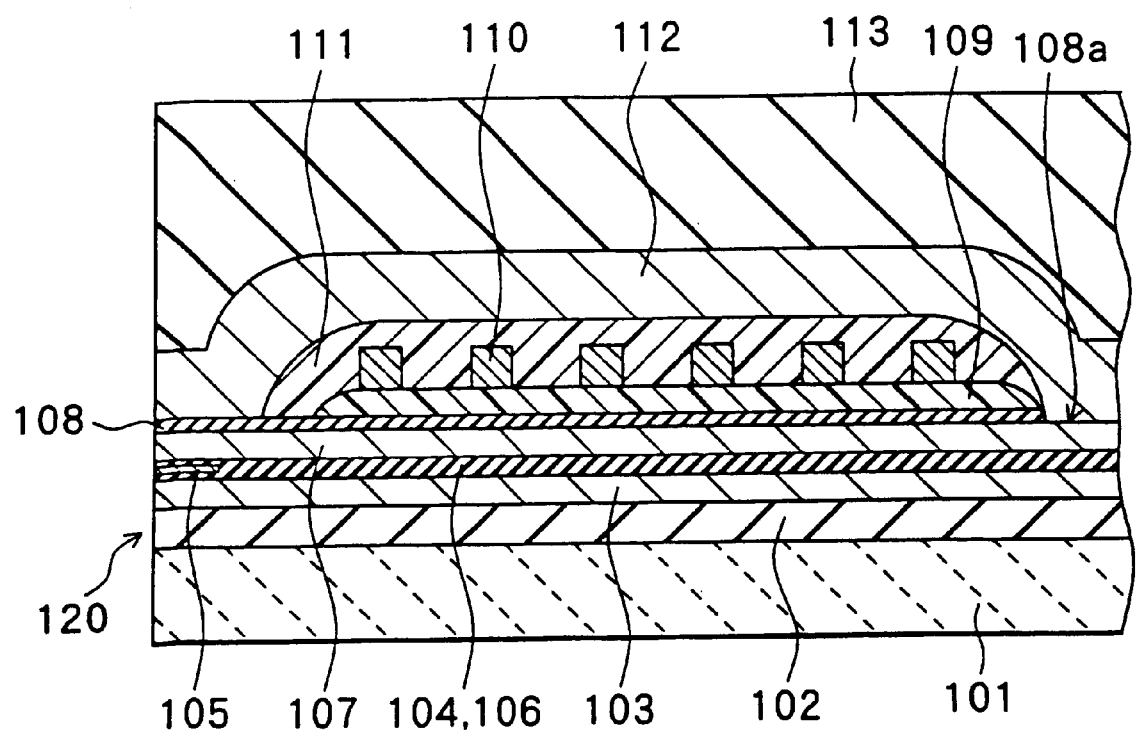
FIG. 38 is a cross sectional view for describing a step following the step of FIG. 37.
Figure 39:
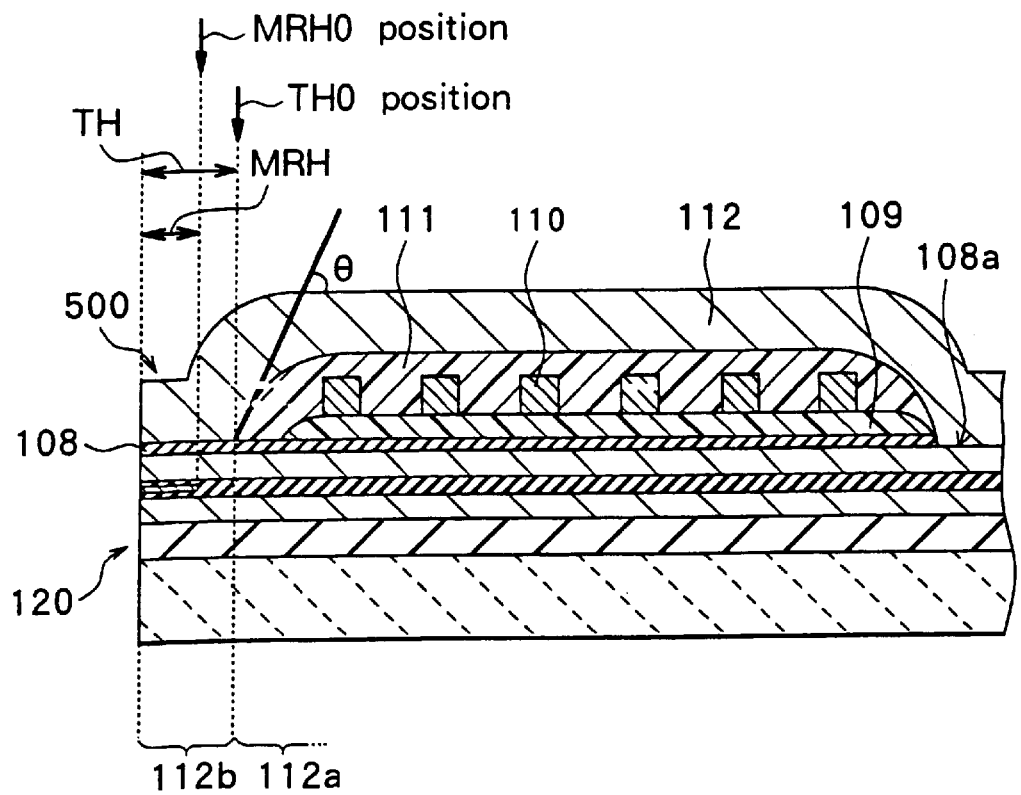
FIG. 39 is a cross sectional view of a principal structure of a thin film magnetic head of the related art.
Figure 40:
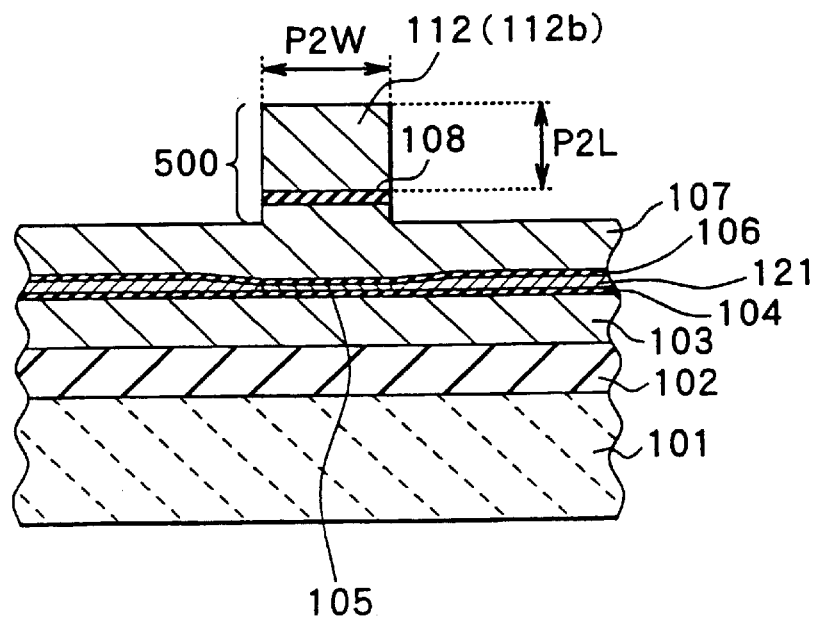
FIG. 40 is a cross sectional view showing a cross section of a pole portion of the thin film magnetic head shown in FIG. 39, parallel to an air bearing surface.
Figure 41:
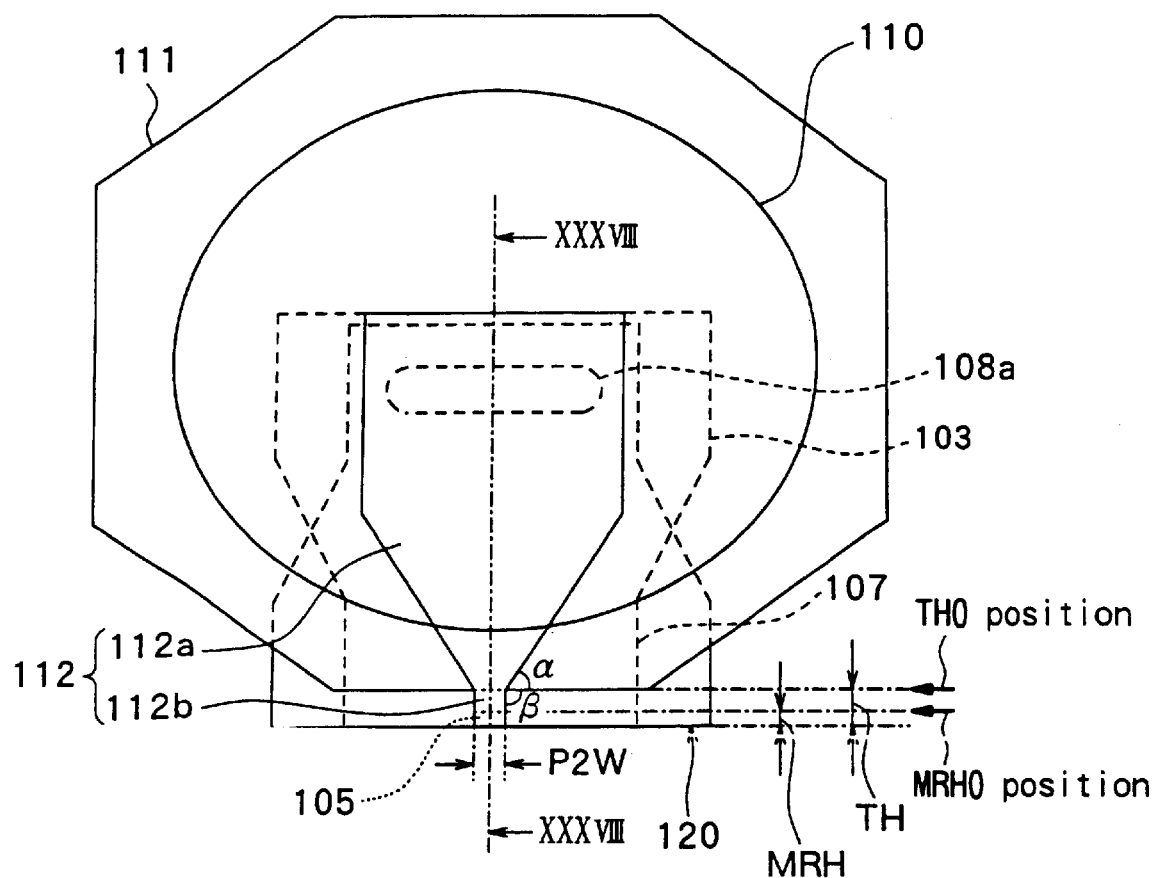
FIG. 41 is a plan view of a structure of the thin film magnetic head of the related art.
Figure 42:
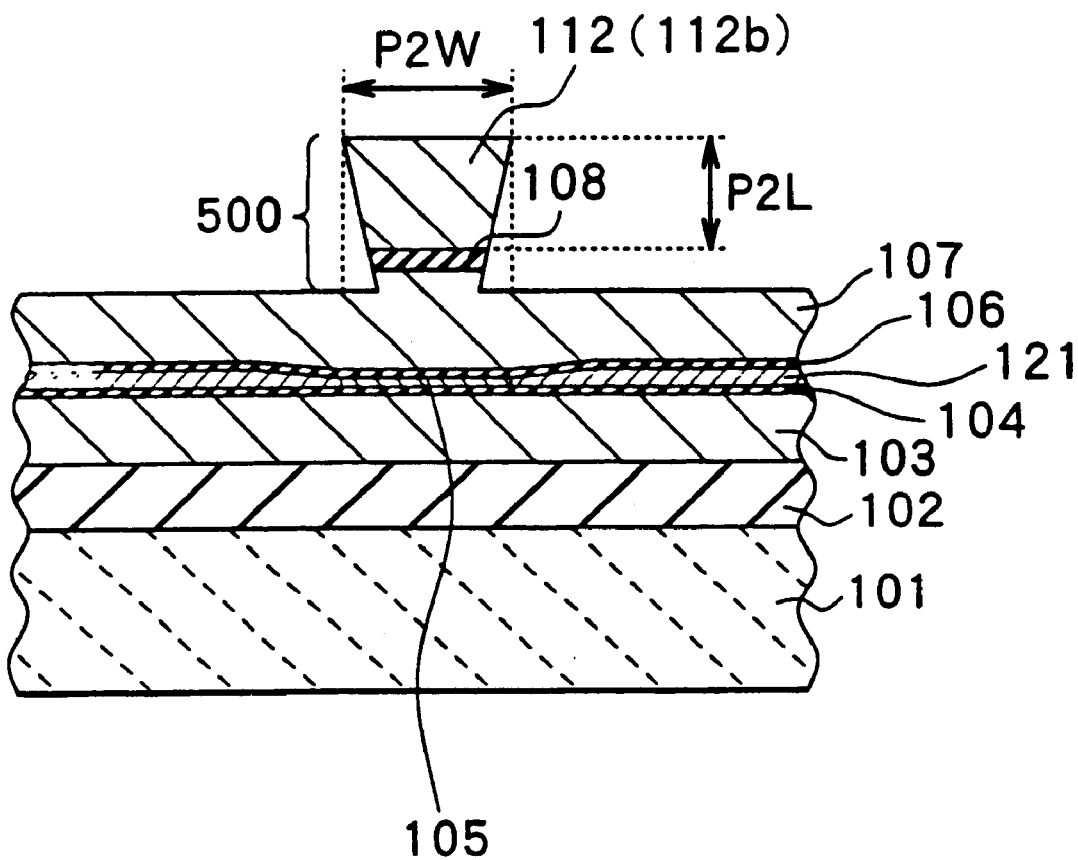
FIG. 42 is a cross sectional view showing the cross section of the pole portion parallel to the air bearing surface, for describing problems that arise when the pole portion of the thin film magnetic head of the related art is formed.

FIG. 35 shows a schematic representation of a planar structure of the thin film magnetic head manufactured by the method of manufacturing a thin film magnetic head according to the embodiment. In FIG. 35, the same parts as the elements of the above-described second embodiment shown in FIG. 30 are indicated by the same reference numerals. The insulating films 53 and 54, the insulating film pattern 55, the overcoat layer 58 and so on are not shown in FIG. 35. FIG. 35 shows the thin film coil 52 but shows its outermost periphery portion alone, and FIG. 35 shows the insulating film pattern 55 but shows its outermost end alone. FIG. 34A corresponds to a cross section viewed from the direction of the arrows along the line XXXIVA—XXXIVA of FIG. 35.

As shown in FIG. 35, the top pole 57 includes the end portion 57a, the intermediate portion 57b and the yoke portion 57c, which are arranged in this order when being viewed from the side of the air bearing surface 80. These portions 57a, 57b and 57c are integral with one another. The end portion 57a is a portion for determining the write track width on a recording medium during recording, that is, the width of the end portion 57a delimits the track width. The width of the intermediate portion 57b is greater than the width of the end portion 57a, and the width of the yoke portion 57c is greater than the width of the intermediate portion 57b. The yoke portion 57c has substantially the same structure as the structure of the yoke portion 12f(1) of the top yoke 12f of the above-described first embodiment. A step is formed in the width direction at a coupling portion between the end portion 57a and the intermediate portion 57b, and a step surface 57d of the step portion close to the intermediate portion 57b is located more rearward than the TH0 position (or the MRH0 position). However, the position of the step surface 57d is not necessarily limited to the above-mentioned case. The step surface 57d may be shifted frontward from the TH0 position (or the MRH0 position), or the position of the step surface 57d may match the TH0 position (or the MRH0 position).

As shown in FIGS. 34A and 35, a rearward part of the top pole 57 is magnetically coupled to the bottom magnetic layer 9a and the bottom pole chip 9b through the bottom connecting portion 9c in the opening 55k. That is, the top pole 57 is connected to the bottom pole 9 (the bottom magnetic layer 9a, the bottom pole chip 9b and the bottom connecting portion 9c), and thus a magnetic path is formed. The thin film coil 52, the coil connecting portion 52s and the coil connecting wiring 57h have the same structural features as the structural features of the thin film coil 32, the coil connecting portion 32s and the coil connecting wiring 42fh of the above-described second embodiment shown in FIG. 30.

Incidentally, the structural features of the elements other than the above-mentioned elements shown in FIG. 35 are the same as those of the elements of the above-described second embodiment (shown in FIG. 30).

In the third embodiment, the portions of the top pole 57 (the end portion 57a, the intermediate portion 57b and the yoke portion 57c) are integrally formed, and thus the manufacturing step of the third embodiment can be made simpler than that of the above-described first and second embodiments in which the portions of the top pole 12 (the first embodiment) or the top pole 42 (the second embodiment) are separately formed. Since the functions, effects, modifications and so on of the method of manufacturing a thin film magnetic head according to the third embodiment are the same as those of the above-described first and second embodiments except for the above-mentioned functions, effects, modifications and so on, the description thereof is omitted.

In the third embodiment, surface polishing of the insulating film 54 is ended at the time when the bottom pole chip 9b and the bottom connecting portion 9c are exposed. However, the time of end of the surface polishing is not necessarily limited to this embodiment. For example, the surface polishing may be performed until the thin film coil 52 as well as the bottom pole chip 9b and the bottom connecting portion 9c is exposed. Even if the thin film coil 52 is exposed at this time, the thin film coil 52 can be insulated from the top pole 57 because insulating parts such as the insulating film pattern 55 and the write gap layer 56 are provided over the thin film coil 52 in the following step.

Moreover, in the third embodiment, the pole portion 300 is formed by RIE, but the method of forming the pole portion 300 is not necessarily limited to this embodiment. For example, the pole portion 300 may be formed by using RIE in combination with FIB, as described by referring to the modification 1-5 of the above-mentioned first embodiment.

Although the invention has been described above by referring to some embodiments, the invention is not limited to these embodiments and various modifications of the invention are possible. For example, in the above-described embodiments, a precursory layer (an iron nitride layer) for forming the top pole chip 12a or the like is formed and thereafter a surface of the precursory layer is polished and flattened, but the method of forming the top pole chip 12a or the like is not necessarily limited to these embodiments. It is not necessary to perform the above-mentioned polishing process when an underlayer of a region in which the precursory layer is formed is flat.

In the above-described embodiments, it is recommended that, in order to improve the forming accuracy and the forming speed, the magnetic layer portions for constituting the thin film magnetic head should be formed by selectively etching the iron nitride layer by means of RIE. However, this method does not have to be applied to all the magnetic layer portions. For example, some of the magnetic layer portions may be formed by electroplating using Permalloy or the like as a material. Preferably, the parts requiring the higher forming accuracy, i.e., the parts for forming the pole portion (the top pole chip 12a and the bottom pole 9 of the first and second embodiments, or the top pole 57 and the bottom pole chip 9b of the third embodiment) are formed by selectively etching the iron nitride layer by means of at least RIE.

The planar shapes of the magnetic layer portions constituting the top pole described by referring to the above-mentioned embodiments (the top pole chip 12a, the intermediate connecting portion 12c, the top yokes 12f and 42f, the top pole 57 and so on) are not necessarily limited to the planar shapes shown in FIGS. 15, 30 and 35. The planar shapes can be freely changed as long as they can sufficiently supply a magnetic flux generated by the thin film coil to a tip portion of the end portion (12a(1) or 57a).

For example, although the method of manufacturing a composite thin film magnetic head has been described in the above-mentioned embodiments and the modifications thereof, the invention can be applied to a record-only thin film magnetic head having an inductive magnetic transducer for writing or a thin film magnetic head having an inductive magnetic transducer for both recording and reproducing. Moreover, the invention can be applied to a thin film magnetic head having the structure in which the element for writing and the element for reading are stacked in reverse order.

As described above, according to the method of manufacturing a thin film magnetic head of the invention, at least one of the step of forming the first magnetic layer and the step of forming the second magnetic layer includes the steps of: forming a magnetic material layer; polishing and flattening a surface of the magnetic material layer; forming a first mask on the magnetic material layer flattened; and selectively etching the magnetic material layer by reactive ion etching using the first mask. Thus, even when the underlayer of the region in which the magnetic material layer is formed has a concave and convex structure, the first mask can be formed with high accuracy. Therefore, the magnetic material layer is processed by using the first mask, whereby the first magnetic layer portion can be formed with high accuracy. Moreover, reactive ion etching is used to process the magnetic material layer, thereby enabling the shorter-time process as compared to the case in which ion milling is used. Accordingly, the time required to manufacture the whole thin film magnetic head can be greatly reduced.

Specifically, when an inorganic material made of a material containing aluminum oxide or aluminum nitride is used as a material of the first mask, loss in the thickness of the first magnetic layer portion can be reduced as compared to the case in which a material having a high etching rate, such as a photoresist film, is used.

When an angle of a portion of the first mask corresponding to the corner of the first magnetic layer portion is within a range of 90 degrees to 120 degrees, the angle of the corner of the formed first magnetic layer portion can be within the same range. The first magnetic layer portion having the above-described structural features can smooth the flow of a magnetic flux traveling from the wide portion toward the first uniform-width portion.

When the mask precursory layer is patterned by reactive ion etching, the time required to form the first mask can be reduced.

When the mask precursory layer is patterned at a temperature within a range of 50° C. to 300° C., the time required for the etching process can be reduced.

When formation of the first uniform-width portion of the first magnetic layer, selective removal of the region of the gap layer excluding the portion corresponding to the first uniform-width portion, and formation of the second uniform-width portion of the second magnetic layer are successively performed, the time required to manufacture the whole thin film magnetic head can be reduced.

When the second magnetic layer portion is formed in such a manner that the second magnetic layer portion partly overlaps the first magnetic layer portion and that the edge thereof close to the recording-medium-facing surface is located far from the position of the recording-medium-facing surface, the occurrence of side erase resulting from the second magnetic layer portion can be avoided.

When the second magnetic layer portion is formed on the first flat surface, the second magnetic layer portion can be formed with high accuracy.

When the third magnetic layer portion is formed on the first flat surface by reactive ion etching, the third magnetic layer portion can be formed with high accuracy in a short time.

When the third magnetic layer portion is formed in such a manner that the third magnetic layer portion partly overlaps both of the first magnetic layer portion and a part of the second magnetic layer portion and that the edge surface thereof close to the recording-medium-facing surface is located far from the position of the recording-medium-facing surface, the occurrence of side erase resulting from the third magnetic layer portion can be avoided.

When the method includes the step of, simultaneously with forming the third magnetic layer portion, forming a second connecting pattern as a part of the thin film coil portion on the first connecting pattern, there is no need for the step of forming an opening by removing a part of the insulating layer in order to electrically connect the second connecting pattern to a conductive layer pattern, as distinct from the case in which the second connecting pattern is not formed on the first connecting pattern. Therefore, the number of manufacturing steps can be reduced.

When the second magnetic layer portion is further formed on the second flat surface, the second magnetic layer portion can be formed with high accuracy.

When the third magnetic layer is formed by patterning with reactive ion etching, the third magnetic layer can be formed with high accuracy in a short time, and therefore the time required to manufacture the whole thin film magnetic head can be further reduced.

When a material containing iron nitride or an amorphous alloy such as a zirconium-cobalt-iron alloy is used as a magnetic material, less redeposition occurs during the etching of the magnetic material layer by means of RIE and therefore higher-accuracy patterning is made possible, as compared to the case in which Permalloy or the like is used as the material of the magnetic material layer.

When the step of processing is performed at a temperature within a range of 50° C. to 300° C., the time required for the etching process can be reduced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head having: a first magnetic layer and a second magnetic layer magnetically coupled to each other having two magnetic poles which face each other with a gap layer in between and are to be faced with a recording medium, a thin film coil provided between the two magnetic layers, and an insulating layer for insulating the thin film coil from the two magnetic layers, the first magnetic layer having a first magnetic layer portion that includes a first uniform-width portion extending away from a recording-medium-facing surface to be faced with the recording medium and defining a write track width on the recording medium, and a second magnetic layer portion that extends in a region in which the thin film coil is provided and that is magnetically coupled to the first magnetic layer portion, the second magnetic layer having a second uniform-width portion corresponding to the first uniform-width portion of the first magnetic layer, wherein at least one of the step of forming the first magnetic layer and the step of forming the second magnetic layer includes the steps of:
forming a magnetic material layer;
polishing and flattening a surface of the magnetic material layer;
forming a first mask on the magnetic material layer flattened; and
selectively etching the magnetic material layer by reactive ion etching using the first mask, and when the first magnetic layer portion further includes a wide portion being located in an opposite side of the first uniform-width portion from the recording-medium-facing surface, being magnetically coupled to the first uniform-width portion and having a greater width than a width of the first uniform-width portion, when a step is formed in a width direction at a coupling position between the first uniform-width portion and the wide portion, and when a corner is formed with a side edge surface of the first uniform-width portion and a step surface of the wide portion at the step;

the first mask is formed so as to include a portion having a planar shape corresponding to a planar shape of the wide portion, and is formed so that an angle of a portion of the first mask, the portion corresponding to the corner of the first magnetic layer portion, is within a range of 90 degrees to 120 degrees.

2. The method of manufacturing a thin film magnetic head according to claim 1, wherein an inorganic material is used as a material of the first mask.

3. The method of manufacturing a thin film magnetic head according to claim 2, wherein aluminum oxide or aluminum nitride is used as the inorganic material.

4. The method of manufacturing a thin film magnetic head according to claim 1, wherein the first mask is formed so that a planar shape of the first mask includes a portion corresponding to a planar shape of at least the first uniform-width portion of the first magnetic layer portion.

5. The method of manufacturing a thin film magnetic head according to claim 1, wherein the step of forming the first mask includes the steps of:

forming a mask precursory layer made of an inorganic material on the surface of the magnetic material layer;

forming a second mask on a surface of the mask precursory layer; and forming the first mask by patterning the mask precursory layer by use of the second mask.

6. The method of manufacturing a thin film magnetic head according to claim 5, wherein the mask precursory layer is patterned by reactive ion etching.

7. The method of manufacturing a thin film magnetic head according to claim 6, wherein the mask precursory layer is patterned in a gaseous atmosphere containing at least one of chlorine and boron trichloride.

8. The method of manufacturing a thin film magnetic head according to claim 6, wherein the mask precursory layer is patterned at a temperature within a range of 50° C. to 300° C.

9. The method of manufacturing a thin film magnetic head according claim 5, wherein a metal film pattern having a predetermined shape is formed on the surface of the mask precursory layer, and the metal film pattern is used as the second mask.

10. The method of manufacturing a thin film magnetic head according to claim 9, wherein the metal film pattern is formed by selectively growing a plated film on the surface of the mask precursory layer.

11. The method of manufacturing a thin film magnetic head according to claim 9, wherein a metal layer is formed on the surface of the mask precursory layer, and the metal film pattern is formed by selectively etching the metal layer.

12. The method of manufacturing a thin film magnetic head according to claim 5, wherein a photoresist film pattern having a predetermined shape is formed on the surface of the mask precursory layer, and the photoresist film pattern is used as the second mask.

13. The method of manufacturing a thin film magnetic head according to claim 1, wherein at least the first uniform-width portion of the first magnetic layer is formed by the step of selectively etching the magnetic material layer.

14. The method of manufacturing a thin film magnetic head according to claim 13, wherein a region of the gap layer excluding a portion corresponding to the first uniform-width portion of the first magnetic layer is selectively removed by reactive ion etching.

15. The method of manufacturing a thin film magnetic head according to claim 1, wherein at least the second uniform-width portion of the second magnetic layer is formed by the step of selectively etching the magnetic material layer.

16. The method of manufacturing a thin film magnetic head according to claim 1, wherein formation of the first uniform-width portion of the first magnetic layer, selective removal of a region of the gap layer excluding a portion corresponding to the first uniform-width portion, and formation of the second uniform-width portion of the second magnetic layer are successively performed.

17. The method of manufacturing a thin film magnetic head according to claim 16, wherein the first mask made of an inorganic material is used to form the first uniform-width portion of the first magnetic layer, and at least one of the first mask and the first uniform-width portion is used as an etching mask to selectively remove the gap layer and form the second uniform-width portion of the second magnetic layer.

18. The method of manufacturing a thin film magnetic head according to claim 1, wherein, in the step of forming the first magnetic layer, the second magnetic layer portion is separately formed from the first magnetic layer portion by patterning using reactive ion etching.

19. The method of manufacturing a thin film magnetic head according to claim 18, wherein the second magnetic layer portion is formed in such a manner that the second magnetic layer portion partly overlaps the first magnetic layer portion and an edge thereof close to the recording-medium-facing surface is located far from a position of the recording-medium-facing surface.

20. The method of manufacturing a thin film magnetic head according to claim 18, wherein when the thin film coil has a first thin film coil and the insulating layer has a first insulating layer portion which at least the first thin film coil is embedded in, the method includes the steps of:

forming the first insulating layer portion so as to cover at least the first magnetic layer portion and the first thin film coil; and forming a first flat surface by polishing a surface of the first insulating layer portion until at least the first magnetic layer portion is exposed.

21. The method of manufacturing a thin film magnetic head according to claim 20, wherein the second magnetic layer portion is formed on the first flat surface in such a manner that the second magnetic layer is brought into contact with the first magnetic portion exposed.

22. The method of manufacturing a thin film magnetic head according to claim 20, wherein when the first magnetic layer further includes a third magnetic layer portion for magnetically coupling the first magnetic layer portion to the second magnetic layer portion, between the first magnetic layer portion and the second magnetic layer portion, the third magnetic layer portion is formed on the first flat surface by reactive ion etching.

23. The method of manufacturing a thin film magnetic head according to claim 22, wherein the third magnetic layer portion is formed in such a manner that the third magnetic layer portion partly overlaps both of the first magnetic layer portion and a part of the second magnetic layer portion and an edge thereof close to the recording-medium-facing surface is located far from a position of the recording-medium-facing surface.

24. The method of manufacturing a thin film magnetic head according to claim 22, wherein when the thin film coil further has a second thin film coil provided in a different layer from the first thin film coil, and the insulating layer further has a second insulating layer portion which at least the second thin film coil is embedded in, the method includes the steps of:
  forming a first connecting pattern on an end of the second thin film coil simultaneously with forming the second thin film coil on the first flat surface, the first connecting pattern being a part of the thin film coil and being integral with the second thin film coil;
  forming a second connecting pattern on the first connecting pattern simultaneously with forming the third magnetic layer portion, the second connecting pattern being a part of the thin film coil;
  forming the second insulating layer portion so as to coat at least the third magnetic layer portion, the second thin film coil and the second connecting pattern;
  forming a second flat surface by polishing a surface of the second insulating layer portion until at least both of the third magnetic layer portion and the second connecting pattern are exposed; and
  forming a conductive layer pattern on the second flat surface so as to be electrically connected to an exposed surface of the second connecting pattern.

25. The method of manufacturing a thin film magnetic head according to claim 24, wherein the second magnetic layer portion is further formed on the second flat surface.

26. The method of manufacturing a thin film magnetic head according to claim 1, wherein when the thin film magnetic head further has a magnetic transducer film extending away from the recording-medium-facing surface and a third magnetic layer for magnetically shielding the magnetic transducer film, the third magnetic layer is formed by patterning with reactive ion etching.

27. The method of manufacturing a thin film magnetic head according to claim 1, wherein the magnetic material layer is formed by sputtering using a predetermined magnetic material.

28. The method of manufacturing a thin film magnetic head according to claim 27, wherein an iron nitride is used as the magnetic material.

29. The method of manufacturing a thin film magnetic head according to claim 27, wherein an amorphous alloy is used as the magnetic material.

30. The method of manufacturing a thin film magnetic head according to claim 29 wherein a zirconium-cobalt-iron alloy is used as the amorphous alloy.

31. The method of manufacturing a thin film magnetic head according to claim 1, wherein the step of processing selectively etching the magnetic material layer is performed in a gaseous atmosphere containing at least one of chlorine, boron trichloride and hydrogen chloride.

32. The method of manufacturing a thin film magnetic head according to claim 1, wherein the step of selectively etching the magnetic material layer is performed at a temperature within a range of 50°C. to 300°°C.

* * * * *

UNITED STATES PATENT AND TRADEMARK OFFICE
CERTIFICATE OF CORRECTION

PATENT NO. : 6,622,371 B2
DATED : September 23, 2003
INVENTOR(S) : Yoshitaka Sasaki It is certified that error appears in the above-identified patent and that said Letters Patent is hereby corrected as shown below:

Column 40,
Line 31, replace "300°°C" with -- 300°C --.

Signed and Sealed this

Second Day of December, 2003

JAMES E. ROGAN
*Director of the United States Patent and Trademark Office*